United States Patent
Hayashi et al.

(10) Patent No.: US 6,946,956 B2
(45) Date of Patent: Sep. 20, 2005

(54) LOCATING SYSTEM AND METHOD FOR DETERMINING POSITIONS OF OBJECTS

(75) Inventors: Hitoshi Hayashi, Yokohama (JP);
Masashi Shimizu, Yokohama (JP);
Hirohito Suda, Yokosuka (JP); Akinori Shibuya, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 266 days.

(21) Appl. No.: 10/207,021

(22) Filed: Jul. 30, 2002

(65) Prior Publication Data

US 2004/0021566 A1 Feb. 5, 2004

(51) Int. Cl.$^7$ .............................................. G08B 1/08
(52) U.S. Cl. ............................ 340/539.13; 340/573.1; 340/686.1
(58) Field of Search ......................... 340/539.13, 993, 340/540, 573.1, 686.1; 342/357.07, 450, 457; 702/150; 700/302

(56) References Cited

U.S. PATENT DOCUMENTS

| | | | | |
|---|---|---|---|---|
| 4,799,062 A | * | 1/1989 | Sanderford et al. | 342/450 |
| 5,666,662 A | | 9/1997 | Shibuya | |
| 5,731,757 A | * | 3/1998 | Layson, Jr. | 340/573.1 |
| 5,917,425 A | * | 6/1999 | Crimmins et al. | 340/825.49 |
| 6,058,374 A | * | 5/2000 | Guthrie et al. | 705/28 |
| 6,198,390 B1 | * | 3/2001 | Schlager et al. | 340/540 |
| 6,542,114 B1 | * | 4/2003 | Eagleson et al. | 342/357.07 |

FOREIGN PATENT DOCUMENTS

| | | |
|---|---|---|
| DE | 201 14 245 | 1/2002 |
| GB | 2 291 303 | 1/1996 |
| JP | 8-107583 | 4/1996 |
| JP | 9-159746 | 6/1997 |
| JP | 9-161177 | 6/1997 |
| JP | 11-218571 | 8/1999 |

* cited by examiner

*Primary Examiner*—Anh V. La
(74) *Attorney, Agent, or Firm*—Oblon, Spivak, McClelland, Maier & Neustadt, P.C.

(57) ABSTRACT

A locating system for determining a position of an object comprises a transmitting station that transmits a first ID signal containing a first identifier of this transmitting station; a receiving station that receives the first ID signal, measures the intensity of the first ID signal, and extracts the first identifier; a data management unit that stores and manages the intensity in association with the first identifier, the intensity and the identifier being supplied from the receiving station; and a positioning computer that estimates the position of the transmitting station using a first correcting formula defining a relation between the intensity and the distance, based on the data stored in the data management unit.

32 Claims, 34 Drawing Sheets

CONVENTIONAL ACTIVE TAG SYSTEM

4th EMBODIMENT

LOCATING SYSTEM AND METHOD FOR DETERMINING POSITIONS OF OBJECTS

BACKGROUND OF THE INVENTION

1. Field of Invention

The present invention generally relates to a locating system for determining the location of a transmitting station attached to an item or a person, and more particularly to a locating system for efficiently determining the positions of a number of transmitting stations indoors, such as in stores, warehouses, and offices, with a high precision without being subjected to much influence from environmental factors.

2. Description of the Related Art

Wireless tags (or transmitting stations) are used in various fields. For example, a tag system illustrated in FIG. 1 is actually working at many stores. The system shown in FIG. 1 comprises a gate 121 and wireless tags 123 attached to items or merchandise. If items 122a and 122b having tags 123a and 123b, respectively, pass through the gate 121 without paying at a cashier, the system generates alarms. This system is a so-called passive tag system using gates, in which passive tags are used as transmitting stations. The passive tag receives radio waves generated from the gate 121, modulates the radio waves, and returns signals to the gate 121. The gate 121 generates alarms when receiving the return signals transmitted from the tag 123. The passive tag system in combination with a gate is superior in maintenance because the tag (or the transmitting station) 123 does not require a power source. However, the communication range is limited to several tens of centimeters, and therefore it is unsuitable for a long-range tag system.

On the other hand, a so-called active tag system illustrated in FIG. 2 is known as a long-range tag system. In the active tag system, a power source is provided to each of the transmitting stations 127a–127f in order to extend the communication range. In general, the active tag system uses a frequency band assigned to a specific low power, and is capable of communicating in the range from several meters to several tens meters. However, this active radio tag system only has a function of determining presence or absence of the transmitting stations 127a–127f (tag 1 through tag 6) in the communication areas 125a and 125b of the receiving stations 124a and 124b, respectively. If the conventional active tag system (i.e., a combination of active transmitting stations 127 and receiving stations 124) is used to estimate the position of each transmitting station, the position estimating accuracy is beyond the communication range (i.e., exceeds the communication area size). In order to raise the positioning accuracy, the transmission power of the transmitting station must be lowered, or the sensitivity of the receiving station must be reduced, while increasing the number of receiving stations, to narrow the area covered by each receiving station.

To overcome the above-described problems of the active tag system, a locating system illustrated in FIG. 3, which is disclosed in JPA (Japanese Patent Laid-open Publication No.) 9-161177, is proposed. The system shown in FIG. 3 includes a transmitting station 131, three or more base stations 132a–132c, and a center station 133 communicating with the base stations 132. The transmitting station 131 transmits a signal containing the identification code of the transmitting station itself and current time (i.e., time of transmission) at a predetermined time interval using radio waves. Every time the base stations 132 receive the signal from the transmitting station 131, they each transmit the received signal, together with time of receipt and their identification codes, to the center station 133 by radio waves. The center station 133 calculates the distance between the transmitting station 131 and each of the base stations 132, based on the information received from the base stations 132, and estimates the position of the transmitting station 131. To be more precise, the center station 133 determines the signal propagation time from the time of transmission and time of receipt and calculates the distance between the transmitting station 131 and each of the base stations 132 by multiplying the propagation time with the propagation speed of radio waves. Then, the center station 133 estimates the position of the transmitting station 131 based on the positional relation with respect to the base stations 132.

The system disclosed in JPA9-161177 can estimate the position of the transmitting station by accurately measuring time. However, the signal transmission interval is generally set long at the transmitting station 131 in order to keep the life of the battery long. This causes a problem that precise position information can not be obtained when such position information is actually needed. In addition, at least three base stations 132 must be fixed in order to estimates the position of the transmitting station, and if the transmitting station moves out of the communication area of the fixed base station, the position of the transmitting station can not be estimated. Still another problem is that there is no information about the environment of the transmitting station.

FIG. 4 illustrates another known locating system, which is disclosed in JAP9-159746. The system shown in FIG. 4 includes a transmitting station 131 that transmits a radio signal, three or more base stations 132 that receive the radio signal from the transmitting station 131 and measure the intensity of the received signal, and a center station 133 that estimates the position of the transmitting station 131 based on the intensity of the received signal supplied from each base station 132. In this system, the transmitting station 131 generates and transmits radio signals during the positioning operation. Each of the base stations 132 supplies the measuring result of the signal intensity to the center station 133. The center station 133 calculates the distance between the transmitting station 131 and each of the base stations 132 from the intensity, and estimates the position of the transmitting station 131 based on the positional relation between the transmitting station 131 and each of the base stations 132.

A table listing the relations between intensities of the received signals and the corresponding distances is stored in the center station 133 in advance. The center station 133 determines the distance by applying the received intensity to the table. This system is capable of estimating the position of the transmitting station 131 by creating an accurate table indicating the relation between the intensity and the distance. However, in order to specify the position, at least three base stations must be fixed. If the transmitting station 131 moves away from the communication area of the base station, the position of the transmitting station 131 can not be estimated any longer.

Thus, the conventional "passive tag system" is unsuitable for a long-range radio tag system because its communication range is as short as several ten centimeters.

The conventional "active tag system" requires the number of receiving stations to be increased in order to improve the positioning accuracy.

The conventional locating system illustrated in FIG. 3, which estimates the distance based on the transmission time, needs to set the signal transmission interval long in order to keep the life of the battery of the transmitting station long. For this reason, it is difficult for this system to obtain accurate position information when it is actually required. In addition, at least three base stations have to be fixed to estimate the position, and if the transmitting station moves out of the communication area, the position of the transmitting station can not be estimated any longer. This system can not determine under what environment the transmitting station is operating.

The conventional locating system illustrated in FIG. 4, which determines the distance based on the intensity of the received signal, requires at least three base stations to be fixed. If the transmitting station is out of the communication area of the base station, the position can not be estimated any longer.

Although a positioning means making use of a GPS may be effective outdoors, it is unsuitable indoors because of reflected waves. Using an absolute time difference, as in a GPS, under the influence of reflected waves is ineffective because the error becomes too large. Even if estimating a position using amplitude information, the relation between the distance and the intensity of the received signal does not agree with the Friis' formula in many cases.

As is well known, Friis' formula is expressed by $$L = 20 \times \log_{10}\left(\frac{4\pi d}{\lambda}\right) \quad (0)$$

where L denotes the propagation loss, d denotes the distance, and $\lambda$ denotes the wavelength.

The reason why Friis' formula does not work for indoors propagation is that the receiving station is located in hiding, or local fluctuation occurs in intensity of the received signal due to influence of reflected waves.

SUMMARY OF THE INVENTION

The present invention was conceived in view of the above-described problems in the prior art, and it is an object of the invention to overcome the limited communication range, which is the problem in the conventional passive tag system, and avoid undesirable increase in the number of receiving stations when estimating a position accurately, which is the problem in the conventional active tag system.

It is another object of the invention to estimate the position of a transmitting station with high precision even indoors by taking into consideration the environment surrounding the transmitting station.

It is still another object of the invention to allow a user to obtain accurate position information when such position information is actually required.

It is yet another object of the invention to eliminate the necessity of fixing three or more base stations (or receiving stations) when estimating a position of a transmitting station.

It is yet another object of the invention to continuously estimate the position of a transmitting station even if the transmitting station moves out of the communication area of a fixed base station.

These objects are realized in a locating system and method provided according to the invention. Such a system and method are applicable not only to monitoring dangerous objects or preventing theft, but also to controlling the inventory and managing the assets in warehouses or offices in an efficient manner.

To achieve the above-described objects, in one aspect of the invention, a system for determining a position of an object comprises (a) a transmitting station configured to transmit a first ID signal containing a first identifier in a periodic manner, (b) a receiving station configured to receive the first ID signal, measure the intensity of the first ID signal, and read the first identifier, (c) a data management unit configured to store and manage the intensity in association with the first identifier that are supplied from the receiving station, and (d) a positioning computer configured to estimate the position of the transmitting station using the data managed by the data management unit.

The positioning computer determines a first correcting formula defining intensity "e" of a received signal as a function of distance "d". The positioning computer then estimates the position of the transmitting station using the first correcting formula and known (or available) position information.

If the position of the $i^{th}$ transmitting station is (xi, yi) and the $j^{th}$ receiving station is (uj, vj), the distance $d_{ij}$ between the $i^{th}$ transmitting station and the $j^{th}$ receiving station is $$d_{ij}=\sqrt{(x_{1-u_j})^2+(y_{i-v_j})^2} \quad (1)$$

The first correcting formula is expressed as $$e_{ij}=f_0(d_{ij})=S_1\times\log_{10}(d_{ij})+S_2 \quad (2)'$$

or $$e_{ij}=f_0(d_{ij})=S_1\times\log_{10}(d_{ij}+S_2) \quad (24)'$$

where $e_{ij}$ is the intensity of the ID signal transmitted by the $i^{th}$ transmitting station and received at the $j^{th}$ receiving station, and S1 and S2 are correcting coefficients.

Preferably, the first formula further includes at least one of an environmental coefficient Kti of the transmitting station or an environmental coefficient Krj of the receiving station. This arrangement allows more accurate position estimation taking the surrounding environment into account.

The receiving station may have an activation signal generator that generates an activation signal for causing the transmitting station to transmit another ID signal. In this case, the receiving station transmits the activation signal to the transmitting station, and the transmitting station transmits a second ID signal containing a second identifier upon receiving the activation signal.

The transmitting station has a sensor for sensing changes caused by external factors. When detecting any changes, the transmitting station transmits a third ID signal containing a third identifier to the receiving station. Such changes include vibration or acceleration due to externally applied force, and a change in incident light, temperature, humidity and other parameters.

By using the activation signal and/or the sensor, necessary position information can be obtained, taking environmental changes into account, when such position information is actually required (for example, when the receiving station is looking for the transmitting station or when the transmitting station has physically moved to a different place) In addition, the life of the battery is extended because it is unnecessary to shorten the transmission interval of periodic signals.

The receiving station also has a time computation unit that measure a transmission time required to acquire the second ID signal in response to the activation signal. In this case, the positioning computer determines a second correcting formula that defines a relation between a signal propagation time through the air and a distance. The positioning computer then estimates the position of an unknown transmitting station using the second correcting formula and known (or available) position information.

The second correcting formula is expressed as $$p_{ij}=f_1(t_{ij},e_{ij})=t_{ij}-B-g\exp(-h\times e_{ij})=Kd_{ij}=K\sqrt{(u_{i-u_j})^2+(v_{i-v_j})^2} \quad (9)'$$

where $p_{ij}$ is propagation time taken for the ID signal to propagate through the air from the $i^{th}$ transmitting station located at (ui, vi) to the $j^{th}$ receiving station located at (uj, vj), $e_{ij}$ is the intensity of the ID signal received at the $j^{th}$ receiving station, $t_{ij}$ is transmission time required for the $j^{th}$ receiving station to acquire the ID signal in response to the activation signal, $d_{ij}$ is the distance between the $i^{th}$ transmitting station and the $j^{th}$ receiving station, B, g, and h are correcting coefficients, and K is a proportional constant.

With the second correcting formula, the propagation rate of a signal carried by electromagnetic waves or ultrasonic waves is determined based on the actually measured values ($e_{ij}$ and $t_{ij}$), using an approximate function. Consequently, it is not necessary to additionally measure the temperature and the humidity of the air for the correction. In addition, since the relation between the propagation time and the distance is corrected based on the actually measured values, the estimation accuracy is improved even if high-speed operation can not be carried out due to aiming to achieve low power consumption.

The positioning system may include a single fixed-position receiving station (i.e., a first receiving station) and a single moving receiving station (i.e., a second receiving station) in order to reduce the number of the fixed-position receiving stations that function as base stations. This arrangement also allows the system to correctly estimate the position of a transmitting station that has moved away from the communication area of the fixed-position receiving station. In this case, the positioning computer determines at least one of the first and second correcting formulas using position information about a known transmitting station supplied from the fixed (or the first) receiving station. Then, (A) the positioning computer estimates the position of the moving (or the second) receiving station using the correcting formula, as well as signal information transmitted from a known or position-estimated transmitting station and received at the moving receiving station and the position information about the known or position-estimated transmitting station. Furthermore, (B) the positioning computer estimates the position of a transmitting station whose position is unknown (hereinafter, simply referred to as an "unknown transmitting station") using signal information transmitted from the unknown transmitting station and received at the fixed-position receiving station or the moving receiving station at an estimated position, as well as position information about the fixed-position receiving station or the estimated position of the moving receiving station. The positioning computer repeats processes (A) and (B) to successively acquire position information of unknown transmitting stations as the moving receiving station travels.

Another effective structure for reducing the number of receiving stations is employing a single moving station, without using a fixed-position receiving station. In this case, the positioning computer determines at least one of the first and second correcting formulas using position information about transmitting stations whose positions are known, which are supplied from the moving receiving station whose position is unknown. Then, (A) the positioning computer estimates the current position of the receiving station using signal information transmitted from known or position-estimated transmitting stations to the receiving station, position information about the known or position-estimated transmitting stations, and the determined correcting formula(s). Then, (B) the positioning computer estimates the position of an unknown transmitting station using signal information supplied from the unknown transmitting station to the receiving station located at the current position, and position information about the current position of the receiving station. The positioning computer repeats processes (A) and (B) to successively acquire position information of unknown transmitting stations as the moving receiving station travels.

By using a moving receiving station solely or in combination with a fixed-position receiving station, the presence and the positions of multiple transmitting stations can be determined and controlled accurately over a wide area.

As a carrier of the signals transmitted between the transmitting station and the receiving station, electromagnetic waves including radio waves and infrared rays, or sound waves including ultrasonic waves and audible waves can be used. In the specification and claims, the term "sound wave" includes both ultrasonic wave and audible wave. The carriers for the activation signal and the ID signal may be the same as or different from each other.

In the second aspect of the invention, a locating method for determining a position of an object is provided. The method comprises the steps of receiving at a receiving station a first ID signal containing a first identifier of a transmitting station; measuring the intensity of the first ID signal; determining a first correcting formula that defines a relation between intensity and distance; and estimating a position of an unknown transmitting station using the first correcting formula.

Distance $d_{ij}$ from the $i^{th}$ transmitting station located at (xi, yi) to the $j^{th}$ receiving station located at (uj vj) is $$d_{ij}=\sqrt{(x_{i-u_j})^2+(y_{i-v_j})^2} \quad (1)$$

and the first correcting formula is expressed as $$e_{ij}=f_0(d_{ij})=S_1\times\log_{10}(d_{ij})+S_2 \quad (2)'$$

where $e_{ij}$ is the measured intensity, and S1 and S2 are correcting coefficients.

Preferably, the first correcting formula includes at least one of an environmental coefficient Krj for the receiving station and an environmental coefficient Kti for the transmitting station. If the environmental coefficient Krj for the receiving station is used, the first correcting formula is expressed as $$e_{ij}=f_0(d_{ij})=S_1\times\log_{10}(d_{ij})+S_2-K_{rj} \quad (2)''$$

In this case, unknown parameters S1, S2, and Krj are determined based on known position information, and the position of the $i^{th}$ transmitting station is estimated using the determined values of the coefficients.

If the environmental coefficient Kti for transmitting station is used, the first correcting formula is expressed as $$e_{ij}=f_0(d_{ij})=S_1\times\log_{10}(d_{ij})+S_2-K_{ti} \quad (2)'''$$

In this case, unknown parameters S1, S2 and Kti are determined based on known position information, and the position of the $i^{th}$ transmitting station is estimated using the determined values of the coefficients.

A modified first correcting formula may be used. The modified first correcting formula is expressed as $$e_{ij}=f_0(d_{ij})=S_1\times\log_{10}(d_{ij}+S_2) \quad (24)'$$

Preferably, the modified first correcting formula also includes at least one of an environmental coefficient Krj for receiving station and an environmental coefficient Kti for transmitting station, in addition to the correcting coefficients S1 and s2. If using Kri, the modified first correcting formula is expressed as $$e_{ij}=f_0(d_{ij})=S_1\times\log_{10}(d_{ij}+S_2)-K_{rj} \qquad (24)'$$

If using Kti, the modified first correcting formula is expressed as $$e_{ij}=f_0(d_{ij})=S_1\times\log_{10}(d_{ij}+S_2)-K_{ti} \qquad (24)''$$

The locating method further comprises the steps of transmitting an activation signal from the receiving station to the transmitting station; receiving at the receiving station a second ID signal containing a second identifier transmitted in response to the activation signal; and measuring a transmission time "t" required to acquire the second ID signal in response to the activation signal. In this case, the position of an unknown transmitting station is estimated using a second correcting formula that defines a relation between a propagation time "p" of the signal through the air and a distance. The second correcting formula is expressed as $$p_{ij}=f_1(t_{ij},e_{ij})=Kd_{ij}=K\sqrt{(x_{i-u_j})^2+(y_{i-v_j})^2} \qquad (9)''$$

where $d_{ij}$ is a distance from the $i^{th}$ transmitting station located at (xi, yi) to the $j^{th}$ receiving station located at (uj, vj) $p_{ij}$ is a signal propagation time through the air, $t_{ij}$ is a transmission time required to acquire the second ID signal, and K is a proportional constant.

BRIEF DESCRIPTION OF THE DRAWINGS

Other objects, features, and advantages of the invention will become more apparent from the following detailed description when read in conjunction with the accompanying drawings, in which.

DATAILED DESCRIPTION OF THE EMBODIMENTS

The present invention will now be described in detail with reference to the attached drawings.

[First Embodiment]

Figure 1:
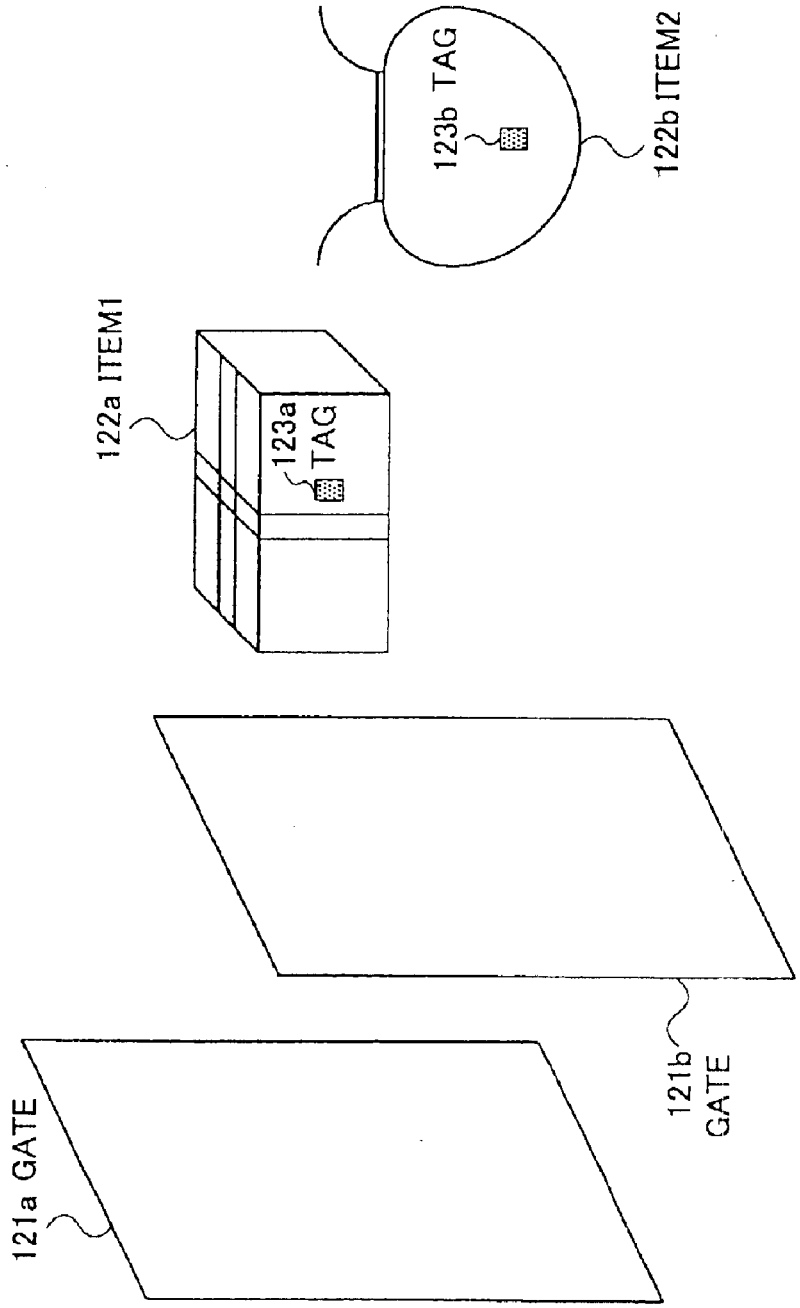
FIG. 1 illustrates a conventional passive tag system using a gate.
Figure 2:
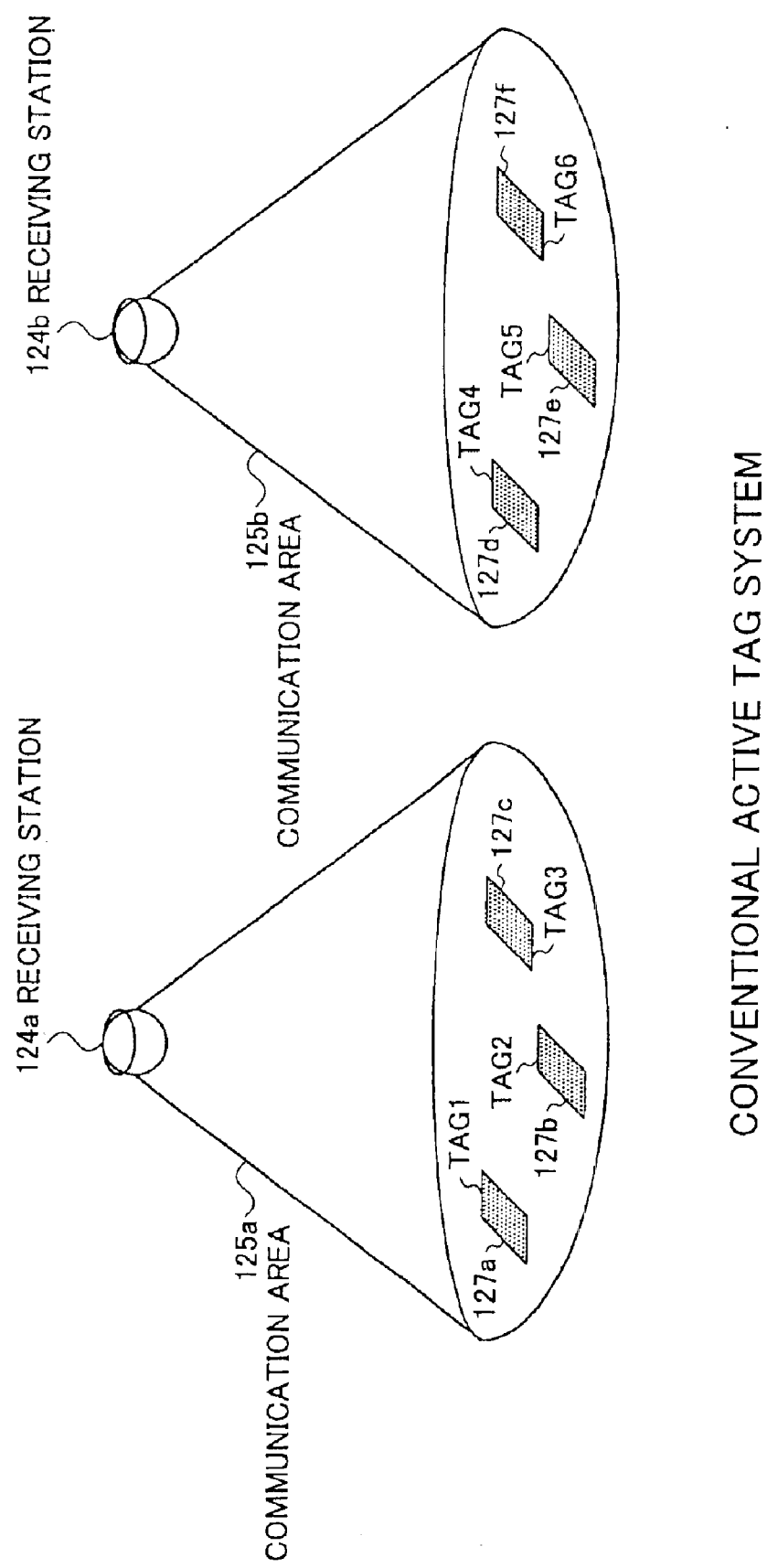
FIG. 2 illustrates a conventional active tag system.
Figure 3:
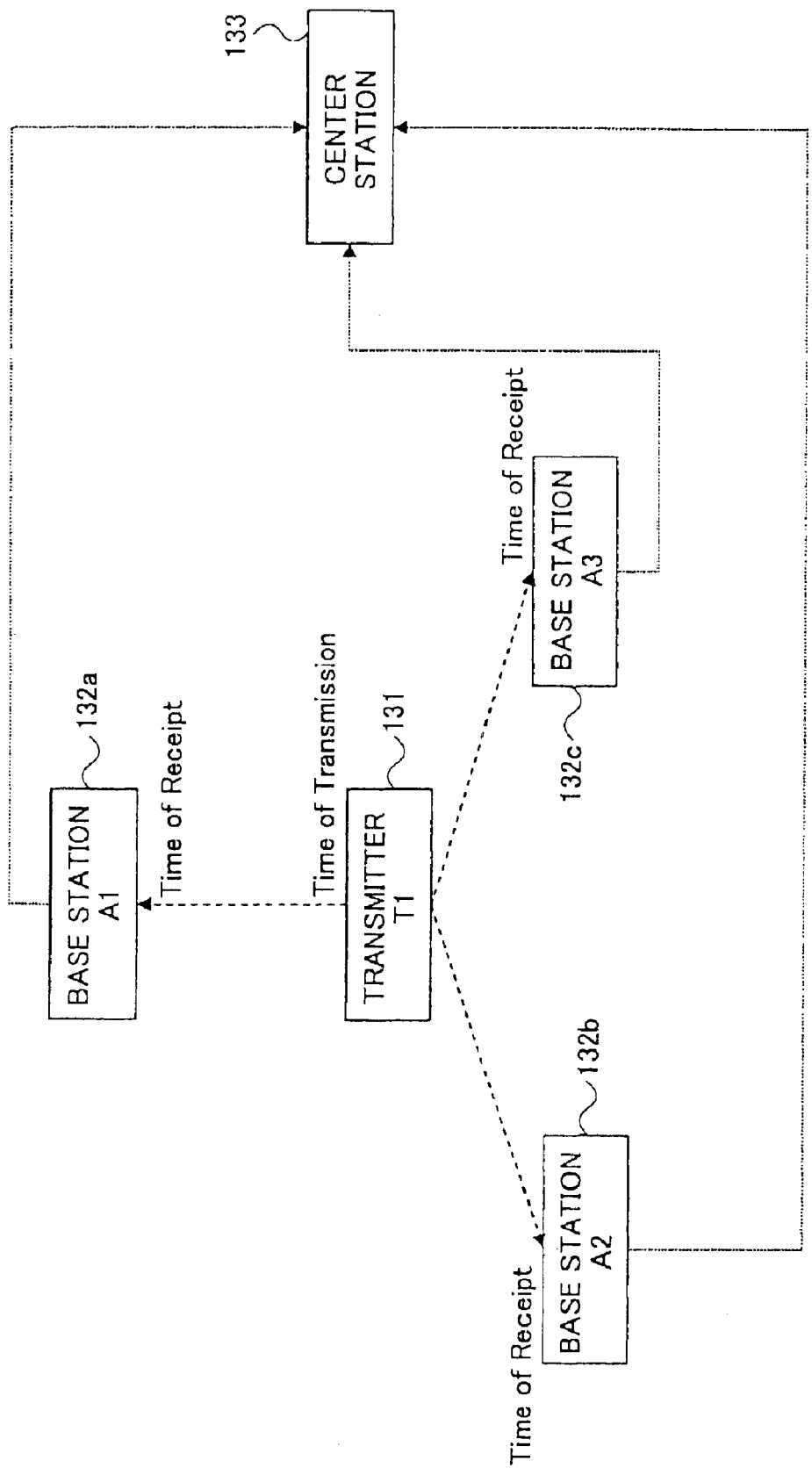
FIG. 3 illustrates a conventional locating system using time information.
Figure 4:
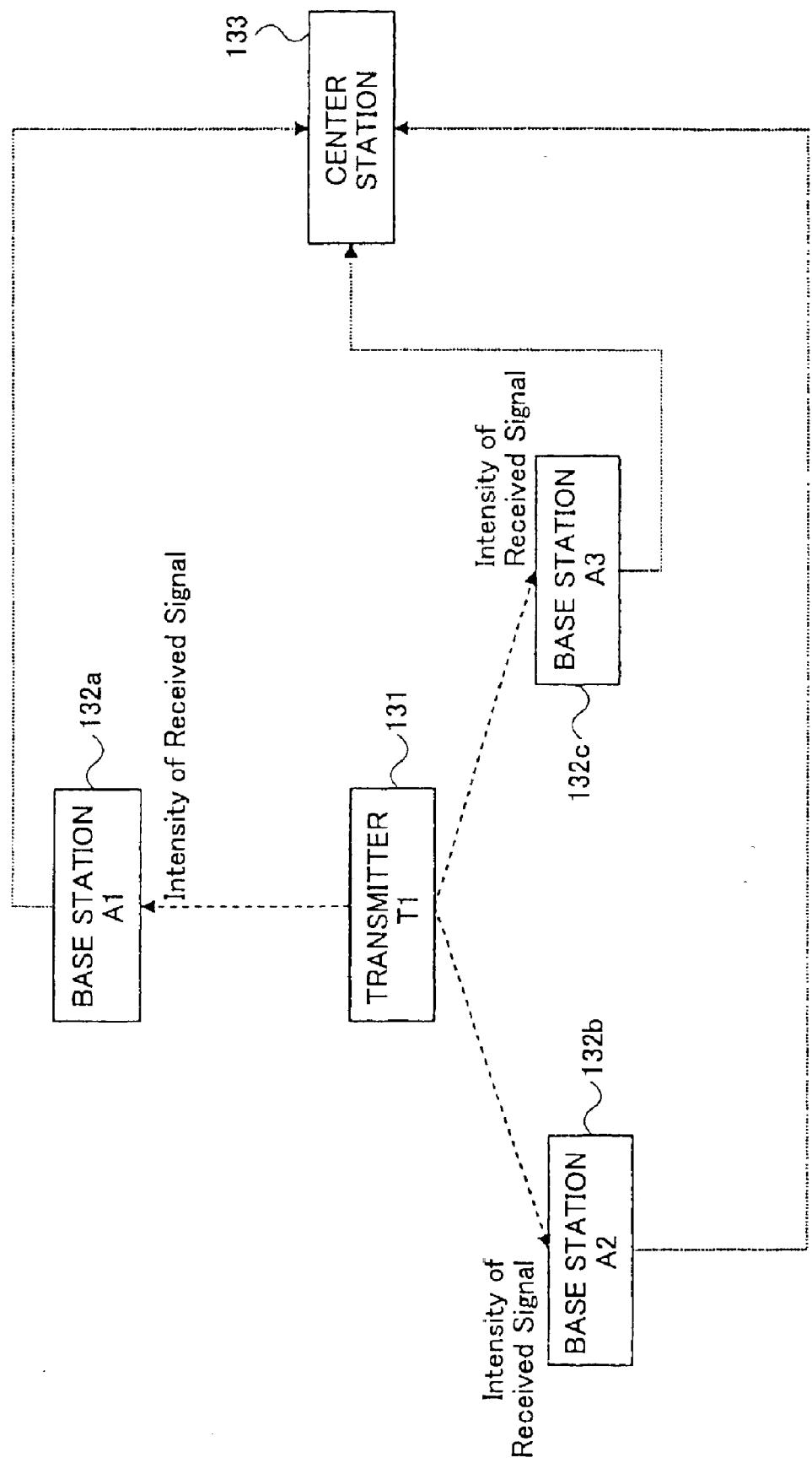
FIG. 4 illustrates a conventional locating system using the intensities of received signals.
Figure 5:
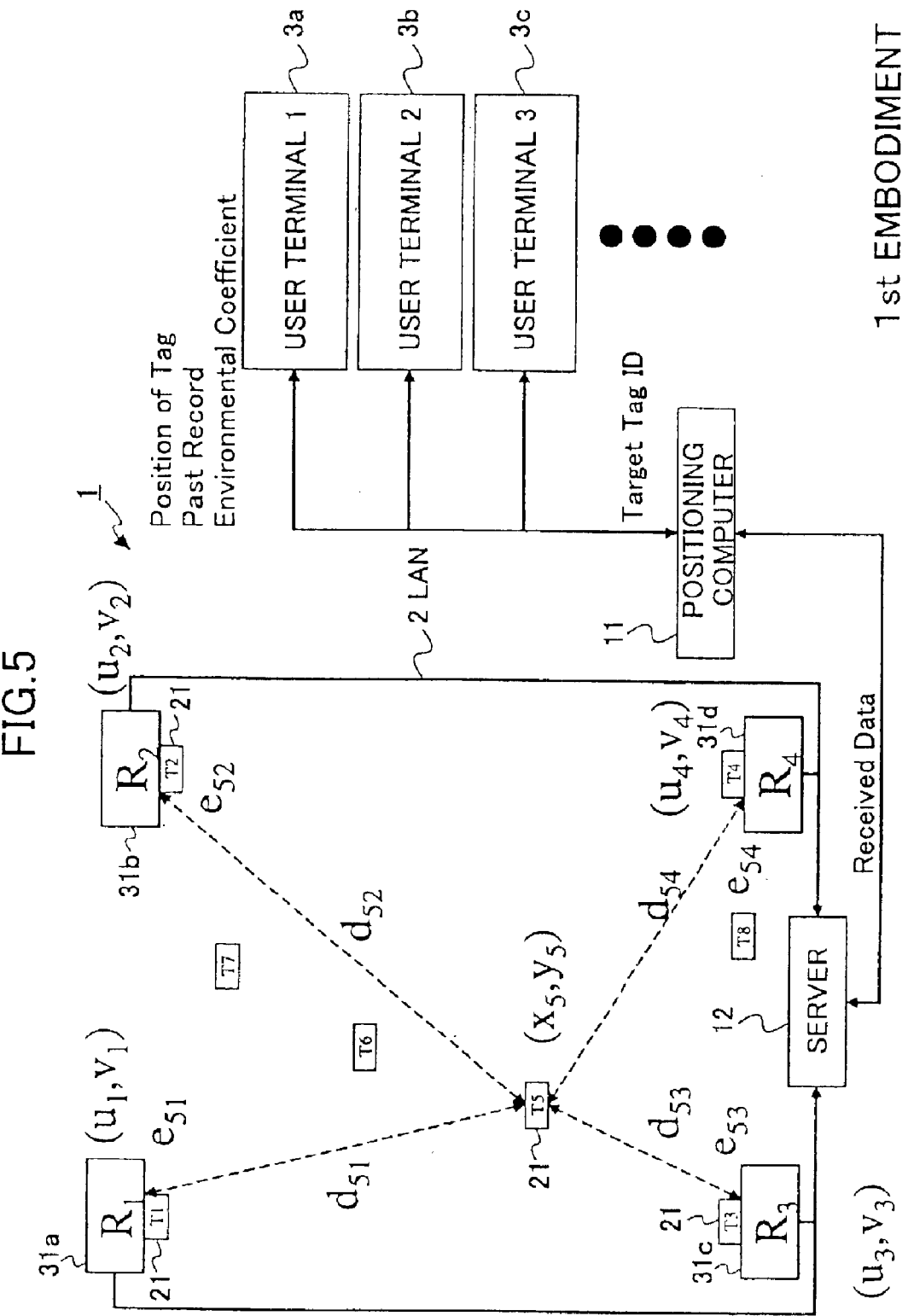
FIG. 5 illustrates a locating system according to the first embodiment of the invention.
Figure 6:
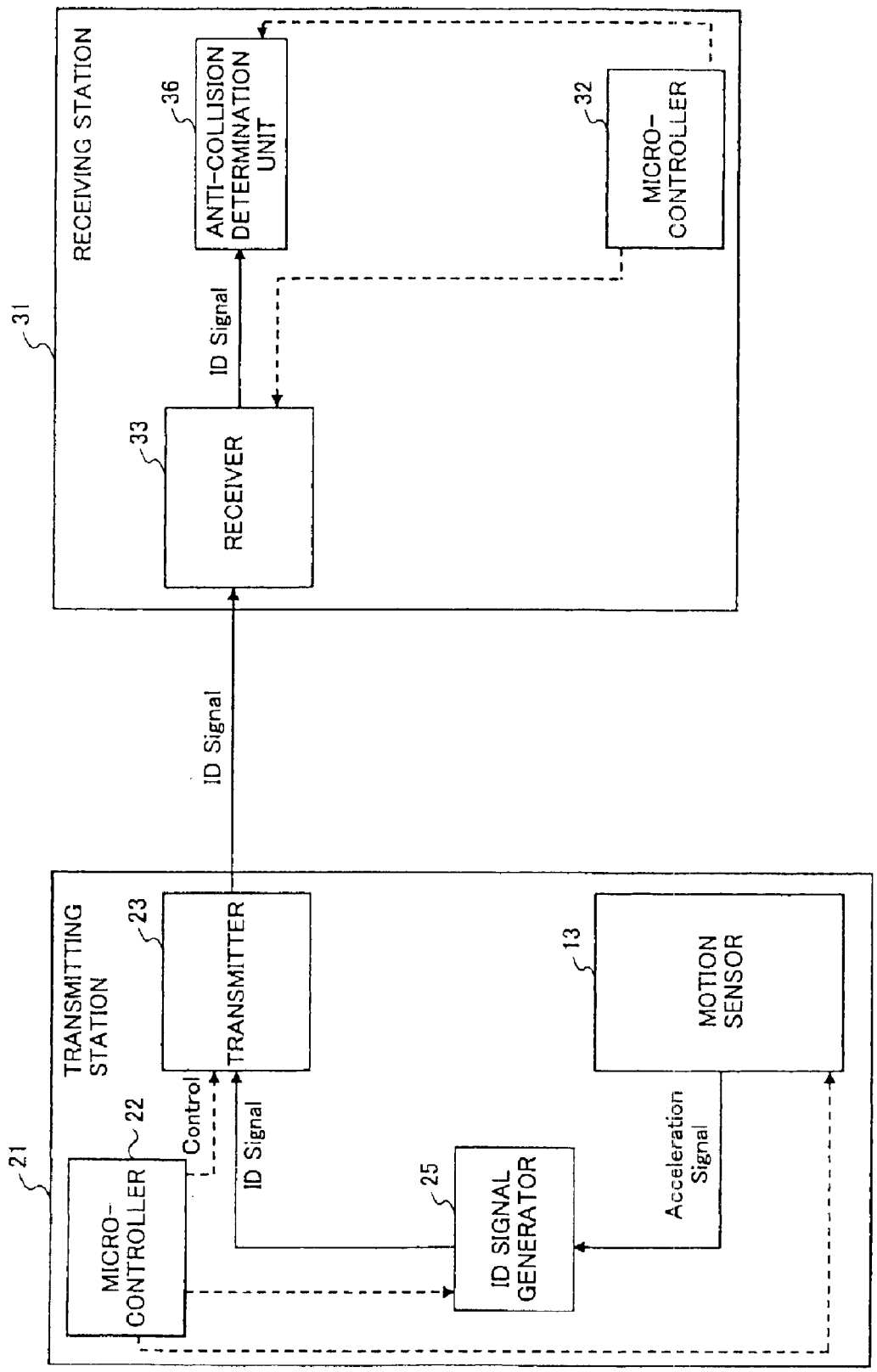
FIG. 6 illustrates the structures of the transmitting station and the receiving stations used in the locating system of the first embodiment.

FIG. 5 schematically illustrates an example of the locating system 1 according to the first embodiment of the invention, and FIG. 6 illustrates the transmitting station 21 and the receiving station 31 used in the locating system 1. The locating system 1 includes transmitting stations 21 (T1–T8), receiving stations 31 (R1–R4), a server 12 connected to the receiving stations 31 and functioning as a data management unit, and a positioning computer 11 connected to the server 12. The locating system 1 also includes user terminals 3a–3c connected to the positioning computer 11. These components are connected to one another via LAN 2.

In the example shown in FIG. 5, the receiving stations 31 (R1–R4) are fixed, and their positions are known. The transmitting stations T1–T4 are attached to the receiving stations R1–R4, respectively, and therefore, the positions of the transmitting stations T1–T4 can be regarded the same as those of the receiving stations R1–R4. The positions of the transmitting stations T5–T8 are unknown. The position of the $j^{th}$ receiving station, which is known in advance, is (uj, vj), and unknown position of the $i^{th}$ transmitting station is expressed as (xi, yi). Each transmitting station 21 transmits a unique signal, and the receiving stations 31 receive the signals from the transmitting stations 21. The intensity of the signal transmitted by the $i^{th}$ transmitting station and received at the $j^{th}$ receiving station is expressed as $e_{ij}$. The distance between the $i^{th}$ transmitting station and the $j^{th}$ receiving station is expressed as $d_{ij}$. For example, the distance from transmitting station T5 positioned at (x5, y5) to receiving station R1 is d51, and the intensity of the signal transmitted by T5 and received at R1 is e51.

The transmitting station 21 has a microcontroller 22, a transmitter 23, an ID signal generator 25, and a motion sensor 13. The ID signal generator 25 periodically generates an ID signal containing a unique identifier (ID) of that transmitting station 21. The ID signal generator also generates an ID signal containing the identifier when the motion sensor 13 senses any motion of the transmitting station.

Figure 7:
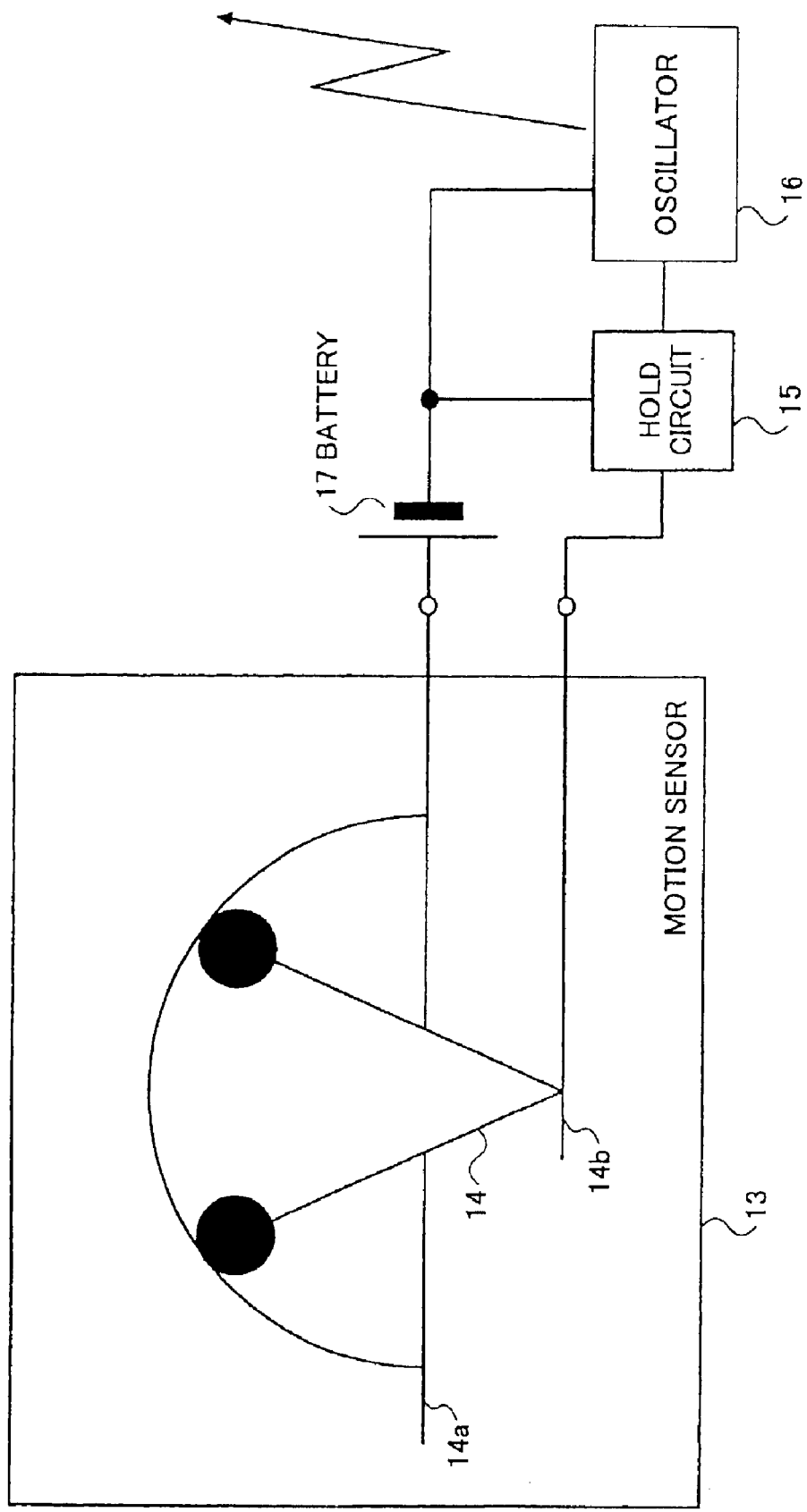
FIG. 7 illustrates an example of the motion sensor used in the transmitting station shown in FIG. 6.

An example of motion sensor 13 is illustrated in FIG. 7. In this example, the motion sensor 13 includes an acceleration sensor using an inverted pendulum 14, and a hold circuit 15 is connected to the motion sensor 13. The hold circuit 15 is also connected to the oscillator 16 of the transmitting station 21, and it turns on the battery 17 of the oscillator 16 for a few minutes only when the electrodes 14a and 14b of the motion sensor 13 come into contact with each other (or alternatively, when they separate from each other).

The hold circuit 15 has a function of setting a long oscillation period, regardless of the ON/OFF operation of the motion sensor (acceleration sensor) 13. This function is effective for constantly controlling the position of the transmitting station 21. The oscillation period does not have to be perfectly constant. By randomly varying the oscillation period by several percentages over period, signal being simultaneously transmitted from different stations can be avoided. The motion sensor 13 allows the transmitting station 21 to set the oscillation period long because the periodic ID signal does not have to be transmitted frequently when the transmitting station 21 is stationary. This arrangement can reduce power consumption and extend the life of the battery. In addition, the log file can be made smaller.

All of the transmitting stations T1–T8 may employ the same structure as shown in FIG. 6, or alternatively, two different types of transmitting stations may be used. In the latter case, the motion sensor 13 is provided to the transmitting stations T5–T8 whose positions are unknown, while the fixed transmitting stations T1–T4 simply have a short-period oscillating function without the motion sensor 13.

Returning to FIG. 6, the receiving station 31 has a microcontroller 32, a receiver 33, and an anti-collision determination unit 36. The receiver 33 receives signals, and measures the intensities of the received signals. The receiver 33 then supplies the received signals to the anti-collision determination unit 36 which reads (or extracts) the identifiers from the received signals. The receiving station 31 supplies the intensities of the received signals and the corresponding identifiers, together with time stamps to the server 12. The server 12 records and stores each of the intensities in association with the corresponding identifier and time stamp. Time stamps may be created by the server 12 when the server 12 receives signal information from the receiving station 31.

The positioning computer 11 estimates the position of transmitting station T5 (in example shown in FIG. 5) using information about this transmitting station stored in the server 12. The estimation result is also stored in the server 12. The user can obtain the position of the transmitting station T5 by inputting the identifier of this transmitting station through the user terminal 3 to be retrieved in the server 12.

The positioning computer 11 determines a first correcting formula defining a relation between intensity and distance in order to accurately estimate the position of either a transmitting station or a receiving station under the indoors environment. As has been described above, the intensity $e_{ij}$ of a received signal is actually measured at a receiving station under the indoors propagation condition. The positioning computer 11 determines the relation between the intensity $e_{ij}$ and the distance $d_{ij}$ from the transmitting station 21 to the receiving station 31 using the actually measured values. The first correcting formula is a corrected Friis' formula using correcting coefficients including environmental coefficients. Since the distance, and therefore, the positional coordinates of a transmitting station are estimated based on the actually measured value taking the correcting factors into account, the positioning accuracy is improved even indoors.

The algorithm using a corrected Friis' formula (that is, the first correcting formula) will be explained in detail below. For the sake of simplicity, explanation will be made using two-dimensional coordinates below; however, the positioning computer 11 estimates positions using three-dimensional (special) coordinates in actual use.

<Algorithm of Corrected Friis' Formula>

If a known position of the $j^{th}$ receiving station is (uj,vj) and if a position of the $i^{th}$ transmitting station is (xi,yi), then the distance between the $i^{th}$ transmitting station and the $j^{th}$ receiving station is expressed by Equation (1).

$$d_{ij}=\sqrt{(x_{i-u_j})^2+(y_{i-v_j})^2} \qquad (1)$$

Then, environmental coefficient Krj for the $j^{th}$ receiving station is defined. Environmental coefficient Krj is an index indicating how the sensitivity of the receiving station changes from the ideal condition. Similarly, environmental coefficient Kti for the $i^{th}$ transmitting station is defined.

First, the Friis' formula is corrected using correcting coefficients S1, S2, and an environmental coefficient Krj to define a relation between distance "d" and intensity "e", on the assumption that distance and intensity are in the logarithmic relation. The corrected formula is expressed as $$e_{ij}=S_1 \times \log_{10}(d_{ij})+S_2-K_{rj} \qquad (2)$$

This corrected formula is referred to as a first correcting formula.

The coefficients S1, S2, and Krj are determined using known information. In the example shown in FIG. 5, these coefficients (i.e., unknown parameters) are determined using the measured intensities $e_{ij}$ of the signals received from transmitting stations T1–T4 whose positions are known (because they are attached to the fixed-position receiving stations R1–R4). The corresponding distances $d_{ij}$ are also known. The solutions for these unknown parameters that minimize the error can be obtained by minimizing estimation function "q" given by Equation (3).

$$q = \sum_{j=1}^{rn} \sum_{i=1}^{tn} \left( e_{ij} - \hat{S}_1 \log_{10}(d_{ij}) - \hat{S}_2 + \hat{K}_{rj} \right)^2 \quad (3)$$

where rn denotes the number of receiving stations at known positions, and tn denotes the number of transmitting stations at known positions. In the example of FIG. 5, both rn and tn are four (4), and sixteen (16=4×4) simultaneous equations stand. Consequently, six unknowns (S1, S2, Kr1–Kr4) are all solved. To clarify the explanation, the unknowns are marked with an arc above the symbols in Equation (3).

There are many methods for solving Equation (3). Although detailed explanation for these methods will not be made, for example, partially differentiating function q with respect to each variable, and the numerical solutions that make the respective partial differentials zero can be obtained by, for example, the Newton method. Alternatively, the simplex method, the steepest descent method (or saddle point method), methods using neural networks can be used. Using any one of these methods, the correcting coefficients S1 and S2 and the environmental coefficient Krj can be determined.

If the number of transmitting stations or receiving stations at known positions is insufficient and adequate equations do not simultaneously stand, then only the correcting coefficients S1 and S2 are used in the first correcting formula without using environmental coefficient Krj. Even without the environmental coefficient, a satisfactory correcting effect can be achieved.

Next, environmental coefficient Kti for a target transmitting station whose position is unknown (simply referred to as "unknown transmitting station") will be introduced. Although the transmitting intensity at a transmitting station is constant, the environmental coefficient varies depending on the location, and therefore, the intensity of the received signal varies. Accordingly, an environmental coefficient for transmitting station is introduced. For example, the intensity of a signal received at a known receiving station (e.g., R1) from an unknown transmitting station (e.g, T5) is expressed using environmental coefficient Kt5, in addition to the correcting coefficients S1 and s2, and environmental coefficient Kr1. By introducing the environmental coefficient Kti for a transmitting station, a distance $md_{ij}$ derived from the measured intensity is expressed as Equation (4).

$$md_{ij} = 10^{(e_{ij} - S_2 + K_{rj} + K_{ti})/S_1} \quad (4)$$

Now, the position and the environmental coefficient Kti of the target (unknown) transmitting station "i" are determined by minimizing estimation function hi expressed as Equation (5).

$$h_i = \sum_{j=1}^{m} \left( 10^{(e_{ij} - S_2 + K_{rj} + \hat{K}_{ti})/S_1} - \sqrt{(\hat{x}_i - u_j)^2 + (\hat{y}_i - v_j)^2} \right)^2 \quad (5)$$

The unknowns in Equation (5) are marked with an arc above the symbols for clarification. Using the above-described method, the position of an unknown transmitting station can be estimated accurately even if the number of fixed-position receiving station is not so large.

The estimated position of the transmitting station is stored in the server 12. As has been explained, in order to check the position of a target transmitting station, the user (or the manager) simply inquires of the server 12 via LAN 2 by inputting the identifier of the target transmitting station through the user terminal 3.

Next, a situation in which a transmitting station is located at an obstructed place will be considered. Even through a transmitting station is located within a communicable area of a receiving station from a viewpoint of loss in free space, the signal transmitted from that transmitting station may not be received at the receiving station when the transmitting station is obstructed with respect to that receiving station. In this case, it may appear that the receiving station does not have information about that transmitting station.

However, not receiving a signal from a specific transmitting station means that this specific transmitting station is located at a disadvantageous (or farther) position as compared with those transmitting stations whose signals are received. Accordingly, the fact that a signal from a specific transmitting station can not be received is worth while as information for position estimation. Therefore, the locating system according to the invention makes use of such obstructed information as a restrictive condition.

For example, a signal from transmitting station T2 is received at receiving stations R1, R2, and R3, but is not received at R4. In this case, restrictive conditions d21<d24
d22<d24
d23<d24 are added. Thus, even unknown information is not discarded, and instead, it is effectively used in position estimation.

The positioning computer 11 repeatedly estimates and updates positions of transmitting stations using update information. As has been described above, each transmitting station 21 has a motion sensor 13, and transmits' an ID signal when it physically moves. With this arrangement, the current position of a transmitting station is estimated and stored in the server 12 even if the interval of periodic signals is long.

Figure 8:
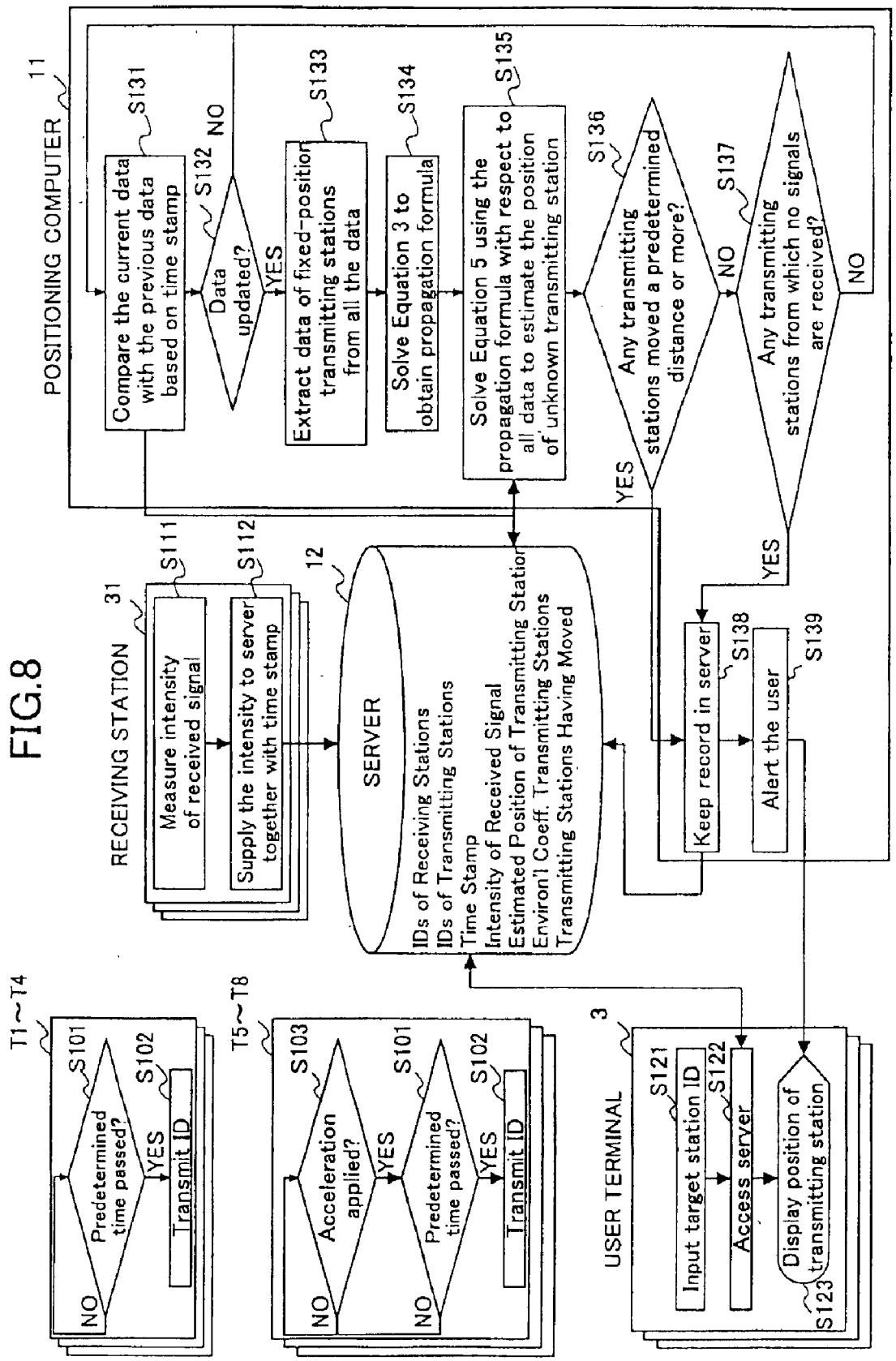
FIG. 8 illustrates operation flows of the locating system according to the first embodiment.

FIG. 8 illustrates an example of operation flows of the locating system according to the first embodiment of the invention. Each of the transmitting stations T1–T4 fixed to the receiving stations R1–R4 transmits a periodic ID signal at a predetermined time interval (S101 and S102). On the other hand, in each of the unfixed transmitting stations T5–T8, the microcontroller 22 monitors the motion sensor 13 to determine whether or not acceleration has been applied to the transmitting station (S103). If acceleration has been applied (YES in S103) and a predetermined time has passed (YES in S101), the transmitting station transmits an ID signal containing a unique identifier.

The receiving station 31 receives ID signals from the respective transmitting stations and measures the intensities of the received ID signals (S111). Then, the receiving station 31 supplies the measured intensities and corresponding time stamps to the server 12 (S112). The identifiers of the transmitting stations read from the ID signals and the identifier of the receiving station itself are also supplied to the server 12. Time stamps may be created at the server 12 when receiving the information from the receiving station 31.

The positioning computer 11 checks time stamps in data stored in the server 12 and compares the current data with the previous data (S131) to determine if the current data has been updated (S132). If there are data updated from the previous ones (YES in S132), data of fixed-position transmitting stations (T1–T4 in example shown in FIG. 5), the positions of which are known in advance, are extracted from all the updated data (S133). Then, coefficients S1, S2 and environmental coefficient Krj are determined so as to minimize Equation (3) and the first correcting (propagation) formula is determined (S134). Then, Equation (5) is solved with respect to all the data about unfixed transmitting stations (T5–T8) to estimate the positions of these transmitting stations, and the estimation results are stored in the server 12, together with the environmental coefficient Kti of the transmitting stations (S135). The estimated positions are compared with the previous results to select those transmitting stations whose positions have been changes a predetermined value or more (YES in S136) and those transmitting stations whose signals were not received at any of the receiving stations (YES in S137). The data of the selected transmitting stations are recorded in the server 12 (S138), and an alert message is supplied to the associated user terminal (S139).

An example of a data structure for recording signal information supplied from the receiving stations in the server 12 is shown in Table 1, and an example of a data structure for recording the estimation results supplied from the positioning computer 11 in the server 12 is shown in Table 2. In Tables, "RS ID" stands for receiving station identifier, and "TS ID" stands for transmitting station identifier.

TABLE 1

DATA STRUCTURE OF SIGNAL INFORMATION
SUPPLIED FROM RECEIVING STATION

| RS ID | TS ID | TIME STAMP | INTENSITY |
|-------|-------|------------|-----------|
| 0001  | 0015  | 16:3:20    | 24        |

TABLE 2

DATA STRUCTURE OF ESTIMATION RESULTS
SUPPLIED FROM POSITIONING COMPUTER

| TS ID | TIME STAMP | ESTIMATION (X, Y) | ENV'L COEFF. |
|-------|------------|-------------------|--------------|
| 0015  | 17:22:21   | 11.95, 9.25       | 32.4         |

Environmental coefficient Kti reflects the environment surrounding a transmitting station, and it provides useful information when actually trying to determine the location of the transmitting station. If the environmental coefficient is large, it indicates that the transmitting station is located at an obstructed place with respect to the receiving station. If the environmental coefficient is small, the transmitting station is located at an open space or an unobstructed place. Adding such environmental information to the estimated position allows the user to actually find the target transmitting station.

The user terminal 3 has a function of receiving an alert message supplied from the positioning computer 11, as well as a function of retrieving the position of a target transmitting station. The user inputs the identifier (ID) of the target transmitting station into the user terminal (S121). The user terminal accesses the server 12 through LAN 2 (in the example shown in FIG. 5), or alternatively via radio wave (S122). The past record about the target transmitting station is retrieved in the server 12, and the corresponding time stamp, position information, environmental coefficient of the transmitting station are displayed on the user terminal (S123). The user can obtain the position of the transmitting station at a time described by the time stamp, and can estimate whether the transmitting station is located at an open space from the value of the environmental coefficient Kti. Furthermore, by checking the record over a certain period of time, the user can determine when acceleration was applied (which means when the transmitting station moved).

As has been described above, the locating system according to the first embodiment uses the first correcting formula, and accurately estimates the positions of multiple transmitting stations simultaneously using actually measured signal intensities and known position information.

Figure 9:
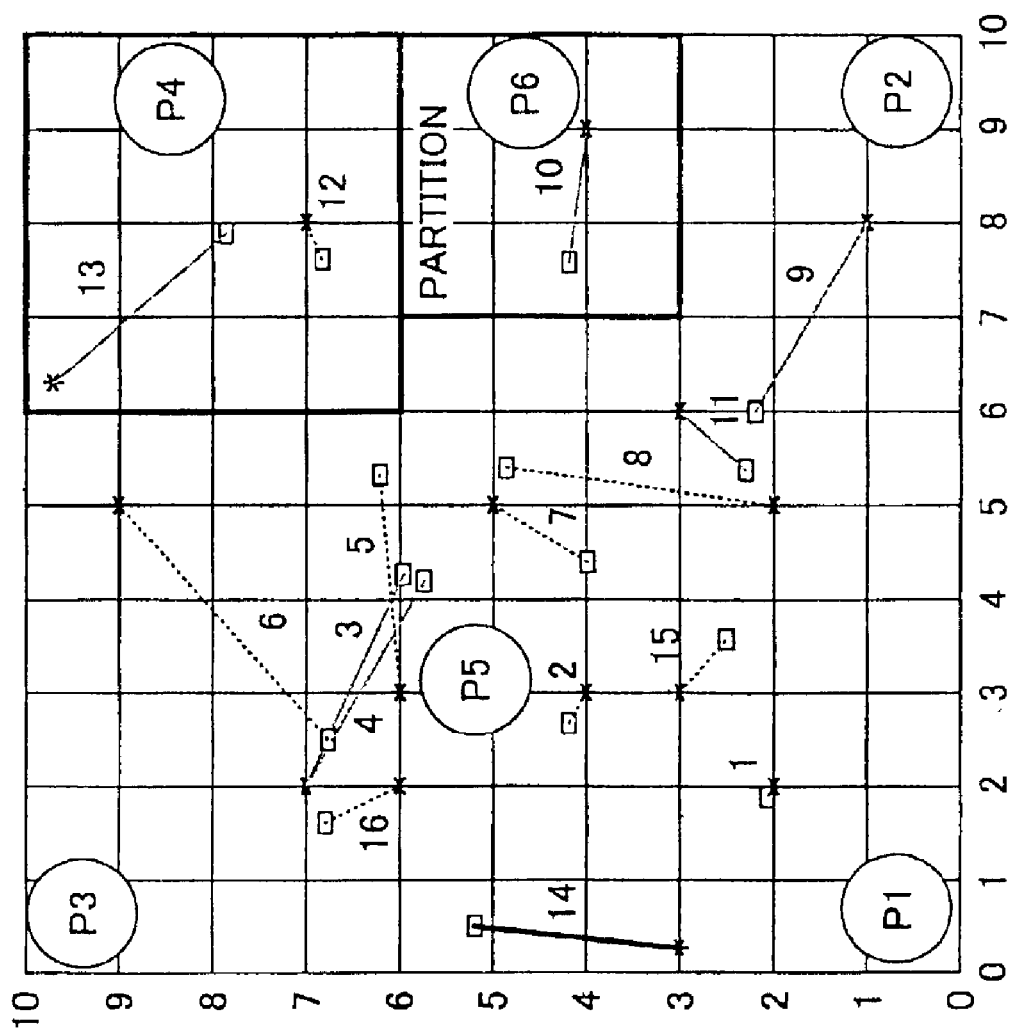
FIG. 9 illustrates the measuring result of the positions of transmitting stations using the locating system according to the first embodiment.

FIG. 9 illustrates the position estimation result using the locating system 1 of the first embodiment. Receiving stations are fixed at positions P1–P6. The positions of transmitting stations (1 through 16) are estimated using the information supplied from these receiving stations. The actual positions of the transmitting stations are marked with *, and the estimated positions are marked with white rectangles. The lines connecting the actual positions to the corresponding estimated positions represent the signal propagation condition. The dashed line indicates a good condition, and the bold line indicates a bad condition. The square in the graph is a unit area on the floor, and a side is 1.35 m.

From this estimation result, the minimum error was only 13.5 cm, and the maximum error is about 4.5 m. The root-mean-square error is 2.3 m, and the error for the transmitting stations 1, 2 and 12, which are located under a relatively good propagation condition, is within 1 m. By carrying out the operation flow of the positioning computer 11 shown in FIG. 8 using the first correcting formula, the positions of multiple transmitting stations can be estimated at high accuracy taking the environmental factors into account.

Although the explanation has been made using an example of a transmitting station or a tag as the object (or the target) of position estimation, the target is not limited to a transmitting station. For example, equipment having both the transmitting function and the receiving function, such as cellular phones or mobile terminals, may be used as the target. In this case, the transmitting function of such equipment is utilized for specifying the position of a person who holds the equipment.

[Second Embodiment]

Figure 10:
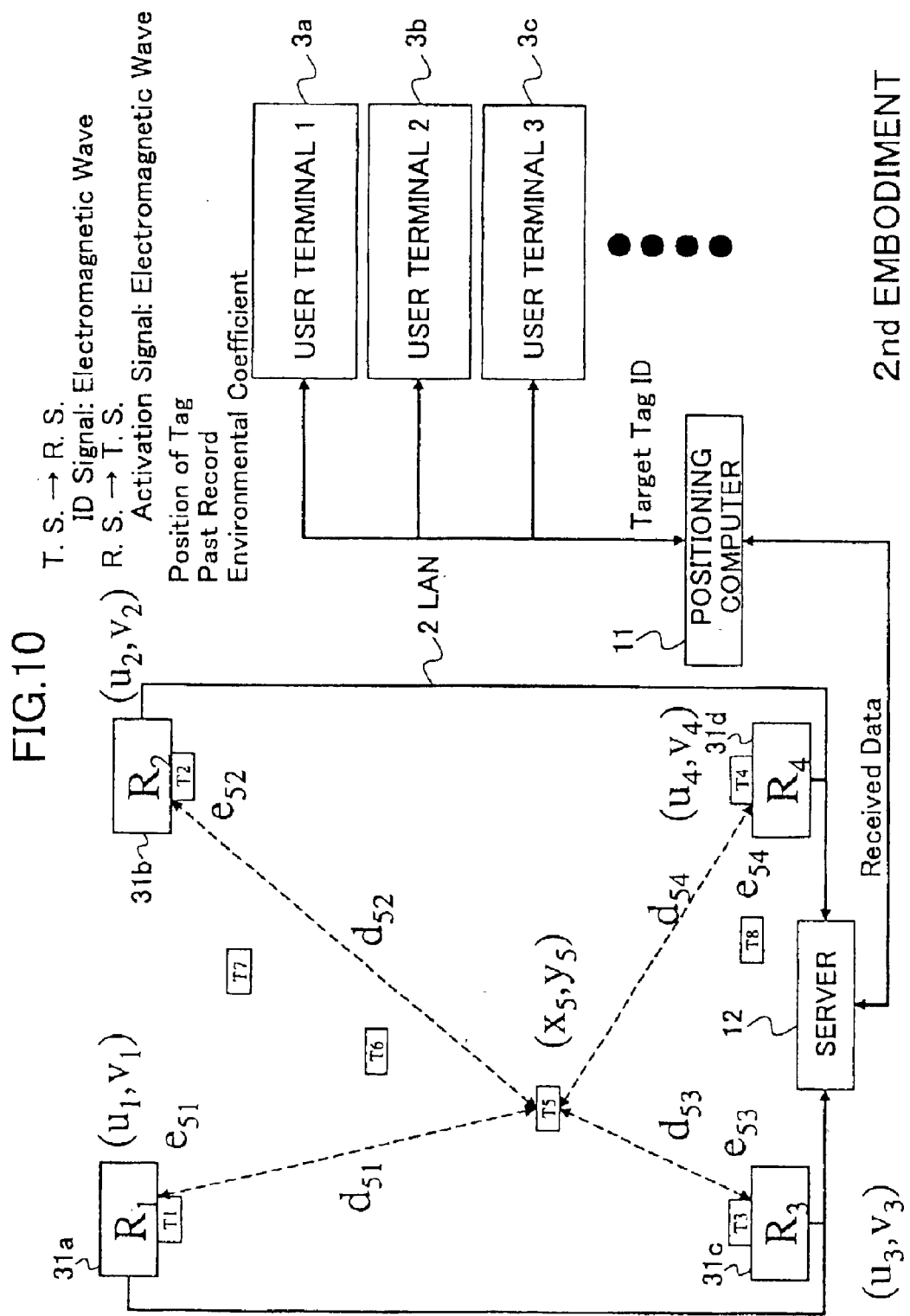
FIG. 10 illustrates a locating system according to the second embodiment of the invention.
Figure 11:
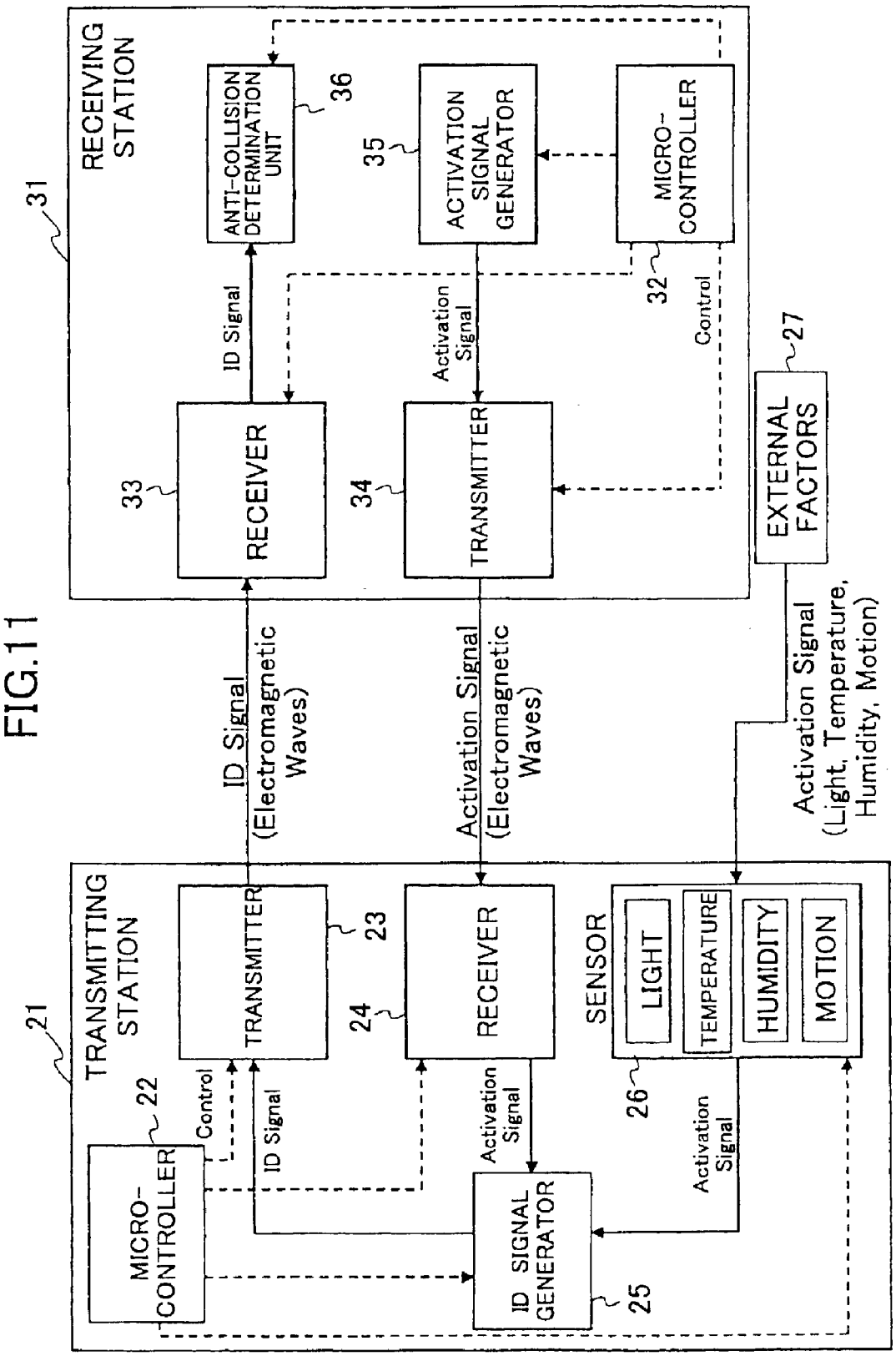
FIG. 11 illustrates the structures of the transmitting station and the receiving station used in the locating system of the second embodiment.

FIG. 10 illustrates a schematic diagram of the locating system according to the second embodiment of the invention, and FIG. 11 illustrates the transmitting station 21 and the receiving station 31 used in the second embodiment. In the second embodiment, the receiving station periodically transmits an activation signal to the transmitting station. The transmitting station transmits an ID signal, which is different from the spontaneously generated ID signal, upon receiving the activation signal. Accordingly, the transmitting station generates three different kinds of ID signals, that is, (1) a periodic signal (i.e., the first ID signal) spontaneously generated by, for example, a built-in oscillator, (2) a signal (i.e., the second ID signal) generated in response to the activation signal, and (3) a signal (i.e., the third ID signal) generated when detecting a change due to external factors.

In the example shown in FIG. 10, both the activation signal and the ID signal are transmitted via electromagnetic waves. The configuration of the system, in which the receiving stations R1–R4, the server 12, the positioning computer 11, and the user terminals 3a–3c are mutually connected via LAN 2, and the operation of the user terminal are the same as those in the first embodiment, and explanation for them will be omitted.

The transmitting station 21 has a microcontroller 22, a transmitter 23, an ID signal generator 25, and a sensor 26. The ID signal generator 25 periodically generates an ID signal containing a unique identifier (ID) of that transmitting station 21. The microcontroller 22 controls the operation of the transmitting station 21, and has built-in memories, such as ROM and RAM. The receiver 24 receives the activation signal transmitted from the receiving station and supplies the activation signal to the ID signal generator 25. The sensor 26 detects changes in various parameters, which are caused by external factors 27, and supplies the detection result to the ID signal generator 25. The ID signal generator 25 generates the above-described three kinds of ID signals (1) in a periodic manner at a relatively long interval, (2) when receiving the activation signal from the receiving station, and (3) when detecting a change. In this regard, the change detected by the sensor 26 may function as an activation signal to cause the ID signal generator to produce an identifier; however, it must be distinguished from the activation signal generated and transmitted by the receiving station.

The sensor 26 detects not only acceleration (or a change in motion), but also environmental changes, such as a change in incident light, temperature, humidity, and other factors. For example, when a transmitting station (or a tag attached to an item) moves from a dark place (such as a stack room) to a bright place, the sensor 26 operates and causes the transmitting station to transmit an ID signal. This ID signal is received at the receiving stations, and the intensities measured at the respective receiving stations are supplied to the server 12. Consequently, the positioning computer 11 estimates the new position of the transmitting station that has moved to the bright place to updates the position information. Another example is when a transmitting station moves from an air-conditioned place to a non-conditioned place, the sensor 26 detects a change in temperature and humidity and causes the transmitting station to transmit an ID signal. The sensor 26 is realized by a combination of a light sensor, a temperature sensor, a humidity sensor, a motion sensor, and other types of sensors.

Preferably, the transmitting station 21 has a function of setting a long oscillation period, regardless of the ON/OFF operation of the sensor 26 for the purpose of effective control of the position of the transmitting station 21. The oscillation period does not have to be perfectly constant. By randomly varying the oscillation period with a width of several percents of the period, signal being transmitted simultaneously from different stations can be avoided.

The receiving station 31 has a microcontroller 32, a receiver 33, a transmitter 34, an activation signal generator 35, and an anti-collision determination unit 36. The microcontroller 32 controls the operation of the receiving station 31 and has built-in memories, such as ROM and RAM. The activation signal generator 35 generates an activation signal in a periodic manner. The receiver 33 receives first through third ID signals and measures the intensities of the respective signals. The anti-collision determination unit 36 reads the identifiers (first, second, and third identifiers) from the respective types of ID signals. The receiving station 31 then supplies the intensities of the received signals and the corresponding identifiers, together with time stamps to the server 12. The server 12 records and stores each of the intensities in association with the corresponding identifier and time stamp. Time stamps may be created by the server 12 when the server 12 receives the signal information from the receiving station 31.

Figure 12:
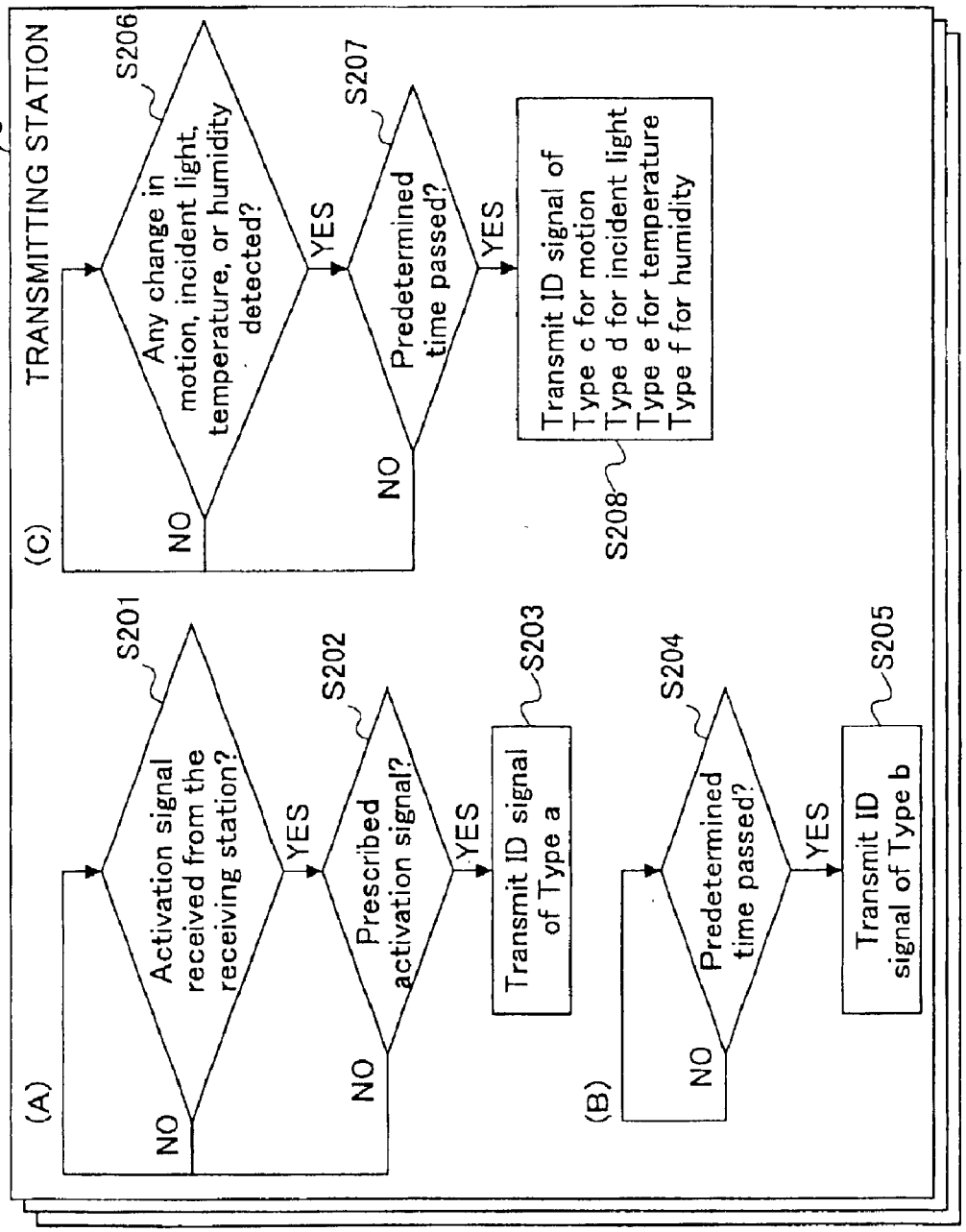
FIG. 12 illustrates the operation flow of the transmitting station according to the second embodiment.

FIG. 12 illustrates the operation flow of the transmitting station 21 according to the second embodiment of the invention. The transmitting station 21 generates and transmits different kinds of ID signals with different identifiers depending on the situations.

(A) When receiving an activation signal from the receiving station (YES in S201), it is confirmed whether the activation signal is an expected prescribed activation signal (S201). If it is the expected activation signal (YES in S201) the ID signal generator 25 generates a type-a ID signal containing an identifier of type a, which is transmitted to the receiving station (S203).

(B) The transmitting station also transmits a type-b ID signal in a periodic manner every predetermined time interval (S204 and S205).

(C) In addition, when the sensor 26 detects a change due to external factors (YES in S206), it is confirmed if a predetermined amount of time has passed (S207). If a predetermined time has passed (YES in S207), the transmitting station transmits another type of ID signal depending on what kind of change has been detected (S208). In the example shown in FIG. 12, a type-c ID signal is transmitted when acceleration or a change in motion has been sensed, and a type-d ID signal is transmitted when the sensor 26 detects a change in incident light. Similarly, type-e and type-f ID signals are transmitted when detecting changes in temperature and humidity, respectively. In this example, the third ID signal generated by the sensor output contains different types of identifiers corresponding to the environmental factors.

By causing the transmitting station to transmit an ID signal in response to the activation signal, the position of that target transmitting station can be estimated when it is actually required, without consuming the battery power of the transmitting station. By causing the transmitting station to generate different types of ID signals depending on the detected changes, the change in the environment surrounding the transmitting station can be known, and consequently, the estimation accuracy and efficiency are improved.

Figure 13:
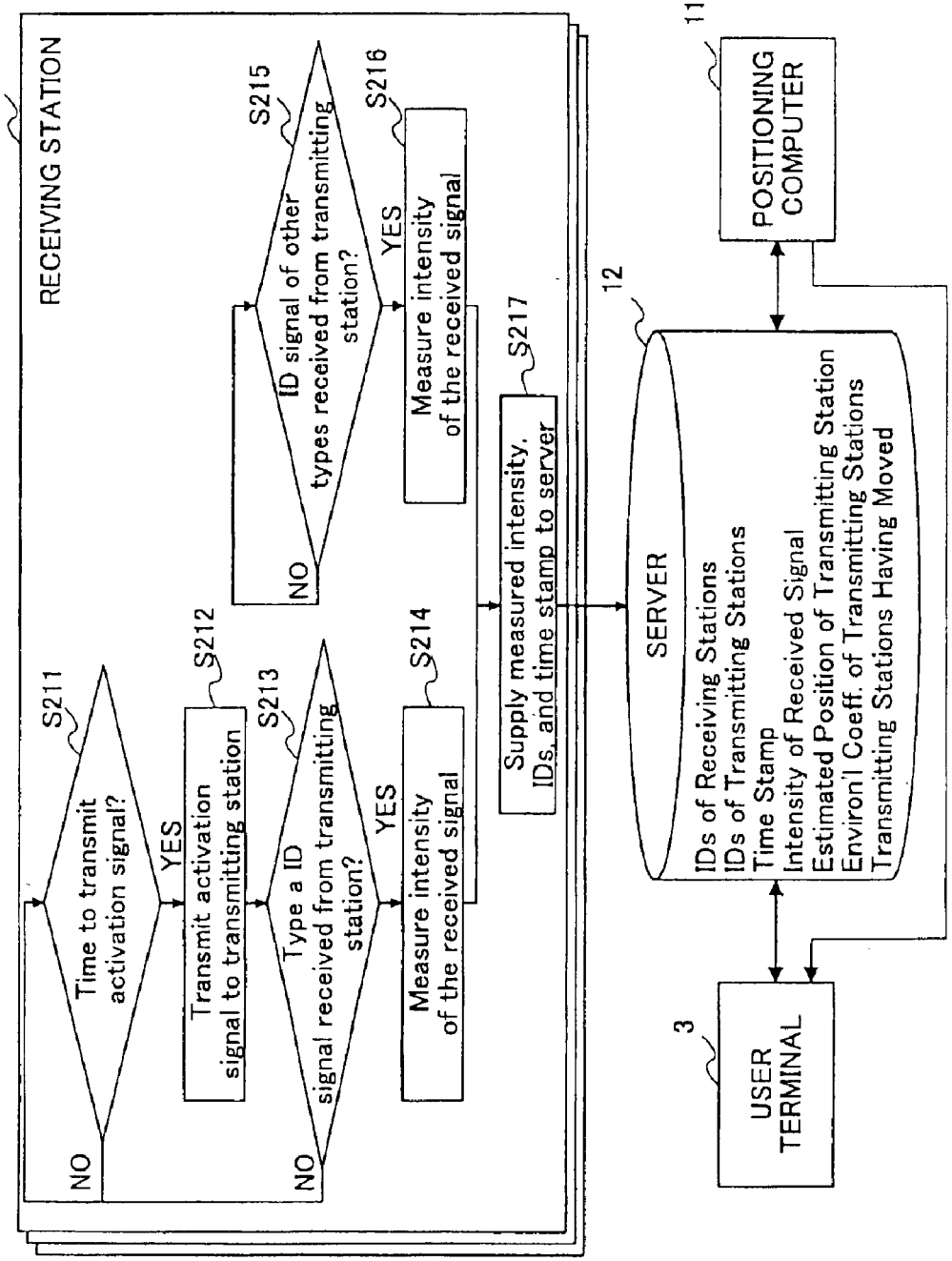
FIG. 13 illustrates the operation flow of the receiving station according to the second embodiment.

FIG. 13 illustrates the operation flow of the receiving station 31 according to the second embodiment of the invention. When transmission of an activation signal is required (YES in S211), the receiving station 31 transmits an activation signal to the transmitting station (S212). Whenever the receiving station receives an ID signal in response to the activation signal, it is determined whether the received signal is of a type-a (S213). If a type-a ID signal is received in response to the activation signal (YES in S213), the intensity of the type-a ID signal is measured (S214). The receiving station also receives other types of ID signals from transmitting stations regardless of the activation signal. Accordingly, it is determined whether other types of ID signals have been received (S215). If other types of ID signals have been received (YES in S215), the intensities of these ID signals are measured (S216), and the identifiers are read from the ID signals. The intensities measured in steps S214 and S216 are supplied to the server 12, together with the time stamps, the identifiers read from the ID signals, and the identifier of the receiving station itself. The time stamp may be created by the server 12 when the signal information is received by the server 12.

Figure 14:
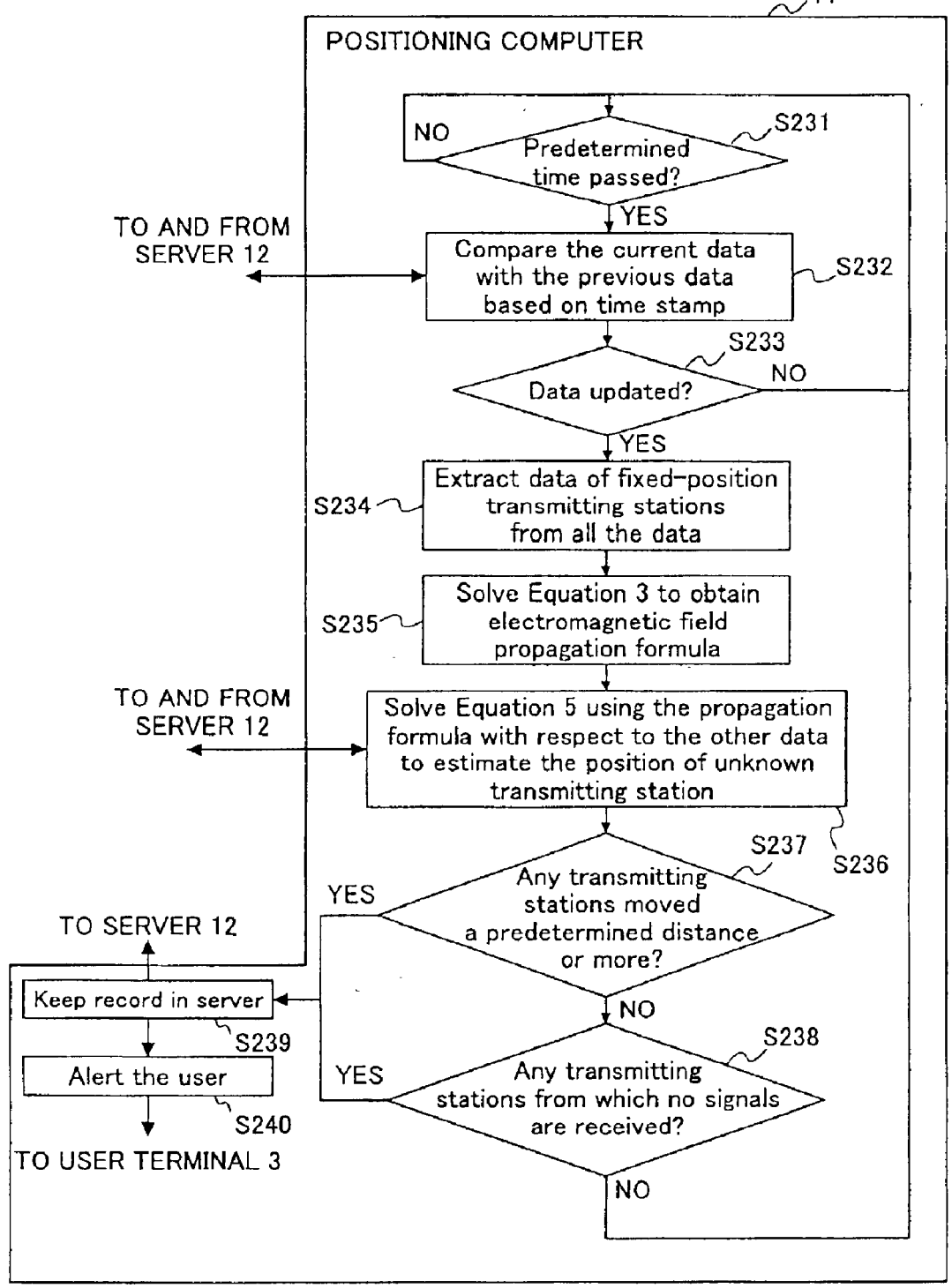
FIG. 14 illustrates the operation flow of the positioning computer according to the second embodiment.

FIG. 14 illustrates the operation flow of the positioning computer 11 according to the second embodiment of the invention. The positioning computer 11 checks time stamps of data stored in the server 12 and determines whether a predetermined amount of time has passed (S231). The positioning computer also compares the current data with the previous data (S232) to determine if the current data have been updated (S233) If there are data elements updated from the previous ones (YES in S233), data of fixed-position transmitting stations (T1–T4 in example shown in FIG. 14) whose positions are known in advance are extracted from all the updated data (S234).

Using the data of the fixed-position transmitting stations, a first correcting formula $$e_{ij} = S_1 \times \log_{10}(d_{ij}) + S_2 - K_{rj} \quad (2)$$

that defines a relation between intensity (or propagation characteristic of the electromagnetic field) $e_{ij}$ and distance $d_{ij}$ is determined. To be more precise, correcting coefficients S1, S2 and environmental coefficient Krj are determined so as to minimize Equation (3) (S235)

$$q = \sum_{j=1}^{m} \sum_{i=1}^{m} \left( e_{ij} - \hat{S}_1 \log_{10}(d_{ij}) - \hat{S}_2 + \hat{K}_{rj} \right)^2. \quad (3)$$

Then, the relation defined by Equation (4) is assumed for the other (unknown) transmitting stations T5–T8, and Equation (5) is solved using the determined formula, with respect to the data of unfixed transmitting stations (T5–T8), to estimate the positions of these transmitting stations (S236).

$$md_{ij} = 10^{(e_{ij} - S_2 + K_{rj} + K_{ti})/S_1} \quad (4)$$

$$h_i = \sum_{j=1}^{m} \left( 10^{(e_{ij} - \hat{S}_2 + \hat{K}_{rj} + \hat{K}_{ti})/\hat{S}_1} - \sqrt{(\hat{x}_i - u_j)^2 + (\hat{y}_i - v_j)^2} \right)^2 \quad (5)$$

The estimated positions are stored in the server 12. The estimated positions are compared with the previous results to select those transmitting stations whose positions have been changes a predetermined value or more (YES in S237) and those transmitting stations whose signals were not received at any of the receiving stations (YES in S238). The data of the selected transmitting stations are recorded in the server 12 (S239), and an alert message is supplied to the associated user terminal (S240).

Examples of data structures in the server 12 of the second embodiment are shown in Tables 3 and 4. Table 3 shows a data structure of storing signal information supplied from receiving stations, and Table 4 shows a data structure of storing the estimation results supplied from the positioning computer 11.

TABLE 3

DATA STRUCTURE OF SIGNAL INFORMATION SUPPLIED FROM RECEIVING STATION

| RS ID | TS ID | ID TYPE | TIME STAMP | INTENSITY |
|-------|-------|---------|------------|-----------|
| 0001  | 0015  | c       | 16:33:10   | 24        |

TABLE 4

DATA STRUCTURE OF ESTIMATION RESULTS SUPPLIED FROM POSITIONING COMPUTER

| TR ID | ID TYPE | TIME STAMP | ESTIMATION (X, Y) | ENV'L COEFF. |
|-------|---------|------------|-------------------|--------------|
| 0015  | c       | 17:22:21   | 11.95, 9.25       | 32.4         |

Environmental coefficient Kti reflects the environment surrounding a transmitting station, and it provides useful information when actually trying to determine the location of the transmitting station. If the environmental coefficient is large, it indicates that the transmitting station is located at an obstructed place with respect to the receiving station. If the environmental coefficient is small, the transmitting station is located at an open space or an unobstructed place. Adding such environmental information to the estimated position allows the user to actually locate the target transmitting station.

Since in the second embodiment different types of identifiers are conferred on ID signals depending on factors causing ID signals to be generated, estimation accuracy for unknown transmitting stations is further improved as compared with the first embodiment. In addition, a type-a ID signal is generated in response to the activation signal, which is supplied from the receiving station in this embodiment. Consequently, the time interval for transmitting a periodic ID signal (i.e., type-b ID signal) can be made longer. This arrangement can reduce the power consumption of the transmitting station.

Information of not receiving a signal from a certain transmitting station can be effectively used as a restrictive condition, as in the first embodiment. For example, a signal from transmitting station T2 is received at receiving stations R1, R2, and R3, but is not received at R4. In this case, restrictive conditions d21<d24
d22<d24
d23<d24 are added. Thus, even unknown information is not discarded, and instead, it is effectively used in position estimation. The transmitting station is not limited to a tag, and a transmitting function of a radio device, such as a cellular phone and a mobile terminal, may be utilized.

<Modification 1>

Figure 15:
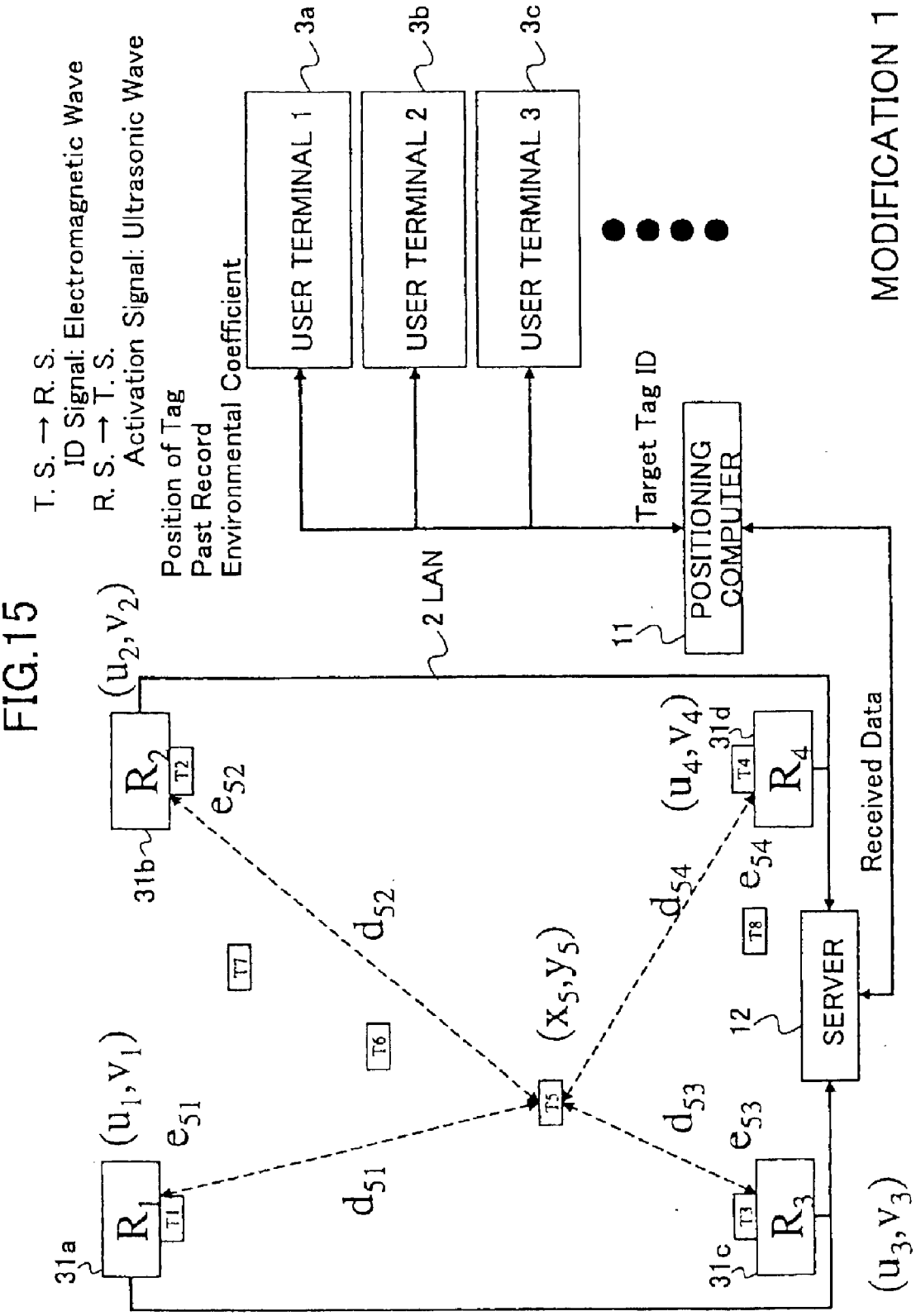
FIG. 15 illustrates a first modification of the locating system of the second embodiment.
Figure 16:
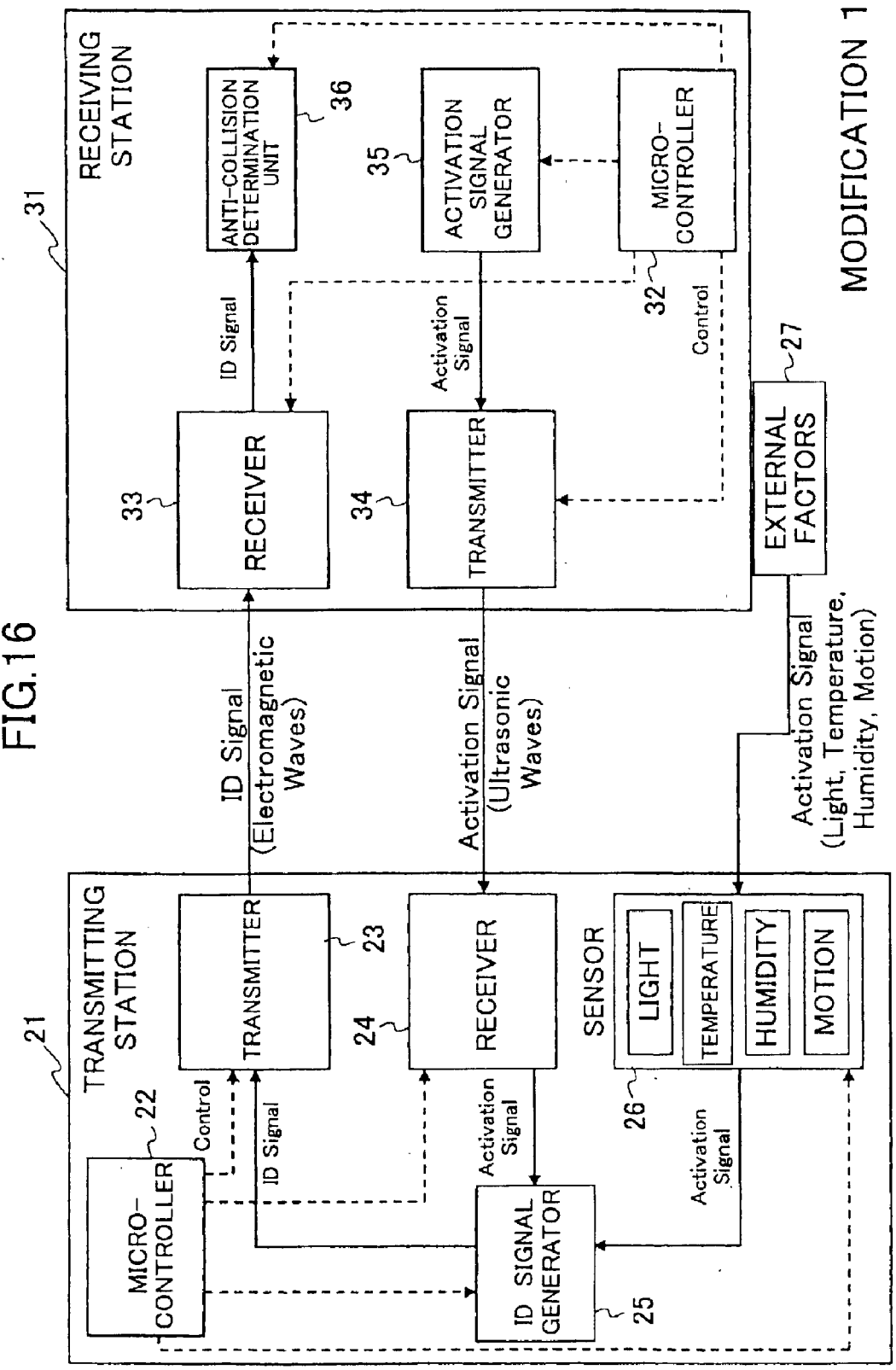
FIG. 16 illustrates the structures of the transmitting station and the receiving station used in the first modification shown in FIG. 15.

FIGS. 15 and 16 illustrate a first modification (Modification 1) of the locating system of the second embodiment. In Modification 1, the receiving station 31 transmits activation signals via ultrasonic waves, while the transmitting station 21 generates and transmits a type-a ID signal via electromagnetic waves (e.g., radio waves) when receiving the activation signals. The other structure of the transmitting station 21 is the same. Accordingly, when sensing any changes caused by external factors, the transmitting station 21 generates ID signals containing different types of identifiers corresponding to the kinds of detected changes.

When receiving an ID signal from the transmitting station 21, the receiving station 31 measures the intensity of the ID signal and reads the identifier. The measured intensity and the identifiers of the transmitting station and the receiving station itself are supplied to the server 12, together with time stamps. (Time stamps may be created by the server 12.)

The positioning computer 11 uses a correcting algorithm as to the relation between propagation characteristic of the electromagnetic field (i.e., the intensity of a received ID signal) and distance. The operation flow of the positioning computer 11 is the same as that shown in FIG. 14.

<Modification 2>

Figure 17:
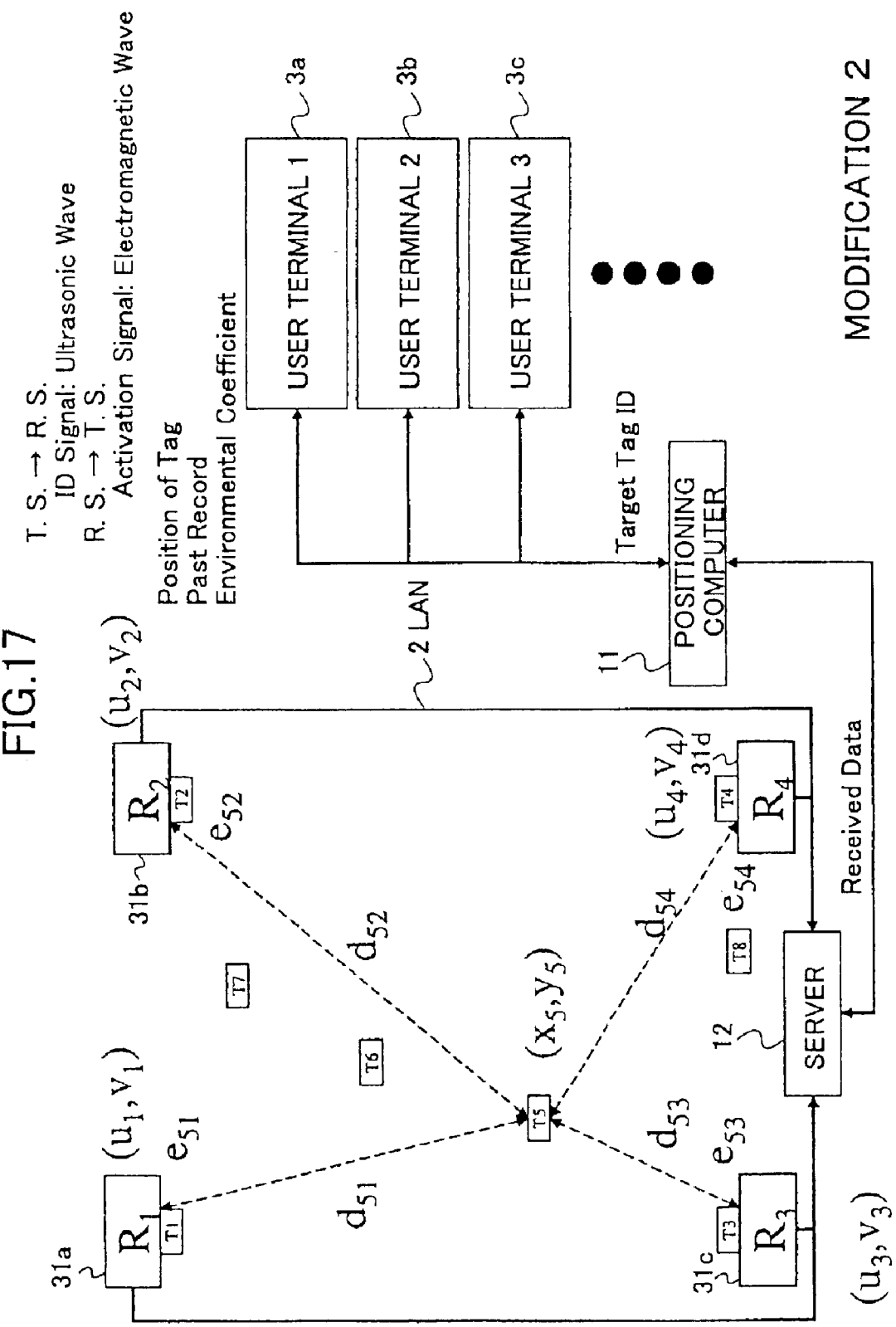
FIG. 17 illustrates a second modification of the locating system of the second embodiment.
Figure 18:
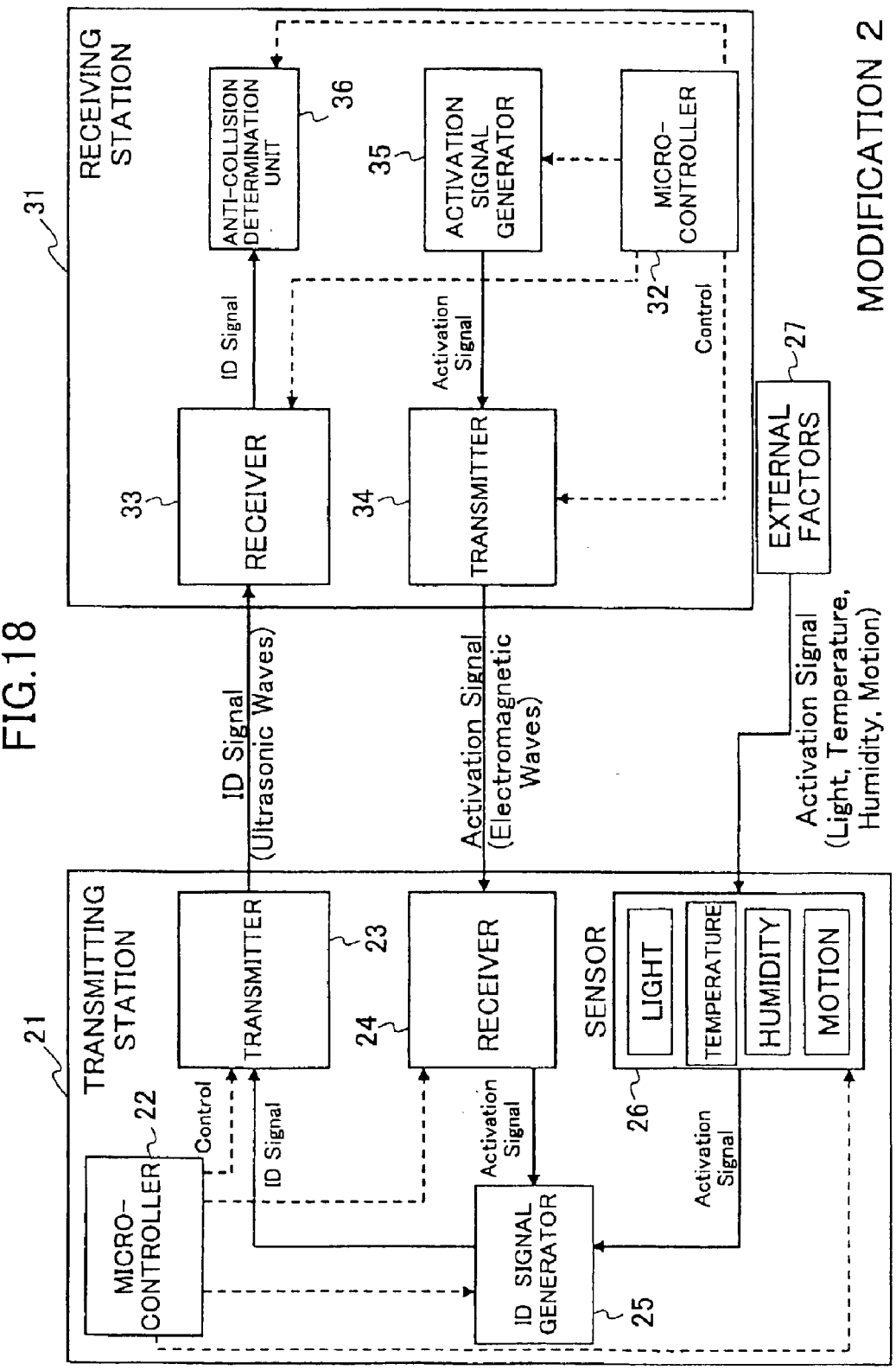
FIG. 18 illustrates the structures of the transmitting station and the receiving station used in the second modification shown in FIG. 17.

FIGS. 17 and 18 illustrate a second modification (Modification 2) of the second embodiment. In Modification 2, the receiving station 31 transmits activation signals via electromagnetic waves, while the transmitting station 21 generates and transmits type-a ID signals via ultrasonic waves in response to the activation signals.

The receiving station 31 measures the intensity of the ID signal carried by ultrasonic waves, reads the identifier, and supplies the measured intensity and the identifier to the server 12. The positioning computer 11 determines a first correcting formula defining a relation between propagation characteristics of ultrasonic wave (i.e., intensity) and distance, and estimates the position of an unknown transmitting station using the determined formula according to the algorithm shown in FIG. 14. The algorithm shown in FIG. 14 is equally applicable to signals carried by electromagnetic waves and ultrasonic waves.

Accordingly, when a signal is transmitted from an $i^{th}$ transmitting station at (xi, yi) via ultrasonic waves and received at a $j^{th}$ receiving station at (uj,vj), the intensity $e_{ij}$ of the ultrasonic signal is measured at the $j^{th}$ receiving $i^{th}$ station. The distance between the $i^{th}$ transmitting station and the $j^{th}$ receiving station is expressed by Equation (1).

$$d_{ij} = \sqrt{(x_i - u_j)^2 + (y_i - v_j)^2} \quad (1)$$

Then, a first correcting formula defining a relation between the intensity of an ultrasonic signal and distance is determined using the actually measured intensity and known position information. The intensity of an ultrasonic signal propagating through the air attenuates as the distance increases because of a spherical diffusion loss due to diffraction and an energy loss absorbed by the medium (i.e., the air). Accordingly, the intensity of an ultrasonic signal has a logarithmic relation with a distance, and Equation (2) is defined.

$$e_{ij} = S_1 \times \log_{10}(d_{ij}) + S_2 - K_{rj} \quad (2)$$

where S1, S2 are correcting coefficients and Krj is an environmental coefficient for the receiving station. The environmental coefficient Krj is an index indicating how the sensitivity of the receiving station changes from the ideal condition.

At this stage, the intensity $e_{ij}$ is the intensity of the ultrasonic signal transmitted from each of the transmitting stations T1–T4 whose positions are known in advance and measured at a receiving station "j". The solutions for the unknown parameters (S1, S2, and Krj) that minimize an error are obtained by minimizing an estimation function q expressed by Equation (3).

$$q = \sum_{j=1}^{m} \sum_{i=1}^{tn} \left(e_{ij} - \hat{S}_1 \log_{10}(d_{ij}) - \hat{S}_2 + \hat{K}_{rj}\right)^2 \quad (3)$$

where rn is the number of known receiving stations, and tn is the number of known transmitting stations. In order to solve all the unknows, rn×tn≧rn+2 must stand. In the example shown in FIG. 17, rn is four, and tn is four. Therefore, all the unknowns can be solved.

Then, an environmental coefficient Kti for the transmitting station is introduced, and the relation defined by Equation (4) is assumed for the other (unknown) transmitting stations T5–T8, using the determined values of S1, S2 and Krj.

$$md_{ij} = 10^{(e_{ij} - S_2 + K_{rj} + K_{ti})/S_1} \quad (4)$$

where $md_{ij}$ is a distance derived from the measured intensities of the ultrasonic signals. The position of an unknown transmitting station "i" and the environmental coefficient Kti are determined by minimizing an estimation function hi expressed by Equation (5), as in the case using electromagnetic waves.

$$h_i = \sum_{j=1}^{m} \left(10^{(e_{ij} - \hat{S}_2 + \hat{K}_{rj} + \hat{K}_{ti})/\hat{S}_1} - \sqrt{(\hat{x}_i - u_j)^2 + (\hat{y}_i - v_j)^2}\right)^2 \quad (5)$$

The estimated positions are stored in the server 12. Unknown information about an ultrasonic signal that is not received at a certain receiving station is used as a restrictive condition.

Figure 19:
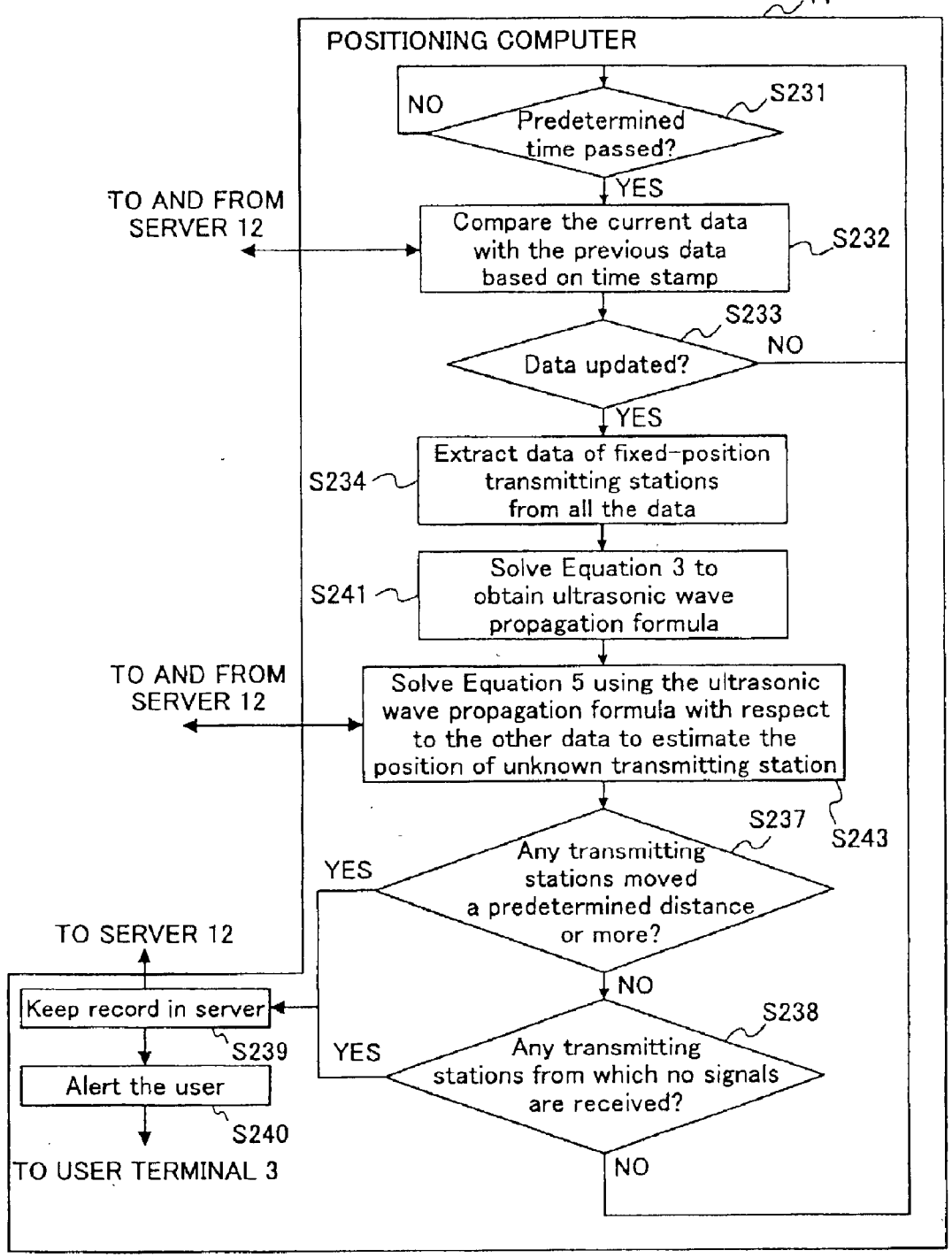
FIG. 19 illustrates the operation flow of the positioning computer used in the second modification.

FIG. 19 illustrates the operation flow of the positioning computer 11 in Modification 2. The same steps as those in FIG. 14 using electromagnetic waves are denoted by the same numerical references. The positioning computer 11 checks time stamps of data stored in the server 12 and determines whether a predetermined amount of time has passed (S231). This step is carried out in order to prevent overlooking because the transmitting station operates discontinuously, and because ID signals may not be received due to signal overlap. If a predetermined time has passed (YES in S231), the positioning computer 11 compares the current data with the previous data on time-stamp-basis for each type of identifier (S232). If there are data elements updated from the previous ones (YES in S233) data of fixed-position transmitting stations (T1–T4 in example shown in FIG. 19) whose positions are known in advance are extracted from all the updated data (S234).

Then, Krj, S1, and S2 that minimize Equation (3) are obtained to determine the first correcting formula as to the relation between the ultrasonic wave propagation characteristic and distance (S241). Using the determined formula about the ultrasonic wave propagation characteristic, the positions of unknown transmitting stations are estimated by solving Equation (5) with respect to data of the other transmitting stations (T5–T8) (S243). The estimated positions are stored in the server 12.

The estimated positions are compared with the previous results to select those transmitting stations whose positions have been changes a predetermined value or more (YES in S237) and those transmitting stations whose signals were not received at any of the receiving stations (YES in S238). The data of the selected transmitting stations are recorded in the server 12 (S239), and an alert message is supplied to the associated user terminal (S240).

The data structures recording signal information from the receiving station and estimation results supplied from the positioning computer 11 in the server 12 are the same as those shown in Tables 3 and 4. The structure and the operation of the user terminal 3 are the same as those described in the first embodiment.

<Modification 3>

Figure 20:
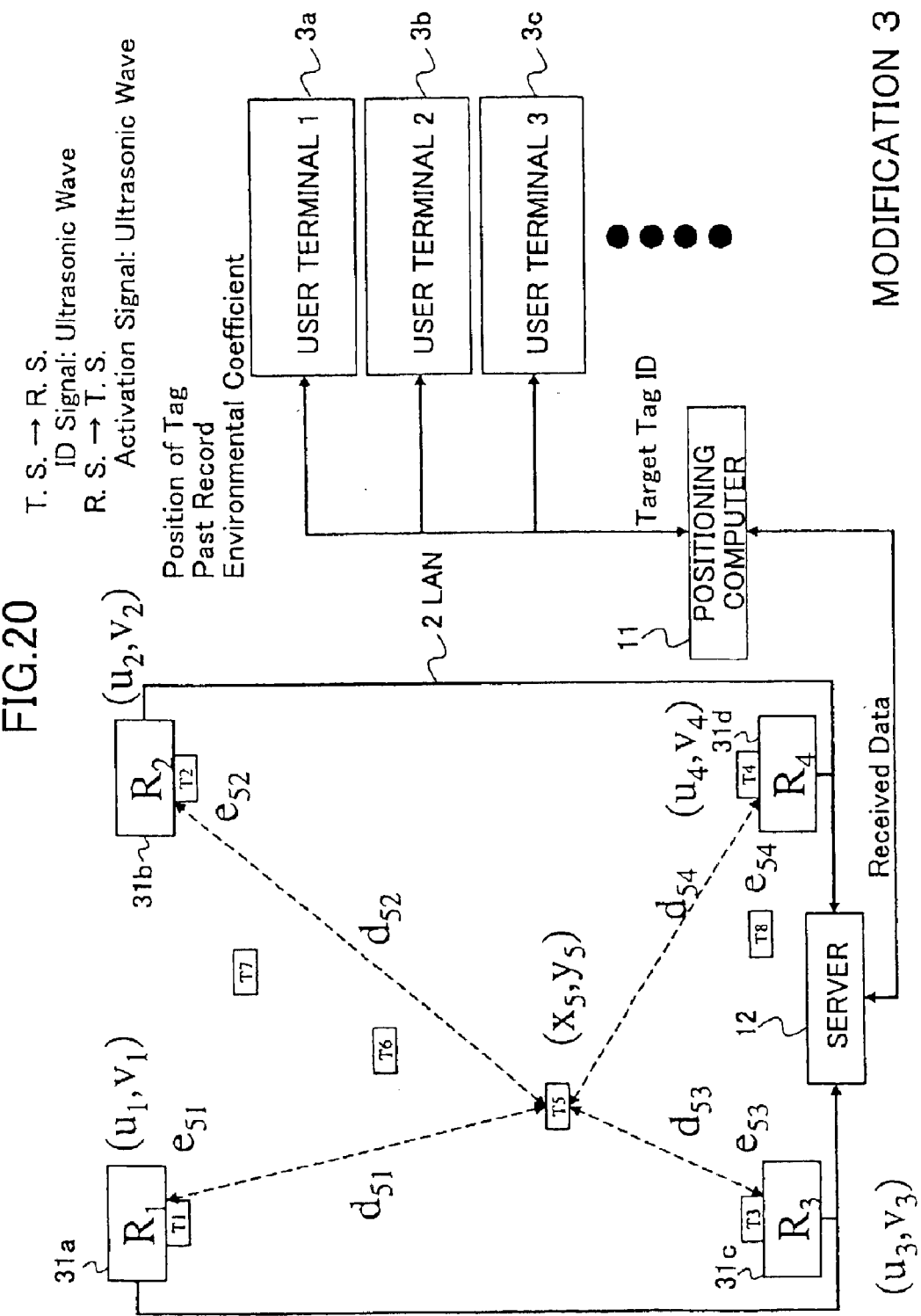
FIG. 20 illustrates a third modification of the locating system of the second embodiment.
Figure 21:
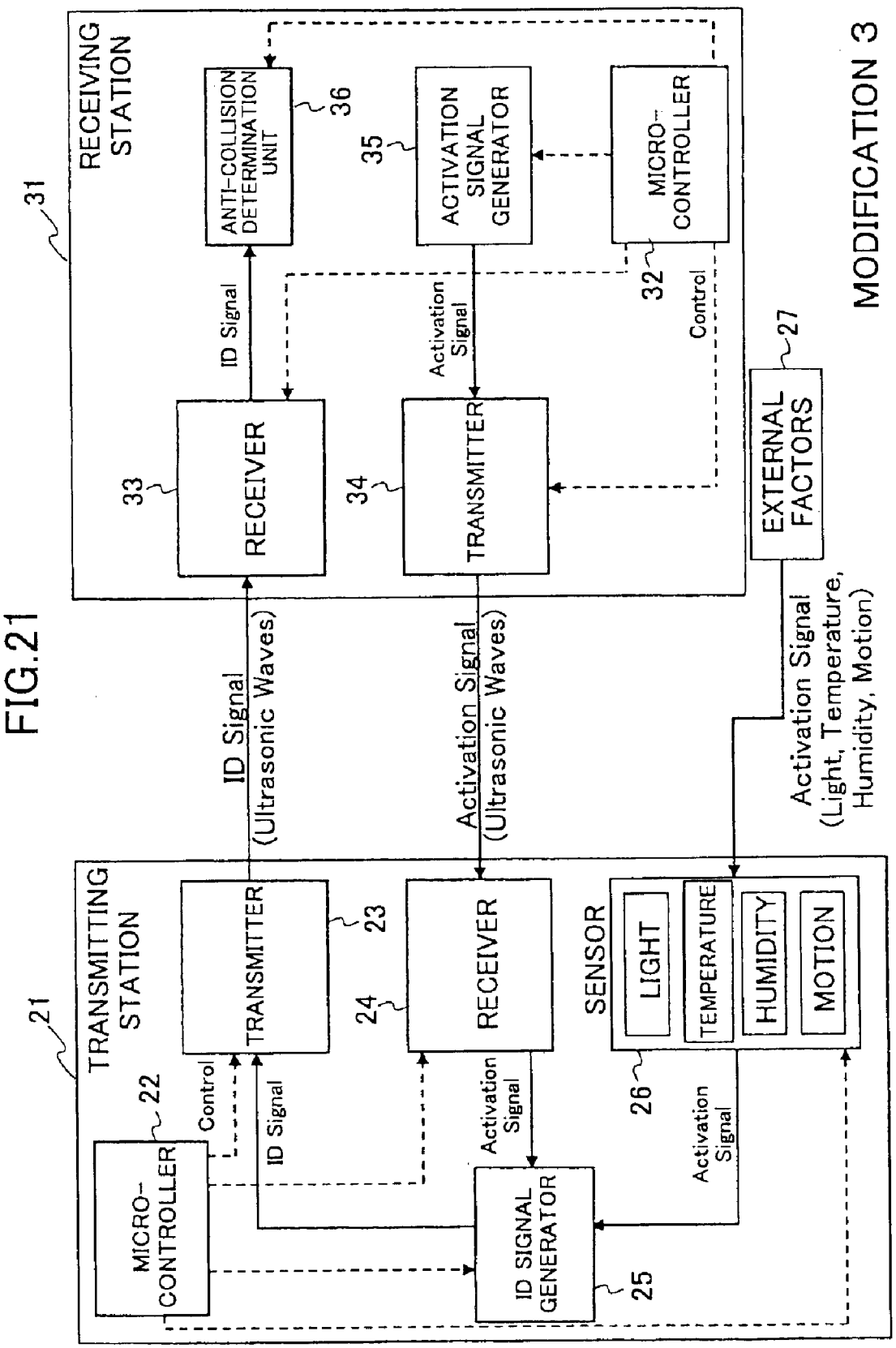
FIG. 21 illustrates the structures of the transmitting station and the receiving station used in the third modification shown in FIG. 20.

FIGS. 20 and 21 illustrate a third modification (Modification 3) of the second embodiment. In Modification 3, the receiving station transmits an activation signal via ultrasonic waves, and the transmitting station 21 generates and transmits a type-a ID signal via ultrasonic waves in response to the activation signal.

The receiving station 31 measures the intensity of the ultrasonic signal, and supplies the measuring result to the server 12, together with the identifier contained in the received ultrasonic signal. The operation flow of the positioning computer 11 is the same as that in Modification 2, and the explanation for it will be omitted.

In the second embodiment, activation signals are supplied from the receiving station 31 in order to cause each transmitting station 21 to transmit an ID signal. The arrangement allows the system to obtain necessary position information when it is actually required, while extending the life of the power source. In addition, the transmitting station 21 generates and transmits other types of ID signal when detecting any changes due to environmental or external factors, such as a change in vibration (acceleration), incident light, temperature, and humidity. This allows the system to estimate the position of a transmitting station more accurately taking the surrounding environment into account.

[Third Embodiment]

Figure 22:
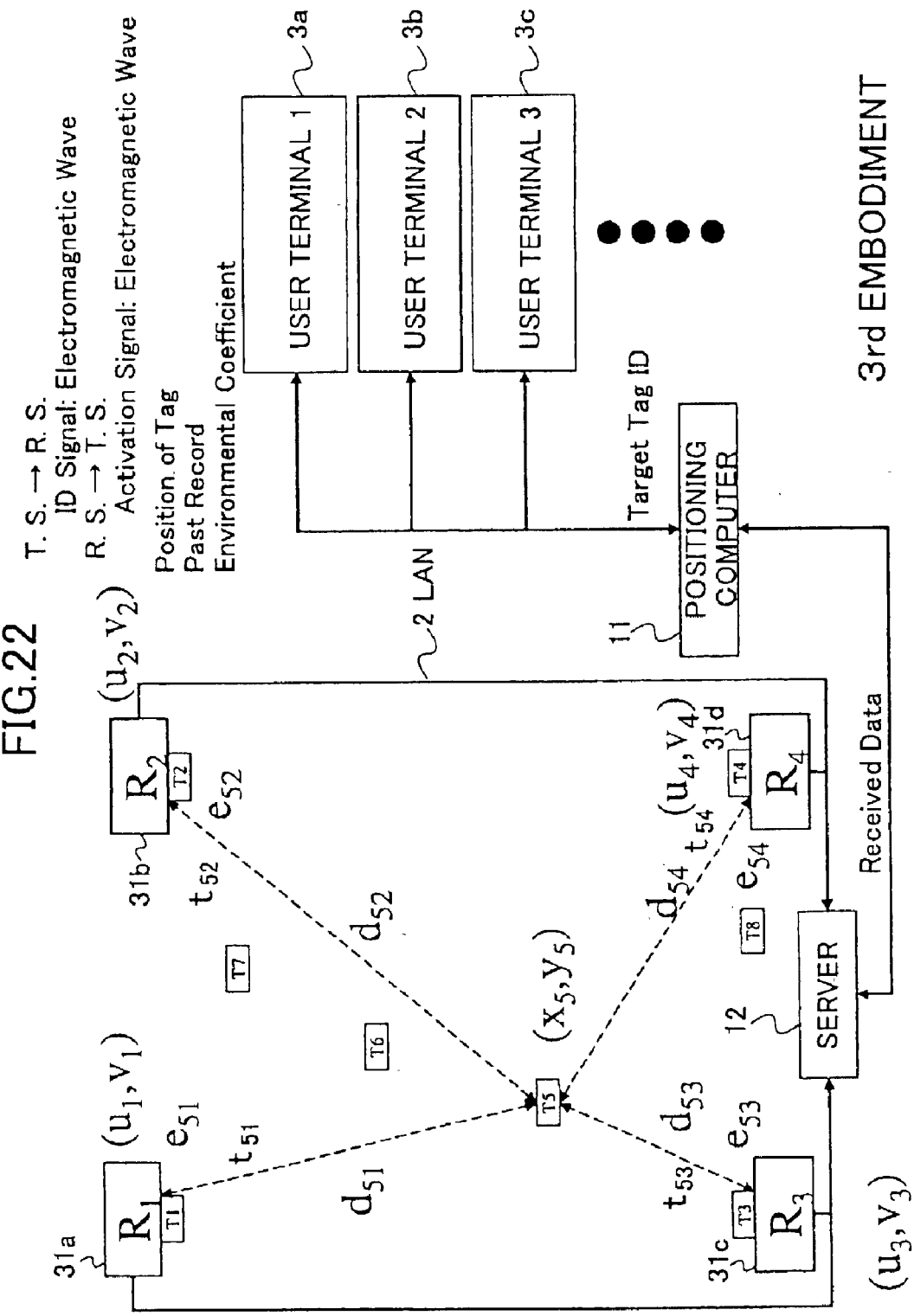
FIG. 22 illustrates a locating system according to the third embodiment of the invention.
Figure 23:
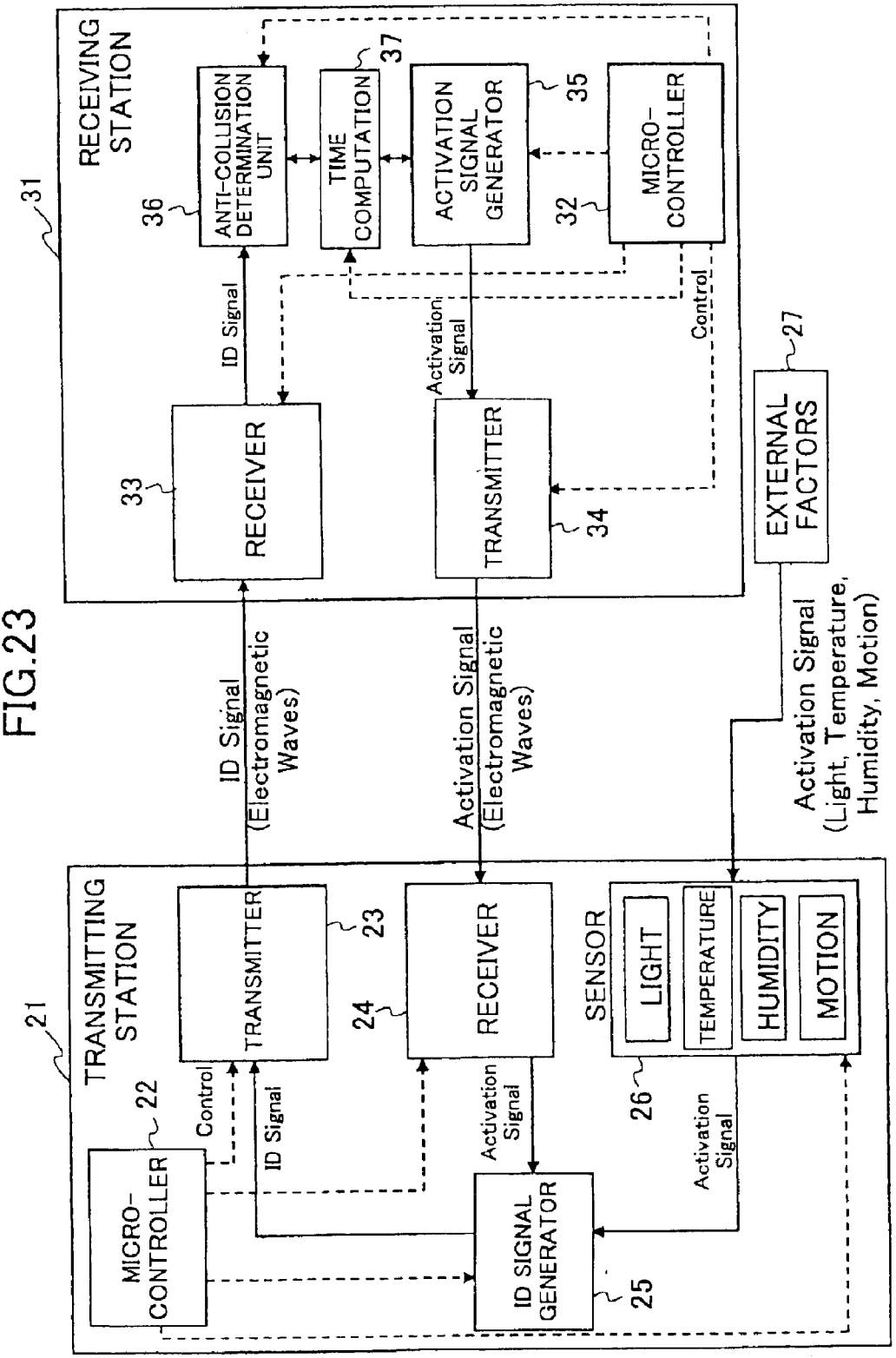
FIG. 23 illustrates the structures of the transmitting station and the receiving station used in the locating system of the third embodiment.

FIG. 22 is a schematic diagram of the locating system according to the third embodiment of the invention, and FIG. 23 illustrates the transmitting station 21 and the receiving station 31 used in the third embodiment. In the third embodiment, the receiving station 31 has a means for measuring a transmission time required to acquire a type-a ID signal in response to the activation signal. Accordingly, as illustrated in FIG. 22, the receiving station R1 measures a transmission time t51 required to acquire the ID signal from transmitting station T5, in addition to the intensity e51. The other fixed-position receiving stations R2–R4 also measure the intensity and the ID signal transmission time.

In the third embodiment, a second correcting formula defining a relation between signal propagation time through the air and distance is used. By using the second correcting formula, the position of a transmitting station can be estimated more accurately. The ID signal is transmitted by electromagnetic waves in the third embodiment.

The server 12 stores and manages the intensity data and the transmission time supplied from the receiving station 31, in association with the identifier of the transmitting station 21 read from the ID signal. The positioning computer 11 determines a propagation time of the electromagnetic signal through the air between the transmitting station 21 and the receiving station 31, based on the measured transmission time, using correcting coefficients. Then, the positioning computer 11 estimates the position of a transmitting station from a ratio of a prescribed proportional constant to the propagation time. Since in the third embodiment the propagation rate of the signal is corrected from the actually measured transmission time using an approximate function, it is not necessary to measure the temperature or the humidity of the air for correction.

The transmitting station 21 of the third embodiment has the same structure as that in the second embodiment. The transmitting station 21 has a microcontroller 22, a transmitter 23, an ID signal generator 25, and a sensor 26. The ID signal generator 25 periodically generates an ID signal containing a unique identifier (ID) of that transmitting station 21. The microcontroller 22 controls the operation of the transmitting station 21, and has built-in memories, such as ROM and RAM. The receiver 24 receives the activation signal transmitted from the receiving station and supplies the activation signal to the ID signal generator 25. The sensor 26 detects changes in various parameters, which are caused by external factors 27, and supplies the detection result to the ID signal generator 25.

The transmitting station 21 sets a long oscillation period, regardless of the ON/OFF operation of the sensor 26. The oscillation period does not have to be perfectly constant. By randomly varying the oscillation period by several percentages of the period, signal collision transmitted from different stations can be avoided.

The ID signal generator 25 generates different types of ID signals depending on the factors that cause the transmitting station 21 to generate ID signals. When receiving an activation signal from a receiving station 31, the ID signal generator 25 generates a type-a ID signal. A type-b ID signal is also generated based on the periodic oscillation. A type-c ID signal is generated when acceleration or a change in motion has been sensed by the sensor 26. When changes in incident light, temperature, and humidity are sensed, a type-d, type-e, and type-f ID signals are generated, respectively.

The receiving station 31 has a microcontroller 32, a receiver 33, a transmitter 34, an activation signal generator 35, an anti-collision determination unit 36, and a time computation unit 37. The microcontroller 32 controls the operation of the receiving station 31 and has built-in memories, such as ROM and RAM. The activation signal generator 35 generates an activation signal in a periodic manner. The receiver 33 receives first through third ID signals and measures the intensities of the respective signals. The anti-collision determination unit 36 reads the identifiers (first, second, and third identifiers) from the respective types of ID signals. The time computation unit 37 measures the transmission time required to acquire the ID signal in response to the activation signal. The transmission time is the time taken from generation of the activation signal to reading of the identifier from the received ID signal in this embodiment. The time computation unit 37 may be arranged between the transmitter 34 and the receiver 33. In this case, the transmission time is a time taken from transmission of the activation signal to receipt of the ID signal.

<Algorithm for Correcting Transmission Time>

As has been mentioned above, the positioning computer 11 determines a second correcting formula defining a relation between signal propagation time through the air and distance, using correcting coefficients, based on the transmission time measured by the receiving station 31.

In the examples shown in FIG. 22, transmitting stations T1–T4 are attached to the receiving station R1–R4, and their positions are known in advance. The positions of the transmitting stations T1–T4 are regarded as the same positions as the receiving stations R1–R4. Transmitting stations T5–T8 are unfixed, and their positions are unknown.

If a known position of the j$^{th}$ receiving station is (uj,vj) and if a position of the i$^{th}$ transmitting station is (xi,yi), then the distance between the i$^{th}$ transmitting station and the j$^{th}$ receiving station is expressed by Equation (1).

$$d_{ij}=\sqrt{(x_i-u_j)^2+(y_i-v_j)^2} \quad (1)$$

First, transmission time $t_{ij}$, required to acquire the ID signal from a transmitting station, is corrected using known position information of the fixed-position receiving stations. The transmission time $t_{ij}$ is the sum of a propagation time $p_{ij}$ of the signal (electromagnetic wave in this embodiment) through the air, a signal propagation time A in the receiving station, and a signal propagation time b in the transmitting station.

$$t_{ij}=p_{ij}+A+b \quad (6)$$

Among the terms in the right-hand side, propagation time A in the receiving station 31 can be regarded as constant among the receiving stations because a high-speed receiving operation is realized using a sufficient power source. In contrast, the propagation time b in the transmitting station 21 has a strong correlation with the intensity $e_{ij}$ because of the reversibility of propagation depending on the configuration of the activation signal detection circuit (not shown) of each transmitting station. The correlation varies depending on the technique for detecting the activation signal, and an approximate formula using a polynomial or an exponential function can be applied. For example, receipt of the activation signal is sensed by a diode, charging a capacitor. Then, it can be regarded that the activation signal has been detected when the voltage reaches a predetermined level. In this case, an approximate formula defined by Equation (7) is assumed using an exponential function, which describes the correlation between intensity $e_{ij}$ and propagation time b in the transmitting station.

$$b=f+g\,\exp(-h\times e_{ij}) \quad (7)$$

In Equation (7), f, g, and h are correcting coefficients. Equation (7) is inserted in Equation (6) to obtain Equation (8).

$$t_{ij}=p_{ij}+A+f+g\,\exp(-h\times e_{ij}) \quad (8)$$

Since distance $d_{ij}$ between the transmitting station 21 and the receiving station 31 is proportional to signal propagation time $p_{ij}$ through the air, Equation (8) is modified as Equation (9).

$$p_{ij}=t_{ij}-A-f-g\,\exp(-h\times e_{ij})=Kd_{ij} \quad (9)$$

Equation (9) is the second correcting formula, where K is a proportional constant.

At this stage, $e_{ij}$ is the intensity of the ID signal transmitted from each of transmitting stations T1–T4 whose positions are already known (referred to as "known transmitting stations"). Unknown parameters are five, that is, A, F, g, h and K. If A and f are considered as a single parameter B (=A+f), then the number of unknowns becomes four. The solutions for these unknowns that minimize the error are obtained by minimizing estimation function qq expressed by Equation (10).

$$qq = \sum_{j=1}^{m}\sum_{i=1}^{tn}\left(t_{ij}-\bar{B}-\bar{g}\exp\left(-\bar{h}\times e_{ij}\right)-\bar{K}d_{ij}\right)^2 \quad (10)$$

where rn is the number of the receiving stations whose positions are known (referred to as "known receiving stations"), and tn is the number of known transmitting stations. In order to solve all the unknowns, rn×tn≧4 must be satisfied. In the example shown in FIG. 22, rn is four and tn is four, and therefore, all the unknowns can be solved. For the purpose of clarification, unknowns are marked with an arc above the symbols.

There are many known methods for solving Equation (10). For example, partially differentiating function qq with respect to each variable, and obtaining the numerical solutions that make the respective partial differentials zero using, for example, the Newton method. Alternatively, the simplex method, the steepest descent method (or saddle point method), methods using neural networks can be used. Using any one of these methods, the correcting coefficients B, g and h, as well as proportional constant K for the signal propagation time $p_{ij}$ and distance $d_{ij}$, are determined.

Distance $nd_{ij}$ from an unknown transmitting station to a known receiving station can be derived using the signal propagation time $p_{ij}$ determined by Equation (10). The relation between $nd_{ij}$ and $p_{ij}$ is expressed by Equation (11) using proportional constant K.

$$nd_{ij}=p_{ij}/K=\{t_{ij}-B-g\exp(-h\times e_{ij})\}/K \quad (11)$$

where $nd_{ij}$ is a distance derived from the actually measured transmission time. The position of the i$^{th}$ unknown transmitting station can be determined by minimizing estimation function hhi expressed by Equation (12).

$$hh_i=\sum_{j=1}^{m}\left(\{t_{ij}-B-g\exp(-h\times e_{ij})\}/K-\sqrt{(\bar{x}_i-u_j)^2+(\bar{y}_i-v_j)^2}\right)^2 \quad (12)$$

For the purpose of clarification, unknowns are marked with an arc above the symbols in Equation (12). With the method described above, the position (xi, yi) of the i$^{th}$ unknown transmitting station can be estimated from the measured transmission time.

Using the estimated position of the unknown transmitting station, the estimation accuracy for environmental coefficient Kti for this transmitting station can also be improved.

First, as in the second embodiment, environmental coefficient Krj for receiving station j is defined. The environmental coefficient Krj is an index indicating how the sensitivity of the receiving station deviates from the ideal state. Similarly, environmental coefficient Kti for transmitting station i is defined.

The relation between the intensity of a received signal and distance is corrected using corrected Friis' formula (i.e., the first correcting formula) using position information of known receiving stations. The first correcting formula defining a relation between intensity $e_{ij}$ and distance $d_{ij}$ is determined using actually measured values between the known transmitting stations T1–T4 and known receiving stations R1–R4. It is assumed that the intensity has a logarithmic relation with distance, and Equation (2) is assumed.

$$e_{ij}=S_1\times\log_{10}(d_{rj})+S_2-K_{rj} \quad (2)$$

where S1 and S2 are correcting coefficients. At this stage, intensity $e_{ij}$ is the intensity of an ID signal transmitted from each of known transmitting station T1–T4 and measured at each of known receiving stations R1–R4. The solutions for the unknowns in Equation (2) that minimize the error can be obtained by minimizing estimation function q expressed by Equation (3).

$$q = \sum_{j=1}^{rn} \sum_{i=1}^{tn} \left(e_{ij} - \hat{S}_1 \log_{10}(d_{ij}) - \hat{S}_2 + \hat{K}_{rj}\right)^2 \qquad (3)$$

where rn is the number of known receiving stations and tn is the number of known transmitting stations. In order to solve all the unknowns, rn×tn≧4 must be satisfied. In the example shown in FIG. 22, rn is four and tn is four, and therefore, all the unknowns can be solved. For the purpose of clarification, unknowns are marked with an arc above the symbols.

Solutions for Equation (3) can be obtained by, for example, partially differentiating function q with respect to each variable and obtaining the numerical solutions that make the respective partial differentials zero using the Newton method. Alternatively, the simplex method, the steepest descent method (or saddle point method), methods using neural networks can be used, as in the second embodiment. Using any one of these methods, the correcting coefficients S1 and S2 are determined.

Next, environmental coefficient Kti for unknown transmitting station is introduced. Although the transmitting intensity at a transmitting station is constant, the environmental coefficient varies depending on the location, and therefore, the intensity of the received signal varies. Accordingly, a relation between intensity and distance is assumed as Equation (4) introducing environmental coefficient Kti for transmitting station, in addition to the correcting coefficients S1, S2 and the environmental coefficient Krj for the receiving station determined by Equation (3).

$$md_{ij} = 10^{(e_{ij}-S_2+K_{rj}+K_{ti})/S_1} \qquad (4)$$

where $md_{ij}$ is a distance derived from the measured intensity. The environmental coefficient Kti can be obtained by minimizing estimation function hhhi expressed by Equation (13).

$$hhh_i = \sum_{j=1}^{rn} \left(10^{(e_{ij}-S_2+K_{rj}+\hat{K}_{ti})/S_1} - \sqrt{(x_1-u_j)^2 + (y_1-v_j)^2}\right)^2 \qquad (13)$$

For the purpose of clarification, the unknown is marked with an arc above the symbols. As the position (xi, yi) of the transmitting station, the values estimated by Equation (12) using the correcting algorithm for transmission time is used. In this manner, the estimation accuracy for the environmental coefficient Kti for transmitting station i is improved.

As in the first and second embodiments, information that an ID signal is not received at a certain receiving station is used as a restrictive condition. Thus, unknown information is effectively utilized in position estimation.

Figure 24:
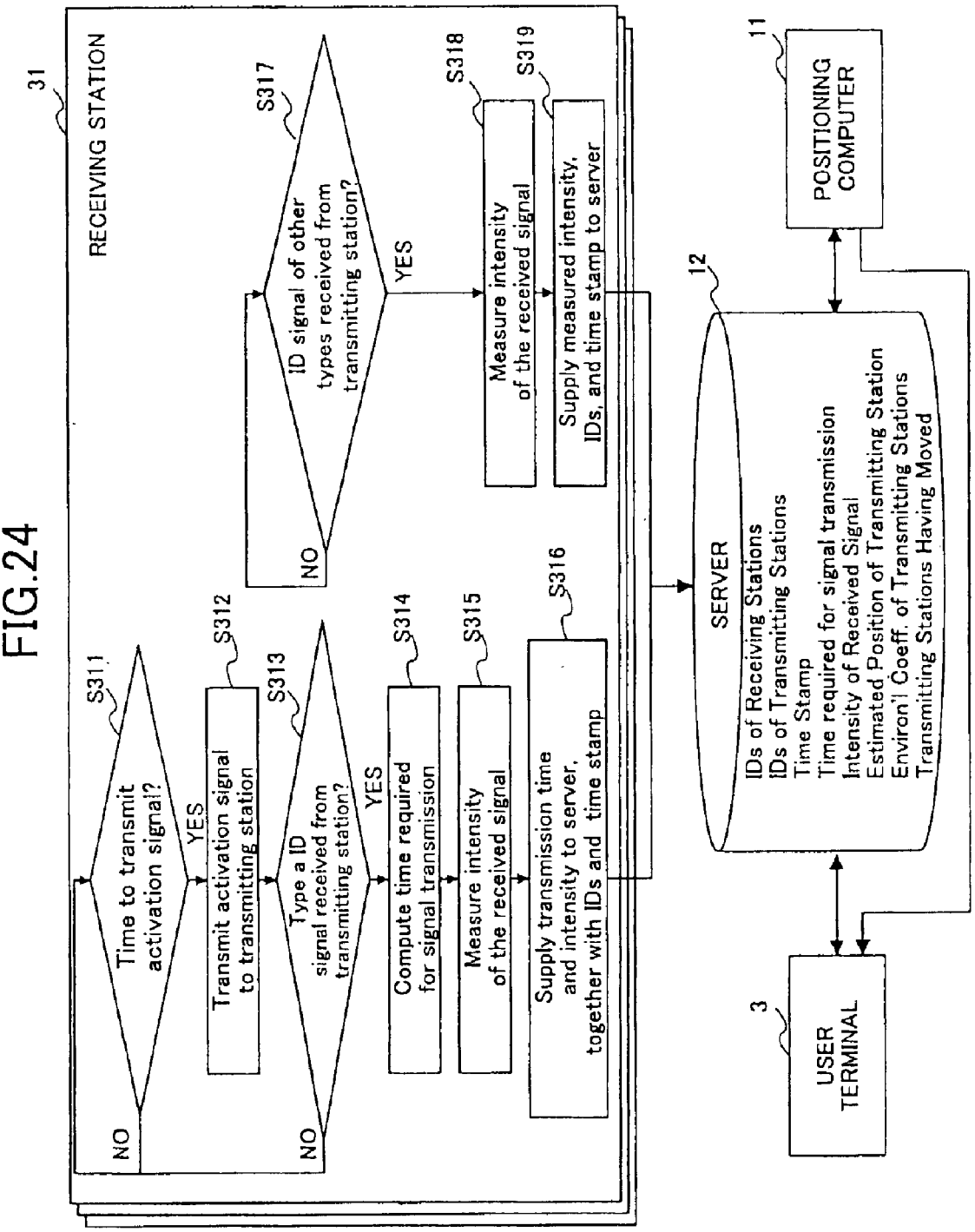
FIG. 24 illustrates the operation flow of the receiving station used in the third embodiment.

FIG. 24 illustrates the operation flow of the receiving station 31 according to the third embodiment. At a timing for transmitting an activation signal (YES in S311), the receiving station 31 transmits an activation signal to the transmitting station 21 (S312). Then, when receiving an ID signal from the transmitting station in response to the activation signal, it is confirmed if the received signal is a type-a ID signal (S313). If a type-a ID signal has been received (YES in S313), a transmission time required to acquire the ID signal (e.g., the time required to read the identifier since generation of the activation signal) is measured (S314). The intensity of the received ID signal is also measured (S315). The measured transmission time and the intensity are supplied to the server 12, together with the identifier of the transmitting station, the identifier of the receiving station itself, and time stamp (S316). The time stamp may be created by server 12.

The transmitting station transmits ID signals not only when receiving an activation signal, but also when detecting changes due to external factors. Accordingly, the receiving station determined whether other types of ID signals have been received (S317). If an ID signal other than type-a ID signal has been received (YES in S317), the identifier is read from the ID signal, and the intensity of the ID signal is measured (S318). The measured intensity, the identifier of the transmitting station, and the identifier of the receiving station itself are supplied to the server 12, together with a time stamp (S319).

Figure 25:
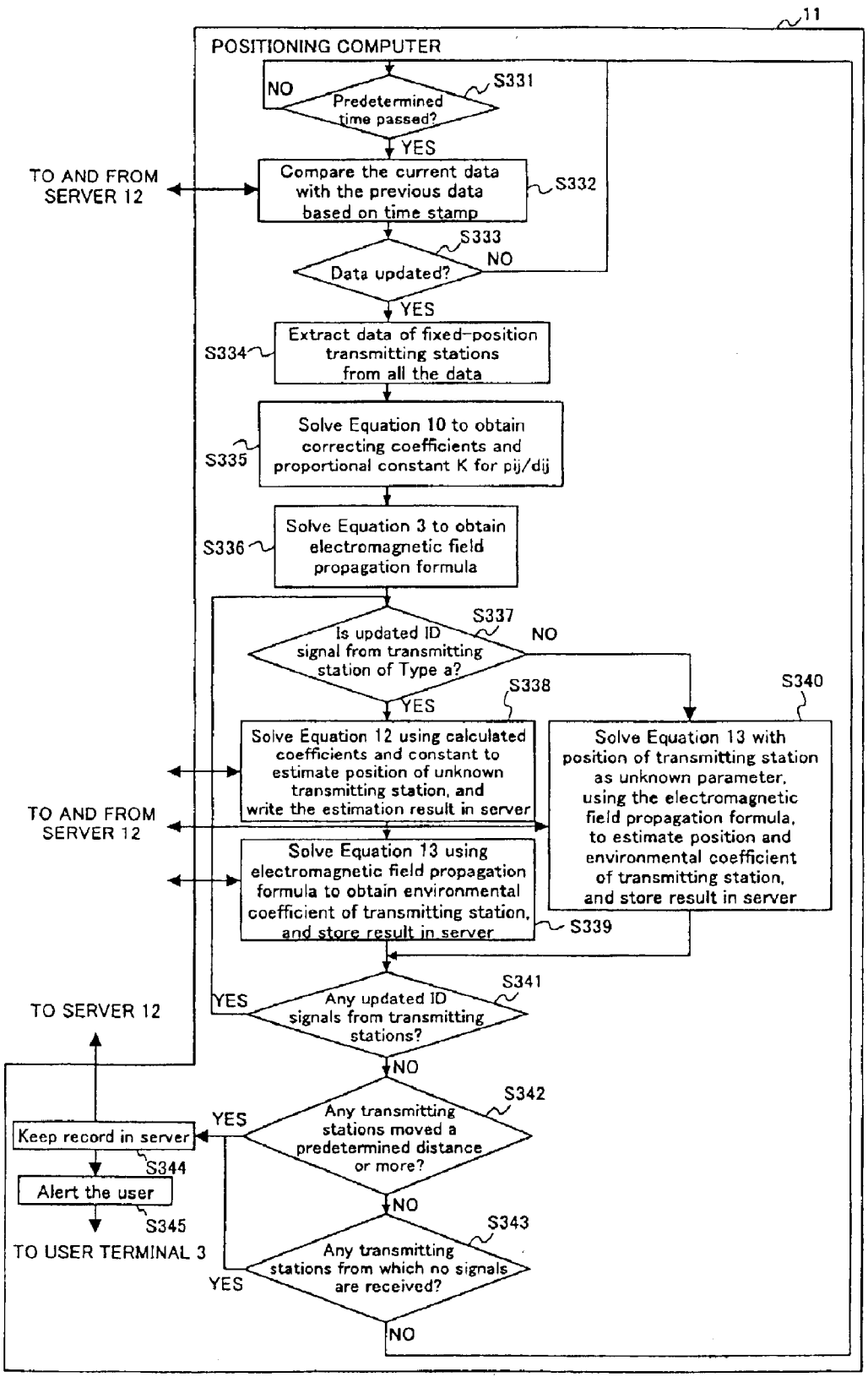
FIG. 25 illustrates the operation flow of the positioning computer used in the third embodiment.

FIG. 25 illustrates the operation flow of the positioning computer 11 according to the third embodiment. The positioning computer 11 checks time stamps of data stored in the server 12 and determines whether a predetermined amount of time has passed (S331). This step is carried out in order to prevent overlooking because the transmitting station operates discontinuously and because the ID signals may not be received due to signal overlap. Then, based on the time stamps, the current data are compared with the previous data for each identifier (S332) to determine if the current data have been updated (S333). If there are data elements updated from the previous ones (YES in S333), data of fixed-position transmitting stations (T1–T4 in example shown in FIG. 22) whose positions are known in advance are extracted from all the updated data (S334).

Using the data of the fixed-position transmitting stations, correcting coefficients B, g, h and proportional constant K for ratio of $p_{ij}$ (signal propagation time through the air) to $d_{ij}$ (distance) that minimize Equation (10) are determined (S335). In addition, correcting coefficients S1, S2 and environmental coefficient Krj that minimize Equation (3) are determined to provide a propagation formula for the electromagnetic field (S336).

Then, positions of the data-updated transmitting stations are estimated using appropriate algorithms depending on the case in which
1) the identifier read from the ID signal is of type a (that is, the ID signal is transmitted in response to the activation signal); or
2) the identifier read from the ID signal is one of types b–f (that is, the ID signal is transmitted spontaneously by periodic oscillation or detection of changes).

Accordingly, it is determined if the ID signal from the data-updated transmitting station is of type a (S337). If the ID signal is of type a (YES in S337), Equation (12) is solved to estimate the position of the transmitting station from the measured transmission time (S338). The estimation result is stored in the server 12. Then, Equation (13) is solved to determine the environmental coefficient Kti for the transmitting station from the estimated position and the measured intensity (S339). The determined environmental coefficient Kti is also stored in the server 12.

On the other hand, if the ID signal from the data-updated transmitting station is one of types b–f (NO in S337), Equation (13) is solved with the position of the transmitting station as an unknown parameter to estimate the position of the transmitting station and the environmental coefficient (S340). The estimation result is stored in the server 12.

If there are any other updated data (YES in S341) steps S337 through S340 are repeated to estimate the position of the transmitting station and environmental coefficient for the update data. If there is no more data-updated transmitting station (NO in S341), the estimation results are compared with the previous results to select those transmitting stations whose positions have been changes a predetermined value or more (YES in S342) and those transmitting stations whose signals were not received at any of the receiving stations (YES in S343). The data of the selected transmitting stations are recorded in the server 12 (S344), and an alert message is supplied to the associated user terminal (S345).

Table 5 shows an example of a data structure recording data from the receiving station in the server 12, and Table 6 shows an example of a data structure recording estimation result supplied from the positioning computer 11.

TABLE 5

DATA STRUCTURE OF SIGNAL INFORMATION SUPPLIED FROM RECEIVING STATION

| RS ID | TR ID | ID TYPE | TIME STAMP | TRANSMISSION TIME | INTENSITY |
|---|---|---|---|---|---|
| 0001 | 0015 | a | 16:33:10 | 00:00:00000080 | 24 |
| 0001 | 0015 | c | 17:33:10 |  | 23 |

TABLE 6

DATA STRUCTURE OF ESTIMATION RESULTS SUPPLIED FROM POSITIONING COMPUTER

| TR ID | ID TYPE | TIME STAMP | ESTIMATION (X, Y) | ENVIR'L COEFF. |
|---|---|---|---|---|
| 0015 | a | 17:22:21 | 11.34, 9.15 | 31.0 |
| 0015 | c | 18:22:21 | 11.95, 9.25 | 32.4 |

Environmental coefficient Kti reflects the environment surrounding a transmitting station, and it provides useful information when actually trying to determine the location of the transmitting station. If the environmental coefficient is large, it indicates that the transmitting station is located at an obstructed place with respect to the receiving station. If the environmental coefficient is small, the transmitting station is located at an open space or an unobstructed place. Adding such environmental information to the estimated position allows the user to actually locate the target transmitting station.

The user terminal 3 has two functions, as in the first and second embodiments, that is, receiving an alert message supplied from the positioning computer 11, and retrieving the position of a target transmitting station. The user inputs the identifier (ID) of the target transmitting station into the user terminal. The user terminal accesses the server 12 to retrieve in the server 12 the past record of that identifier, such as time stamps, position information, environmental coefficient, etc. The retrieved result is displayed on the user terminal.

The user can determine whether the target transmitting station is located at an open space from the position information described by time stamps and the corresponding environmental coefficient. In addition, the user can determine when an activation signal is received at the transmitting station or when external change has been detected from the past record.

In the third embodiment, a transmission time required to acquire an ID signal is used, together with the intensity of the received ID signal, to estimate the position of a transmitting station. The estimation result is more accurate as compared with the case using the intensity only.

Since when defining a second correcting formula, the signal propagation time through the air is corrected from the actually measured values using an approximate function, it is not necessary to measure the temperature and the humidity in the air for the correction.

The relation between the intensity and time is also corrected from the actually measured value using an approximate function. Accordingly, the estimation accuracy is still improved even if a receiving station cannot perform high-speed receiving operation for reducing power consumption.

[Fourth Embodiment]

Figure 26:
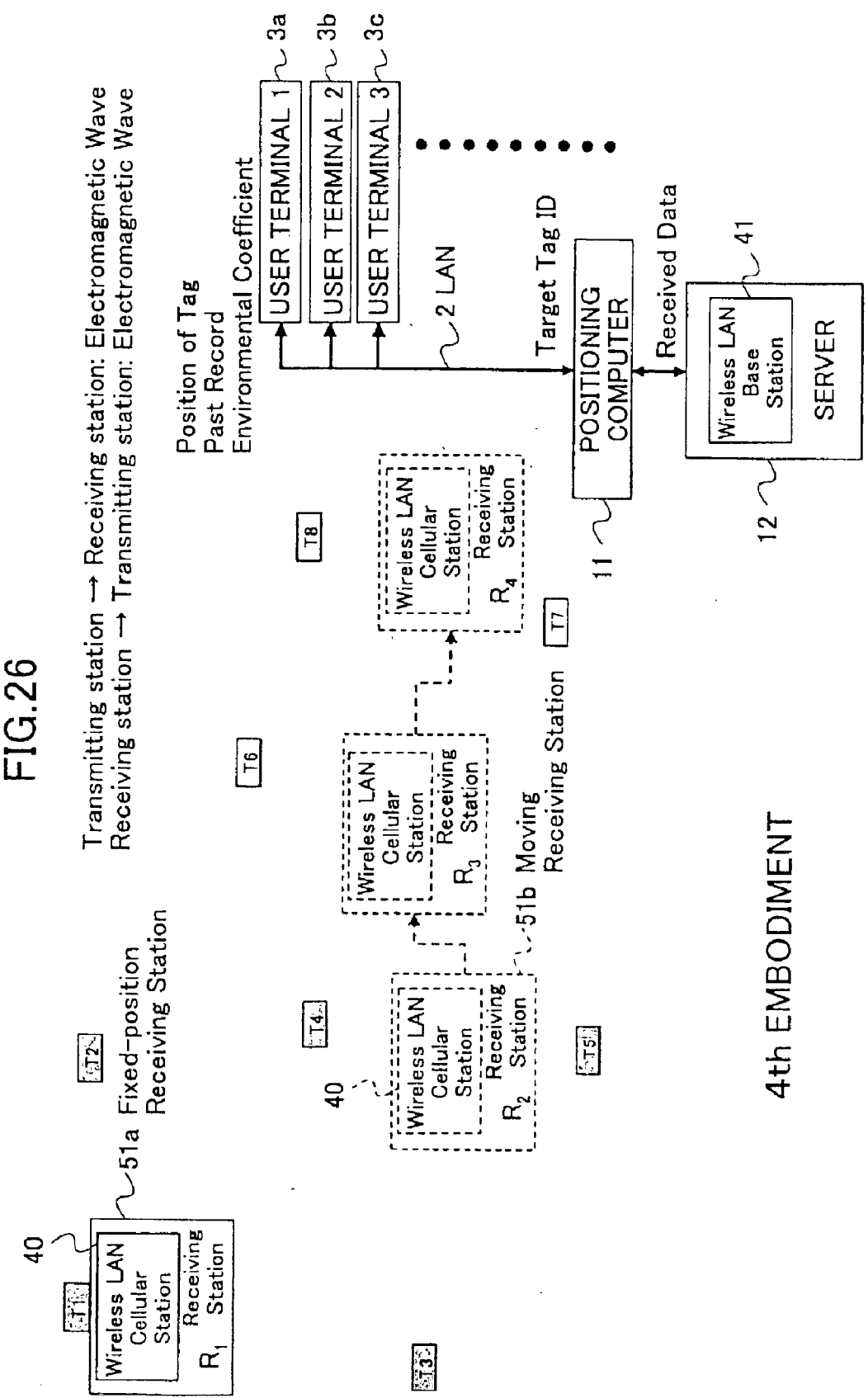
FIG. 26 illustrates a locating system according to the fourth embodiment of the invention.
Figure 27:
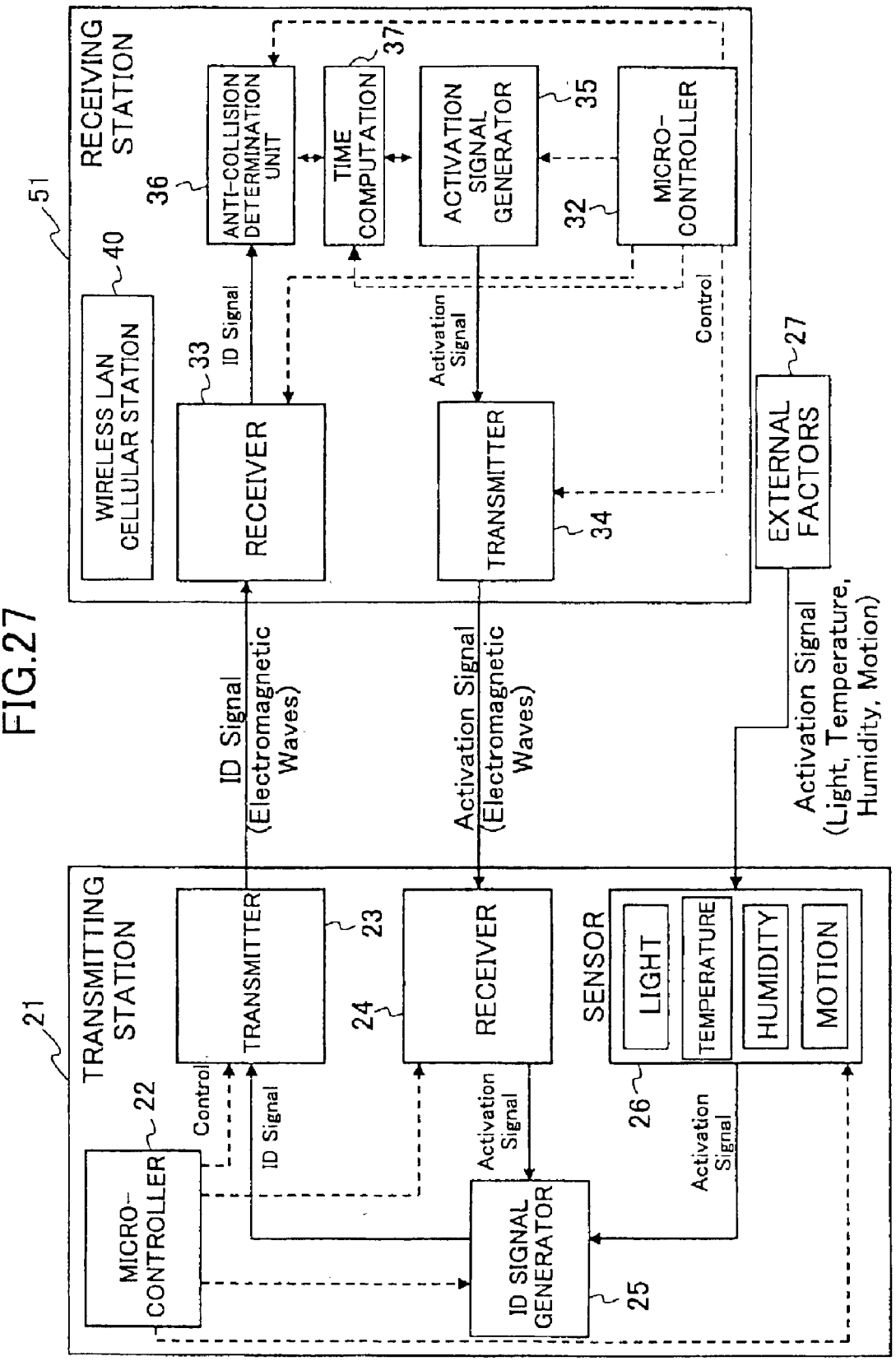
FIG. 27 illustrates the structures of the transmitting station and the receiving station used in the locating system of the fourth embodiment.

FIG. 26 illustrates a locating system according to the fourth embodiment of the invention, and FIG. 27 illustrates the structures of the transmitting station 21 and the receiving station 31 used in the system shown in FIG. 26. In the fourth embodiment, a receiving station R1 fixed at a known position (hereinafter referred to as "fixed-position receiving station"), and another receiving R2 station that moves freely (hereinafter referred to as "moving receiving station") are used to estimate the positions of plural transmitting stations.

As shown in FIG. 26, a locating system includes a fixed-position receiving station (or a first receiving station R1) 51a, a moving receiving station (or a second receiving station R2) 51b, transmitting stations 21 (T1–T8), a positioning computer 11, and user terminals 3. The positioning computer 11, the server 12, and the user terminals 3 are mutually connected via LAN 2. Since a moving receiving station R2 is used in the fourth embodiment, the receiving stations 51 are connected to the server 12 via a wireless network. For this reason, the server 12 has a wireless LAN base station 41. Each of the receiving stations 51a and 51b also has a wireless LAN cellular station 40.

Each of the receiving stations 51a and 51b has a microcontroller 32, a receiver 33, a transmitter 34, an activation signal generator 35, an anti-collision determination unit 36, and a time computation unit 37. The microcontroller 32 controls the operation of the receiving station 51 and has built-in memories, such as ROM and RAM. The activation signal generator 35 generates an activation signal, and the transmitter 34 transmits the activation signal to transmitting stations. The receiver 33 receives an ID signal from each transmitting station and measures the intensity of the received ID signal. The anti-collision determination unit 36 reads or extracts the identifier from the ID signal. The time computation unit 37 measures a transmission time required to acquire the ID signal. In the fourth embodiment, transmission time is the time required to read the identifier since the generation of the activation signal. However, the time computation unit 37 may be connected between the transmitter 34 and the receiver 33. In this case, the transmission time is the time required to receive the ID signal since transmission of the activation signal.

The transmitting station 21 has the same structure as illustrated in the second and third embodiments. Namely, the transmitting station 21 has a microcontroller 22, a transmitter 23, an ID signal generator 25, and a sensor 26. The ID signal generator 25 periodically generates an ID signal containing a unique identifier (ID) of that transmitting station 21. The microcontroller 22 controls the operation of the transmitting station 21, and has built-in memories, such as ROM and RAM. The receiver 24 receives the activation signal transmitted from the receiving station and supplies the activation signal to the ID signal generator 25. The sensor 26 detects changes in various parameters, which are caused by external factors 27, and supplies the detection result to the ID signal generator 25. The ID signal generator 25 generates different kinds of ID signals when receiving the activation signal from the receiving station and when detecting a change, in addition to a periodic signal of a relatively long interval. With this arrangement, an ID signal is transmitted when it is actually required, and power consumption of the battery can be reduced. The size of the log file can also be reduced. The sensor 26 is realized by combining an acceleration sensor using an inverted pendulum, a light sensor, a temperature sensor, a humidity sensor, and other types of sensors.

The positioning computer 11 estimates the position of a transmitting station based on the data stored in the server 12, using the first and second correcting formulas, according to the algorithm described below.

<Algorithm for Correcting Transmission Time>

In the example shown in FIG. 26, the positions of transmitting stations T1–T4 are known (and these transmitting stations are referred to as "known transmitting stations"). The fixed-position receiving station R1 is set at the same position as transmitting station T1, and its position is (u1, v1). The moving receiving position R2 travels with its position changing, as indicated by the dashed arrows. For the convenience of explanation and estimation, R3 and R4 denote the new positions of the moving receiving station. The $j^{th}$ position of the moving receiving station R2 is (uj, vj). The positions of transmitting stations T5–T8 are unknown (and these transmitting stations are referred to as "unknown transmitting stations"), and the position of the $i^{th}$ transmitting station is (xi, yi). An ID signal is transmitted from a transmitting station to the receiving stations R1 and R2 via electromagnetic waves, and the intensity of the ID signal received at the receiving station at the $j^{th}$ position (referred to as the $j^{th}$ receiving station for convenience) is $e_{ij}$. The distance between the $i^{th}$ transmitting station and the $j^{th}$ receiving station is $d_{ij}$, which is expressed by Equation (1).

$$d_{ij}=\sqrt{(x_i-u_j)^2+(y_i-v_j)^2} \qquad (1)$$

First, transmission time $t_{ij}$, required to acquire the ID signal and read the identifier, is corrected using known position information of the fixed-position receiving station. The transmission time $t_{ij}$ is the sum of a propagation time $p_{ij}$ of the signal (electromagnetic wave in this embodiment) through the air, a signal propagation time A in the receiving station, and a signal propagation time b in the transmitting station.

$$t_{ij}=p_{ij}+A+b \qquad (6)$$

Among the terms in the right-hand side, propagation time A in the receiving station 51 can be regarded as constant among the receiving stations because a high-speed receiving operation is realized using a sufficient power source. In contrast, the propagation time b in the transmitting station 21 has a strong correlation with the intensity $e_{ij}$ because of the reversibility of propagation depending on the configuration of the activation signal detection circuit (not shown) of each transmitting station. The correlation varies depending on the technique for detecting the activation signal, and an approximate formula using a polynomial or an exponential function can be applied. For example, receipt of the activation signal is sensed by a diode, charging a capacitor. Then, it can be regarded that the activation signal has been detected when the voltage reaches a predetermined level. In this case, an approximate formula defined by Equation (7) is assumed using an exponential function, which describes the correlation between intensity $e_{ij}$ and propagation time b in the transmitting station.

$$b=f+g\exp(-h\times e_{ij}) \qquad (7)$$

In Equation (7), f, g, and h are correcting coefficients. Equation (7) is inserted in Equation (6) to obtain Equation (8).

$$t_{ij}=p_{ij}+A+f+g\exp(-h\times e_{ij}) \qquad (8)$$

Since distance $d_{ij}$ between the transmitting station 21 and the receiving station 31 is proportional to signal propagation time $p_{ij}$ through the air, Equation (8) is modified as Equation (9).

$$p_{ij}=t_{ij}-A-f-g\exp(-h\times e_{ij})=Kd_{ij} \qquad (9)$$

Equation (9) is the second correcting formula, where K is a proportional constant.

At this stage, $e_{ij}$ is the intensity of the ID signal transmitted from each of transmitting stations T1–T4 whose positions are already known (referred to as "known transmitting stations"). Unknown parameters are five, that is, A, F, g, h and K. If A and f are considered as a single parameter B (=A+f) then the number of unknowns becomes four. The solutions for these unknowns that minimize the error are obtained by minimizing estimation function qqq expressed by Equation (14).

$$qqq=\sum_{j=1}^{m}\sum_{i=1}^{tn}\left(t_{ij}-\hat{B}-\hat{g}\exp(-\hat{h}\times e_{ij})-\hat{K}d_{ij}\right)^2 \qquad (14)$$

where rn is the number of the receiving stations whose positions are known, and tn is the number of known transmitting stations. In order to solve all the unknowns, rn×tn≧4 must be satisfied. In the example shown in FIG. 26, rn is one and tn is four, and therefore, all the unknowns can be solved. For the purpose of clarification, unknowns are marked with an arc above the symbols.

There are many known methods for solving Equation (14). For example, partially differentiating function qqq with respect to each variable, and obtaining the numerical solutions that make the respective partial differentials zero using, for example, the Newton method. Alternatively, the simplex method, the steepest descent method (or saddle point method), methods using neural networks can be used. Using any one of these methods, the correcting coefficients B, g and h, as well as proportional constant K for the signal propagation time $p_{ij}$ and distance $d_{ij}$, are determined.

Distance $nd_{ij}$ from an unknown transmitting station to a known receiving station can be derived using the signal propagation time $p_{ij}$ determined by Equation (14). The relation between $nd_{ij}$ and $p_{ij}$ is expressed by Equation (15) using proportional constant K.

$$nnd_{ij} = p_{ij}/K = \{t_{ij} - B - g\exp(-h \times e_{ij})\}/K \qquad (15)$$

where $nnd_{ij}$ is a distance derived from the measured transmission time. Then, Equation (3) is solved to determine correcting coefficients S1, S2 and environmental coefficient Krj for the receiving station.

<Algorithm Used when the Moving Receiving Station Travels>

As the moving receiving station R2 travels to R3, and to R4, the new position (uj, vj) of the moving receiving station can be estimated using position information of at least three known transmitting stations among T1–T4, by minimizing estimation function hhhhj expressed by Equation (16).

$$hhhh_j = \sum_{i=1}^{ttn}\left(\{t_{ij} - B - g\exp(-h \times e_{ij})\}/K - \sqrt{(x_1 - \hat{u}_j)^2 + (y_1 - \hat{v}_j)^2}\right)^2 \qquad (16)$$

where ttn is the number of known transmitting stations whose position information can be utilized. For clarification, unknowns are marked with an arc above the symbols.

Then, an activation signal is transmitted from the moving station located at the estimated position to an unknown transmitting station. The position of this unknown transmitting station can be estimated using information about at least three positions of the receiving stations (including the position information of the fixed-position receiving station R1, and the estimated positions R2, R3 . . . of the moving receiving station) Position (xi, yi) of the unknown transmitting station is estimated by minimizing estimation function hhhhhi expressed by Equation (17).

$$hhhhh_i = \sum_{j=1}^{rrn}\left(\{t_{ij} - B - g\exp(-h \times e_{ij})\}/K - \sqrt{(\hat{x}_1 - u_j)^2 + (\hat{y}_1 - v_j)^2}\right)^2 \qquad (17)$$

where rrn is the number of available positions of the receiving station used for estimation. Unknowns are marked with an arc above the symbols for clarification.

<Algorithm Used when Known Transmitting Station is Out of Area>

As the moving receiving station 51b travels, the transmitting stations T1–T4 fixed at known positions are out of the communication area of the receiving station 51b. Accordingly, the positions of transmitting stations T5–T8, which have already been estimated in the above-described manner, are used to estimate a new position of the moving receiving station 51b.

The positions of unknown transmitting stations T5–T8 are successively estimated using the time-correcting algorithm using the second correcting formula and the algorithm for moving receiving station. By making use of the estimated position information, the estimation accuracy for the environmental coefficient Kti for the transmitting station can be improved.

Environmental coefficient Krj for the receiving station "j" is defined. The environmental coefficient Krj is an index indicating how the sensitivity of the receiving station changes from the ideal condition. Similarly, environmental coefficient Kti for a target transmitting station is also defined.

First, the Friis' formula is corrected using correcting coefficients S1, S2, and an environmental coefficient Krj to define a relation between distance "d" and intensity "e", using the actually measured values between the transmitting station 21 and the receiving station 51. Based on the assumption that distance and intensity are in the logarithmic relation, Equation (2) is defined.

$$e_{ij}=S_1 \times \log_{10}(d_{ij})+S_2-K_{rj} \qquad (2)$$

where S1 and S2 are correcting coefficients. At this stage, $e_{ij}$ is the intensity of the ID signal transmitted from a known transmitting station whose position has already been estimated. The solutions for the unknown parameters that make the error minimum are obtained by minimizing estimation function q expressed by Equation (3).

$$q = \sum_{j=1}^{m}\sum_{i=1}^{tn}\left(e_{ij} - \hat{S}_1\log_{10}(d_{ij}) - \hat{S}_2 + \hat{K}_{rj}\right)^2 \qquad (3)$$

where rn is the number of receiving stations whose positions are known, and tn is the number of known transmitting stations. To solve all the unknowns, un×tn≧rn+2 must be satisfied. In the example shown in FIG. 26, rn is one and tn is four, and therefore, all the unknowns are solved. For clarification, unknowns are marked with an arc above the symbols.

There are many methods for solving Equation (3) for example, by partially differentiating function q with respect to each variable and obtaining the numerical solutions that make the respective partial differentials zero using the Newton method. Alternatively, the simplex method, the steepest descent method (or saddle point method), methods using neural networks can be used. Using any one of these methods, the correcting coefficients S1, S2 and environmental coefficient Krj are determined.

Next, environmental coefficient Kti for an unknown transmitting station is introduced. Although the transmitting intensity at a transmitting station is constant, the environmental coefficient varies depending on the location, and therefore, a relation between intensity and distance is assumed as Equation (4) introducing environmental coefficient Kti for transmitting station. Equation (4) contains the coefficients S1, S2 and the environmental coefficient Krj for the receiving station that have been determined by Equation (3).

$$md_{ij} = 10^{(e_{ij}-S_2+K_{rj}+K_{ti})/S_1} \qquad (4)$$

where $md_{ij}$ is a distance derived from the measured intensity. Kti can be determined by minimizing estimation function hhhhhhi expressed by Equation (18).

$$hhhhhh_i = \sum_{j=1}^{m}\left(10^{(e_{ij}-S_2+K_{rj}+\hat{K}_{ti})/S_1} - \sqrt{(x_i - u_j)^2 + (y_i - v_j)^2}\right)^2 \qquad (18)$$

For clarification, unknowns are marked with an arc above the symbols. In Equation (18), position (xi, yi) is described using estimated values which are determined from the measured intensity and transmission time using Equation (17).

In the fourth embodiment, the positioning computer 11 carries out the steps of:

(1) determining unknowns in the first and second correcting formulas using the actually measured intensity and transmission, as well as known position information;

(2) estimating a new position of the moving receiving station using the determined values of unknowns and known position information (Algorithm A); and
(3) estimating a position of an unknown transmitting station using known or estimated position information of the moving receiving station (Algorithm B).

As the moving receiving station R2 travels, its communication area also moves. By repeating Algorithms A and B along with shifting of the communication area, the positions and the environmental coefficients of unknown transmitting stations can be obtained successively in new areas. As a result, high-accuracy position estimation is realized over a wide area.

The estimation results (including the positions of unknown transmitting stations and new positions of moving receiving station R2) are stored in the server 12. To obtain the position of a target transmitting station, the user simply inputs the identifier of the target transmitting station through the user terminal 3, which is to be retrieved in the server 12 via LAN 2.

As in the first through third embodiments, when an ID signal cannot be received at a certain receiving station, this unknown information is made use of as a restrictive condition. For example, a signal from transmitting station T2 is received at receiving stations R1, R2, and R3, but is not received at R4. In this case, restrictive conditions d21<d24
d22<d24
d23<d24 are added. Thus, even unknown information is not discarded, and instead, it is effectively used in position estimation.

Figure 28:
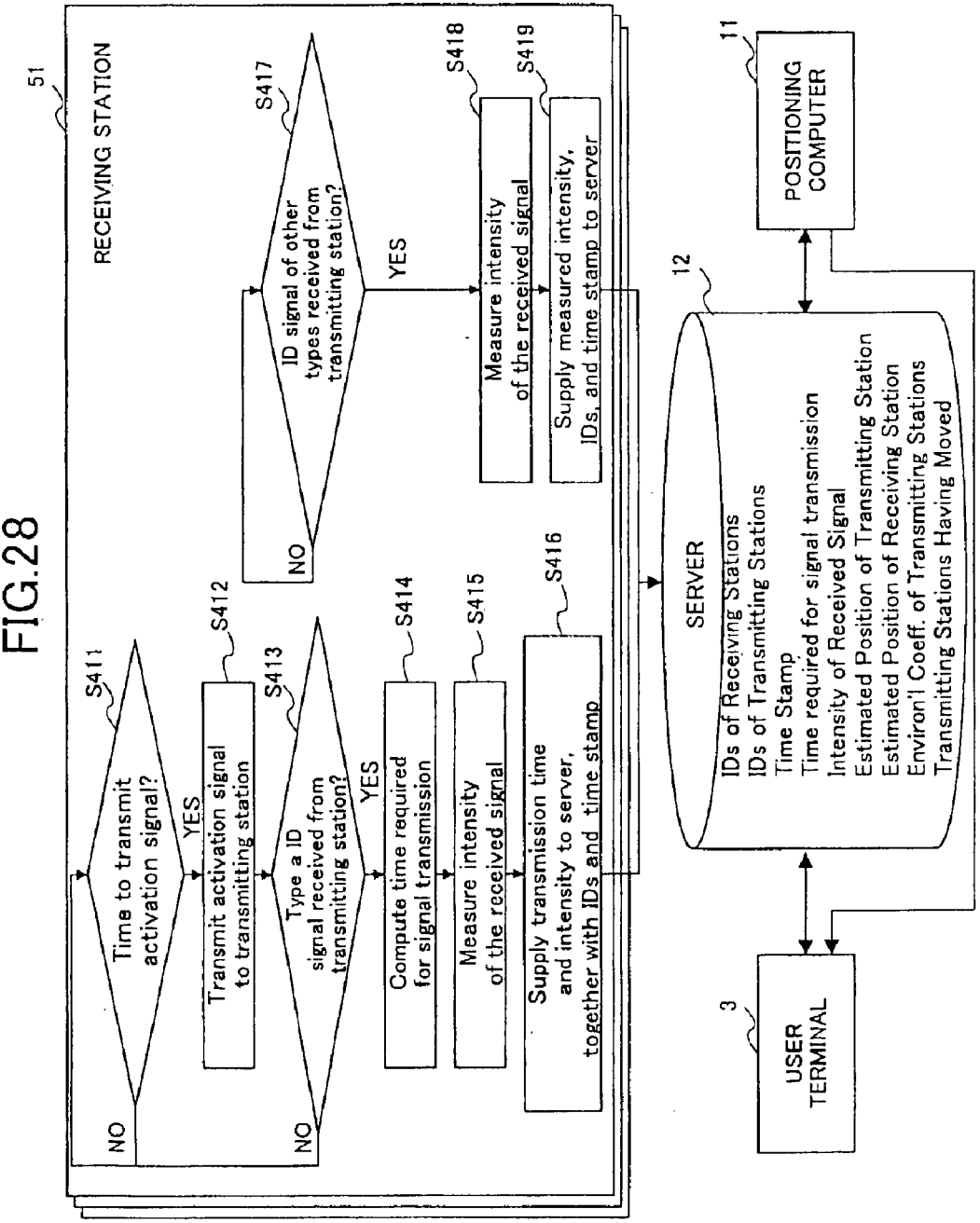
FIG. 28 illustrates the operation flow of the receiving station used in the fourth embodiment.

FIG. 28 illustrates the operation flow of the receiving station 51. Basically, the fixed-position receiving station 51a (R1) and the moving receiving station 51b (R2→R3→R4) carry out the same operation, which is the same as that carried by the receiving station 31 used in the third embodiment.

At a timing for transmitting an activation signal (YES in S411), the receiving station 31 transmits an activation signal to the transmitting station 21 (S412). Then, when receiving an ID signal from the transmitting station in response to the activation signal, it is confirmed if the received signal is a type-a ID signal (S413). If a type-a ID signal has been received (YES in S413), a transmission time required to acquire the ID signal (e.g., time for required to read the identifier since generation of the activation signal) is measured (S414). The intensity of the received ID signal is also measured (S415). The measured transmission time and the intensity are supplied to the server 12, together with the identifier of the transmitting station, the identifier of the receiving station itself, and time stamp (S416). The time stamp may be created by server 12.

The transmitting station transmits ID signals not only when receiving an activation signal, but also when detecting changes due to external factors. Accordingly, the receiving station determines whether other types of ID signals have been received (S417). If an ID signal other than type-a ID signal has been received (YES in S417), the identifier is read from the ID signal, and the intensity of the ID signal is measured (S418). The measured intensity, the identifier of the transmitting station, and the identifier of the receiving station itself are supplied to the server 12, together with time stamp (S419).

Figure 29:
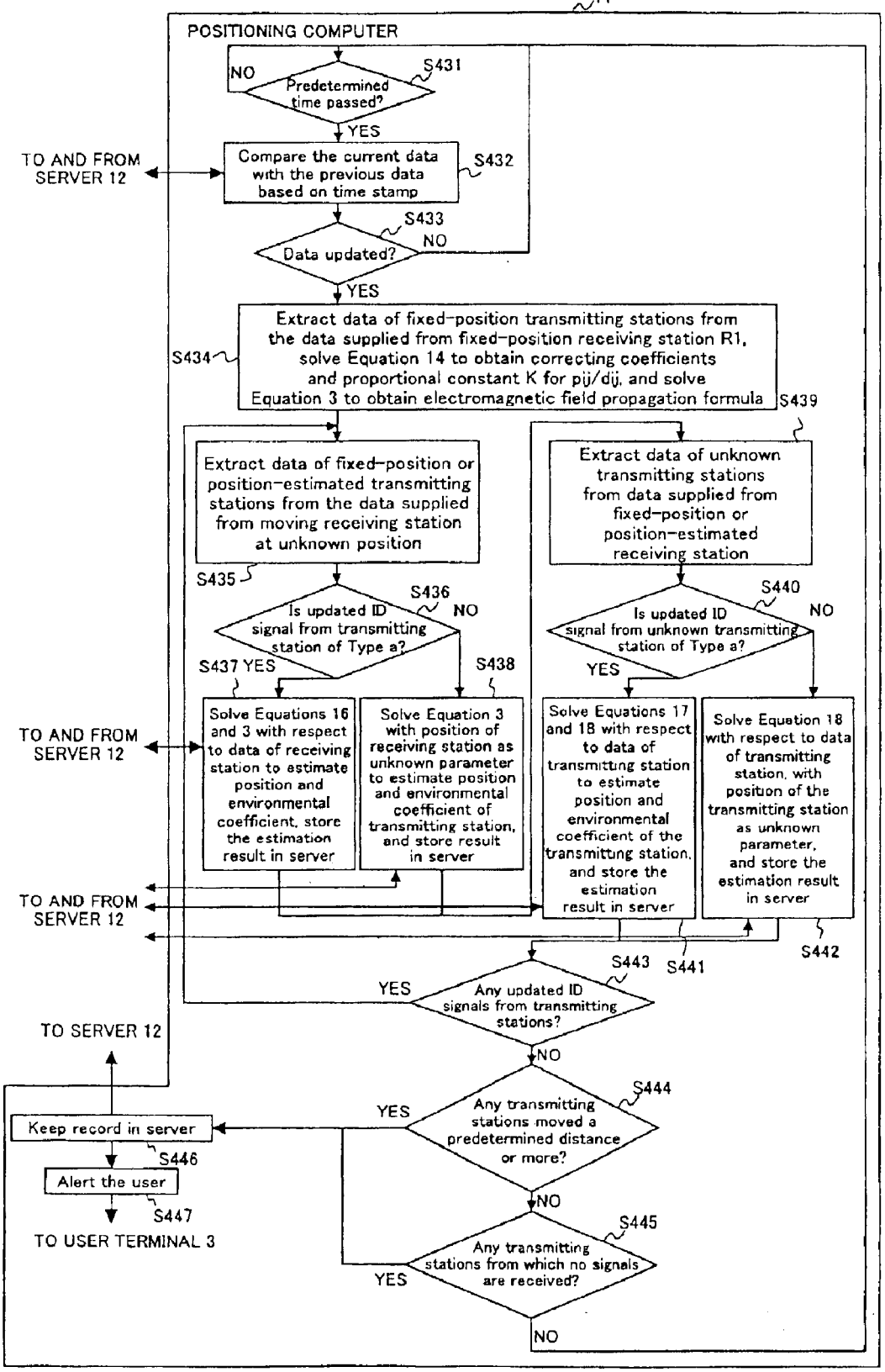
FIG. 29 illustrates the operation flow of the positioning computer used in the fourth embodiment.

FIG. 29 illustrates the operation flow of the positioning computer 11 according to the fourth embodiment. The positioning computer 11 checks time stamps of data stored in the server 12 and determines whether a predetermined amount of time has passed (S431). This step is carried out in order to prevent overlooking because the transmitting station operates discontinuously and because the ID signals may not be received due to signal overlap. Then, based on the time stamps, the current data are compared with the previous data for each identifier (S432) to determine if the current data have been updated (S433). If there are data elements updated from the previous ones (YES in S433), data of fixed-position transmitting stations (T1–T4 in example shown in FIG. 26) whose positions are known in advance are extracted from all the updated data. Using the data of the fixed-position transmitting stations, correcting coefficients B, g, h and proportional constant K for ratio of $p_{ij}$ (signal propagation time through the air) to $d_{ij}$ (distance) that minimize Equation (14) are determined. In addition, correcting coefficients S1, S2 and environmental coefficient Krj that minimize Equation (3) are determined to provide a propagation formula for the electromagnetic field (S434).

(A) Then, data of known or position-estimated transmitting station are extracted from the data supplied from the receiving station R2 at an unknown position (S435). It is then determined whether the ID signal from a data-updated transmitting station is of type a (S436). If the ID signal is of type a (YES in S436), Equation (16) is solved using the measured intensity and transmission time required for acquiring the identifier to estimate the position of the moving receiving station. The estimation result is stored in the server 12. Furthermore, Equation (3) is solved to determine the environmental coefficient Krj of the moving receiving station at the estimated position, which is also stored in the server 12 (S437).

On the other hand, if the ID signal is one of types b–f (NO in S436), Equation (3) is solved, with the position of the moving receiving station as an unknown parameter, to estimate the position and the environmental coefficient of the receiving station. The estimation result is stored in the server 12 (S438). The steps 435–438 correspond to Algorithm (A) described above.

(B) Then, data of an unknown transmitting station is extracted from the data supplied from the fixed-position receiving station R1 or from the moving receiving station at the estimated positions (R2, R3) (S439). It is determined as to the data-updated transmitting station whether the ID signal is of type a (S440). If the ID signal is of type a (YES in S440), Equation (17) is solved using the measured transmission time and intensity to estimate the position of the unknown transmitting station, which is stored in the server 12. Furthermore, Equation (18) is solved to estimate the environmental coefficient Kti for that transmitting station, which is also stored in the server 12. (S441).

On the other hand, the ID signal is not of type a (NO in S440), then Equation (18) is solved, with the position of the target transmitting station as an unknown parameter, to estimate the position and the environmental coefficient of the target (unknown) transmitting station. The estimation result is stored in the server 12 (S442). The steps S439 through S442 correspond to above-described Algorithm (B).

Steps S435–S442 (that is, Algorithms (A) and (B)) are repeated for all the data-updated transmitting stations (YES in S443). The current estimation result is compared with the previous one to select those transmitting stations that have moved a predetermined amount or more (YES in S444) and those transmitting stations from which ID signals are not received at any receiving stations (YES in S445). The selection result is stored in the server 12 (S446), and an alert message is supplied to the associated user terminal (S447).

Table 7 shows an example of a data structure recording the data from the receiving station 51 in the server 12, and Table 8 shows an example of a data structure recording the estimation result supplied from the positioning computer 11.

TABLE 7

DATA STRUCTURE OF SIGNAL INFORMATION
SUPPLIED FROM RECEIVING STATION

| RS ID | TS ID | ID TYPE | TIME STAMP | TRANSMISSION TIME | INTENSITY |
|---|---|---|---|---|---|
| 0001 | 0015 | a | 16:33:10 | 00:00:00000080 | 24 |
| 0001 | 0015 | c | 17:33:10 |  | 23 |
| 0001 | 0015 | a | 16:33:40 | 00:00:00000050 | 14 |
| 0001 | 0016 | a | 16:33:40 | 00:00:00000061 | 13 |
| 0001 | 0017 | a | 16:33:40 | 00:00:00000070 | 12 |
| 0001 | 0018 | a | 16:33:40 | 00:00:00000075 | 14 |

TABLE 8

DATA STRUCTURE OF ESTIMATION RESULTS
SUPPLIED FROM POSITIONING COMPUTER

| TS ID | ID TYPE | TIME STAMP | ESTIMATION (X, Y) | ENVIR'L COEFF. |
|---|---|---|---|---|
| 0015 | a | 17:22:21 | 11.34, 9.15 | 31.0 |
| 0015 | c | 18:22:21 | 11.95, 9.25 | 32.4 |

| RS ID | ID TYPE | TIME STAMP | ESTIMATION (X, Y) | ENVIR'L COEFF. |
|---|---|---|---|---|
| 0002 | a | 17:22:23 | 5.34, 3.15 | 10.0 |
| 0002 | c | 18:22:24 | 6.95, 4.25 | 12.4 |

Environmental coefficient Kti reflects the environment surrounding a transmitting station, and it provides useful information when actually trying to determine the location of the transmitting station. If the environmental coefficient is large, it indicates that the transmitting station is located at an obstructed place with respect to the receiving station. If the environmental coefficient is small, the transmitting station is located at an open space or an unobstructed place. Adding such environmental information to the estimated position allows the user to actually locate the target transmitting station.

The user terminal 3 has two functions, as in the first through third second embodiments, that is, receiving an alert message supplied from the positioning computer 11, and retrieving the position of a target transmitting station. The user inputs the identifier (ID) of the target transmitting station into the user terminal. The user terminal accesses the server 12 to retrieve in the server 12 the past record of that identifier, such as time stamps, position information, environmental coefficient, etc. The retrieved result is displayed on the user terminal.

The user can determine whether the target transmitting station is located at an open space from the position information described by time stamps and the corresponding environmental coefficient. In addition, the user can determine when an activation signal is received at the transmitting station or when external change has been detected from the past record.

In the fourth embodiment, accurate position estimation for a large number of transmitting stations is realized over a wide area, using a fixed-position receiving station and a moving receiving station. For example, position information about four transmitting stations and a receiving station at known positions are used, while another receiving station is allowed to move around. Unknown parameters in the first and second correcting formulas are determined from the position information of the known transmitting stations and the known receiving station, and the measured transmission time and intensity. Then, (A) the position of the moving receiving station at an unknown position is estimated from the position information of at least three known or position-estimated transmitting stations, and (B) the position of an unknown transmitting station is estimated from the position information of at least three known and/or position-estimated receiving stations. By repeating operations (A) and (B), the coordinates of unknown transmitting stations are successively estimated.

As an application of the fourth embodiment, the fixed-position receiving station 51a can be realized as a gate, and the moving receiving station 51b can be attached to an object, such as a vacuum cleaner, that travels around within a predetermined area.

Although in the fourth embodiment only a single fixed-position receiving station is used, two or more fixed-position receiving stations may be combined with a moving receiving station. In this case, if the number of fixed-position receiving stations is rn, and if the number of known transmitting stations is tn, then $rn \times tn \geq rn+4$ and $rn \times tn \geq rn+2$ must be satisfied. If two fixed-position receiving stations are used, the number of know transmitting stations required at the initial stage is two.

[Fifth Embodiment]

Figure 30:
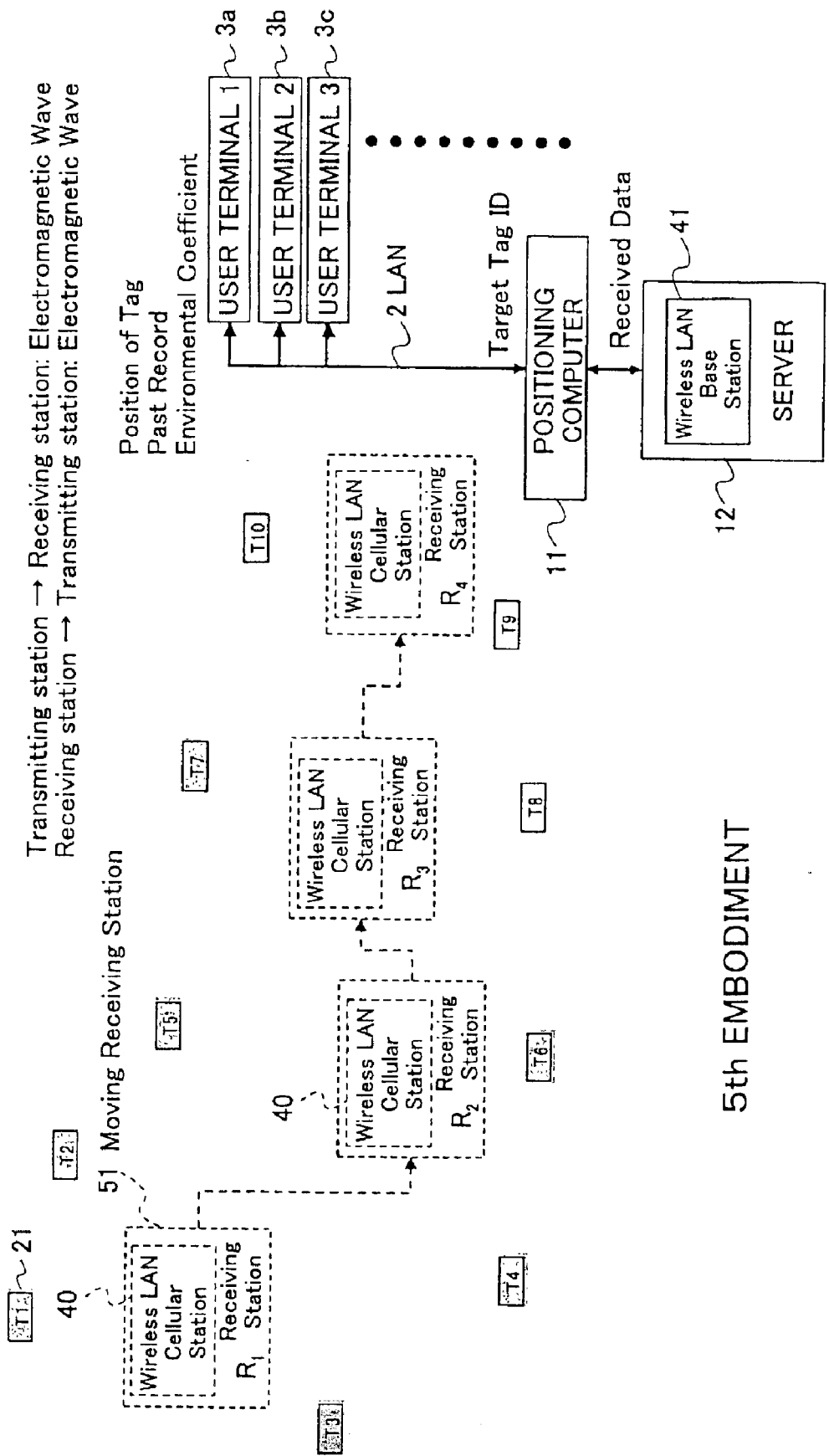
FIG. 30 illustrates a locating system according to the fifth embodiment of the invention.
Figure 31:
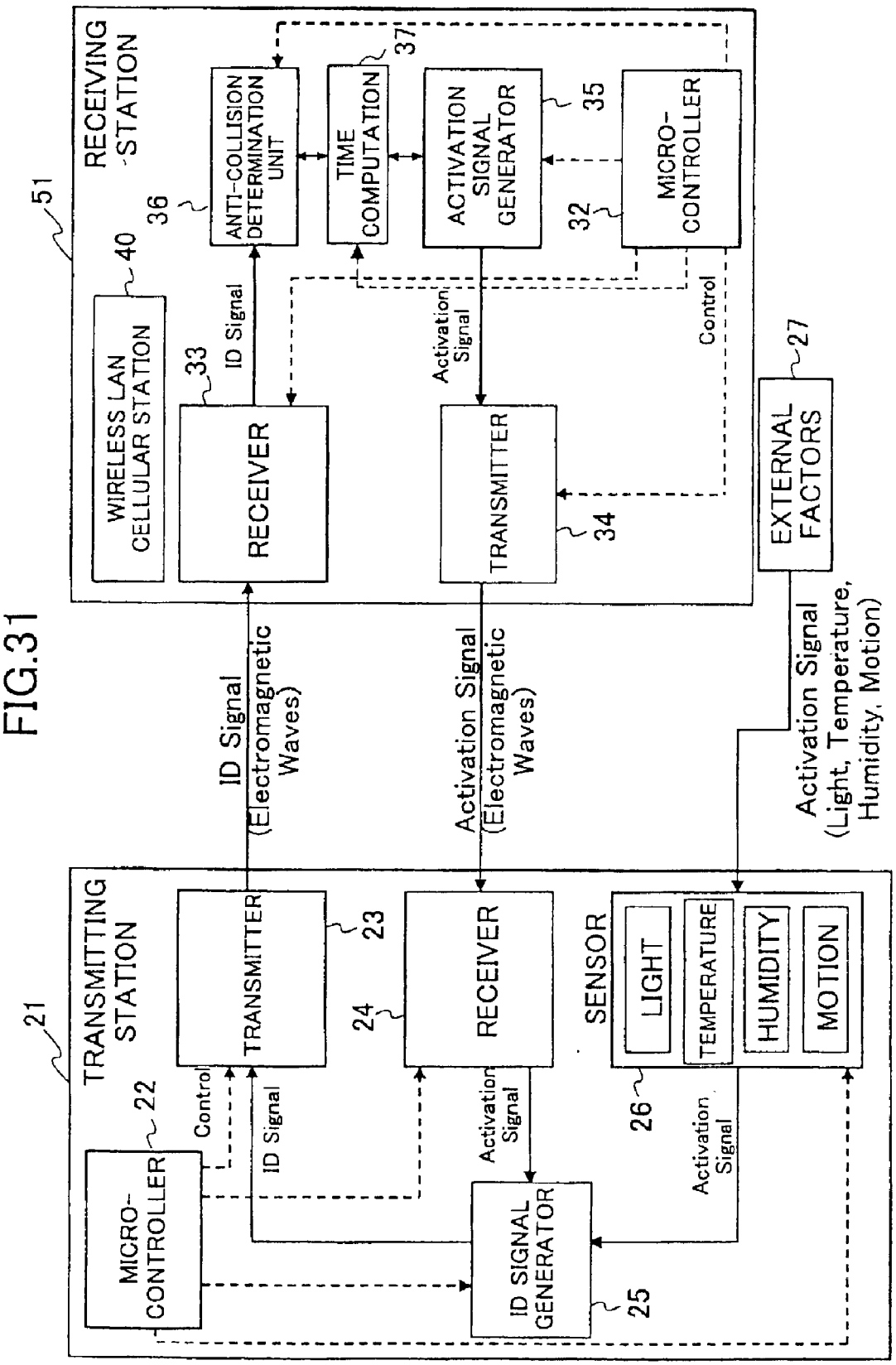
FIG. 31 illustrates the structures of the transmitting station and the receiving station used in the locating system of the fifth embodiment.

FIG. 30 illustrates a locating system according to the fifth embodiment, and FIG. 31 illustrates the structures of the transmitting station 21 and the receiving station 51 used in the system shown in FIG. 30. In the fifth embodiment, a single moving receiving station is solely used, without using a fixed-position receiving station.

As illustrated in FIG. 30, the locating system of the fifth embodiment comprises a moving receiving station 51, transmitting stations 21 (T1–T10), a server 12, a positioning computer 11, and user terminal 3. The positioning computer 11, the server 12, and the user terminals are mutually connected via LAN 2. Since, in the fifth embodiment, a single moving receiving station 51 is used, the server 12 has a wireless LAN base station 41, and the receiving station 51 has a wireless LAN cellular station 40.

The moving receiving station 51 has a microcontroller 32, a receiver 33, a transmitter 34, an activation signal generator 35, an anti-collision determination unit 36, and a time computation unit 37. The microcontroller 32 controls the operation of the receiving station 51 and has built-in memories, such as ROM and RAM. The activation signal generator 35 generates an activation signal, and the transmitter 34 transmits the activation signal to transmitting stations. The receiver 33 receives an ID signal from each transmitting station and measures the intensity of the received ID signal. The anti-collision determination unit 36 reads or extracts the identifier from the ID signal. The time computation unit 37 measures a transmission time required to acquire the ID signal. In the fourth embodiment, transmission time is the time required to read the identifier since the generation of the activation signal. However, the time computation unit 37 may be connected between the transmitter 34 and the receiver 33. In this case, the transmission time is the time required to receive the ID signal since transmission of the activation signal.

The transmitting station 21 has the same structure as illustrated in the second through fourth embodiments. Namely, the transmitting station 21 has a microcontroller 22, a transmitter 23, an ID signal generator 25, and a sensor 26. The ID signal generator 25 periodically generates an ID signal containing a unique identifier (ID) of that transmitting station 21. The microcontroller 22 controls the operation of the transmitting station 21, and has built-in memories, such as ROM and RAM. The receiver 24 receives the activation signal transmitted from the receiving station and supplies the activation signal to the ID signal generator 25. The sensor 26 detects changes in various parameters, which are caused by external factors 27, and supplies the detection result to the ID signal generator 25. The ID signal generator 25 generates different kinds of ID signals when receiving the activation signal from the receiving station and when detecting a change, in addition to a periodic signal of a relatively long interval. With this arrangement, an ID signal is transmitted when it is actually required, and power consumption of the battery can be reduced. The size of the log file can also be reduced. The sensor 26 is realized by combining an acceleration sensor using an inverted pendulum, a light sensor, a temperature sensor, a humidity sensor, and other types of sensors.

The positioning computer 11 estimates the position of a transmitting station based on the data supplied from the single moving receiving station 51 via the wireless LAN to the server 12, according to the algorithm described below.
<Algorithm for Correcting Transmission Time>

In the example shown in FIG. 30, the positions of transmitting stations T1–T7 are known (and these transmitting stations are referred to as "known transmitting stations"). The moving receiving station 51 travels with its position changing R1→R2→R3→R4, as indicated by the dashed arrows. The initial position R1 of the moving receiving station 51 is (u1, v1), and the $j^{th}$ position of the moving receiving station 51 is (uj,vj) The positions of transmitting stations T8–T10 are unknown (and these transmitting stations are referred to as "unknown transmitting stations"), and the position of the $i^{th}$ transmitting station is (xi, yi). An ID signal is transmitted from a transmitting station to the receiving station 51 via electromagnetic waves, and the intensity of the ID signal received at the receiving station at the $j^{th}$ position (referred to as the $j^{th}$ receiving station for convenience) is $e_{ij}$. The distance between the $i^{th}$ transmitting station and the $j^{th}$ receiving station is $d_{ij}$, which is expressed by Equation (1).

$$d_{ij}=\sqrt{(x_{i-u_j})^2+(y_{i-v_j})^2} \quad (1)$$

First, transmission time $t_{ij}$, required to acquire the ID signal and read the identifier, is corrected using known position information of the known transmitting stations. The transmission time $t_{ij}$ is the sum of a propagation time $p_{ij}$ of the signal (electromagnetic wave in this embodiment) through the air, a signal propagation time A in the receiving station, and a signal propagation time b in the transmitting station.

$$t_{ij}=p_{ij}+A+b \quad (6)$$

Among the terms in the right-hand side, propagation time A in the receiving station 51 can be regarded as constant because a high-speed receiving operation is realized using a sufficient power source. In contrast, the propagation time b in the transmitting station 21 has a strong correlation with the intensity $e_{ij}$ because of the reversibility of propagation depending on the configuration of the activation signal detection circuit (not shown) of each transmitting station. The correlation varies depending on the technique for detecting the activation signal, and an approximate formula using a polynomial or an exponential function can be applied. For example, receipt of the activation signal is sensed by a diode, charging a capacitor. Then, it can be regarded that the activation signal has been detected when the voltage reaches a predetermined level. In this case, an approximate formula defined by Equation (7) is assumed using an exponential function, which describes the correlation between intensity $e_{ij}$ and propagation time b in the transmitting station.

$$b=f+g\,\exp(-h \times e_{ij}) \quad (7)$$

In Equation (7), f, g, and h are correcting coefficients. Equation (7) is inserted in Equation (6) to obtain Equation (8).

$$t_{ij}=p_{ij}+A+f+g\,\exp(-h \times e_{ij}) \quad (8)$$

Since distance $d_{ij}$ between the transmitting station 21 and the receiving station 51 is proportional to signal propagation time $p_{ij}$ through the air, Equation (8) is modified as Equation (19).

$$p_{ij}=t_{ij}-A-f-g\,\exp(-h \times e_{ij})=Kd_{ij}=K\sqrt{(x_{i-u_j})^2+(y_{i-v_j})^2} \quad (19)$$

where K is a proportional constant.

At this stage, $e_{ij}$ is the intensity of the ID signal transmitted from each of transmitting stations T1–T7 whose positions are already known (referred to as "known transmitting stations"). Unknown parameters are seven, that is, A, F, g, h, K, uj and vj. If A and f are considered as a single parameter B (=A+f), then the number of unknowns becomes six. The solutions for these unknowns that minimize the error are obtained by minimizing estimation function qqqq expressed by Equation (20).

$$qqqq = \sum_{j=1}^{m}\sum_{i=1}^{tn}\left(t_{ij}-\hat{B}-\hat{g}\exp\!\left(-\hat{h}\times e_{ij}\right)-\hat{K}\sqrt{\left(x_i-\hat{u}_j\right)^2+\left(y_i-\hat{v}_j\right)^2}\right)^2 \quad (20)$$

where rn is the number of the receiving stations, and tn is the number of known transmitting stations. In order to solve all the unknowns, rn×tn≧3×rn+4 must be satisfied. In the example shown in FIG. 30, rn is one and tn is seven, and therefore, all the unknowns can be solved. For the purpose of clarification, unknowns are marked with an arc above the symbols.

There are many known methods for solving Equation (20). For example, partially differentiating function qqqq with respect to each variable, and obtaining the numerical solutions that make the respective partial differentials zero using, for example, the Newton method. Alternatively, the simplex method, the steepest descent method (or saddle point method), methods using neural networks can be used. Using any one of these methods, the correcting coefficients B, g and h, a proportional constant K for the signal propagation time $p_{ij}$ and distance $d_{ij}$, and the position (uj, vj) of the receiving station 51 are determined.

Distance $nnd_{ij}$ from an unknown transmitting station to a known receiving station can be derived using the signal propagation time $p_{ij}$ determined by Equation (20). The relation between $nd_{ij}$ and $p_{ij}$ is expressed by Equation (21) using proportional constant K.

$$nnnd_{ij} = \frac{p_{ij}}{K} = \frac{\{t_{ij} - B - g\exp(-h \times e_{ij})\}}{K} \quad (21)$$

where $nnd_{ij}$ is a distance derived from the measured transmission time. Then, the position of an unknown transmitting station can be estimated using K, B, g, h determined by Equation (20) in combination with the intensity and the transmission time measured at the position-estimated receiving station 51.

<Algorithm Used When the Moving Receiving Station Travels>

As the moving receiving station 51 travels from R1 to R2, and to R3, the new position (uj, vj) of the moving receiving station 51 can be estimated using position information of the known transmitting stations T1–T7, using Equation (20).

The moving receiving station 51 transmits an activation signal to an unknown transmitting station at each of the estimated positions. Then, at least three estimated positions "j" of the receiving station 51 are used to estimate the position (xi, yi) of the unknown transmitting station "i". The estimation is made by minimizing estimation function hhhhhhhi expressed by Equation (22).

$$hhhhhhh_i = \sum_{j=1}^{rrn} \left( \frac{\{t_{ij} - B - g\exp(-h \times e_{ij})\}}{K} - \sqrt{(\hat{x}_i - u_j)^2 + (\hat{y}_i - v_j)^2} \right)^2 \quad (22)$$

where rrrn is the number of available (estimated) positions of the moving receiving station 51. For the purpose of clarification, the unknowns are marked with an arc above the symbols.

<Algorithm Used when Known Transmitting Station is Out of Area>

As the moving receiving station 51 travels, the transmitting stations T1–T7 fixed at known positions are out of the communication area of the receiving station 51. Accordingly, the positions of transmitting stations T8–T10, which have already been estimated in the above-described manner, are used to estimate a new position of the moving receiving station 51.

The positions of transmitting stations T8–T10 are successively estimated using the time-correcting algorithm using the second correcting formula and the algorithm for a moving receiving station. By making use of the estimated position information, the estimation accuracy for the environmental coefficient Kti for the transmitting station can be improved.

As in the previous embodiments, environmental coefficient Krj for the receiving station "j" is first defined. The environmental coefficient Krj is an index indicating how the sensitivity of the receiving station changes from the ideal condition. Similarly, environmental coefficient Kti for a target transmitting station is also defined.

First, the Friis' formula is corrected using correcting coefficients S1, S2, and an environmental coefficient Krj to define a relation between distance "d" and intensity "e", using the actually measured values between the transmitting station 21 and the receiving station 51. Based on the assumption that distance and intensity are in the logarithmic relation, Equation (2) is defined.

$$e_{ij} = S_1 \times \log_{10}(d_{ij}) + S_2 - K_{rj} \quad (2)$$

where S1 and S2 are correcting coefficients. At this stage, $e_{ij}$ is the intensity of the ID signal transmitted from each of the known transmitting stations T1–T7. The solutions for the unknown parameters that make the error minimum are obtained by minimizing estimation function q expressed by Equation (3).

$$q = \sum_{j=1}^{m} \sum_{i=1}^{tn} \left( e_{ij} - \hat{S}_1 \log_{10}(d_{ij}) - \hat{S}_2 + \hat{K}_{rj} \right)^2 \quad (3)$$

where rn is the number of receiving stations whose positions are known, and tn is the number of known transmitting stations. To solve all the unknowns, $un \times tn \geq rn+2$ must be satisfied. In the example shown in FIG. 26, rn is one and tn is seven, and therefore, all the unknowns are solved. For clarification, unknowns are marked with an arc above the symbols.

There are many methods for solving Equation (3), for example, by partially differentiating function q with respect to each variable and obtaining the numerical solutions that make the respective partial differentials zero using the Newton method. Alternatively, the simplex method, the steepest descent method (or saddle point method), methods using neural networks can be used. Using any one of these methods, the correcting coefficients S1, S2 and environmental coefficient Krj are determined.

Next, environmental coefficient Kti for an unknown transmitting station is introduced. Although the transmitting intensity at a transmitting station is constant, the environmental coefficient varies depending on the location, and therefore, a relation between intensity and distance is assumed as Equation (4) introducing environmental coefficient Kti for transmitting station. Equation (4) contains the coefficients S1, S2 and the environmental coefficient Krj for the receiving station that have been determined by Equation (3).

$$md_{ij} = 10^{(e_{ij} - S_2 + K_{rj} + K_{ti})/S_1} \quad (4)$$

where $md_{ij}$ is a distance derived from the measured intensity. Kti can be determined by minimizing the estimation function hhhhhhhi expressed by Equation (23).

$$hhhhhhhh_i = \sum_{j=1}^{m} \left( 10^{(e_{ij} - S_2 + K_{rj} + \hat{K}_{ti})/S_1} - \sqrt{(x_i - u_j)^2 + (y_i - v_j)^2} \right)^2 \quad (23)$$

For clarification, unknowns are marked with an arc above the symbols. In Equation (23), position (xi, yi) is described using estimated values which are determined from the measured intensity and transmission time using Equation (22).

As in the first through fourth embodiments, when an ID signal cannot be received at a certain receiving station, this unknown information is made use of as a restrictive condition. For example, a signal from transmitting station T2 is received at positions R1, R2, and R3 of the receiving station, but is not received at R4. In this case, restrictive conditions d21<d24 d22<d24 d23<d24 are added. Thus, even unknown information is not discarded, and instead, it is effectively used in position estimation.

Figure 32:
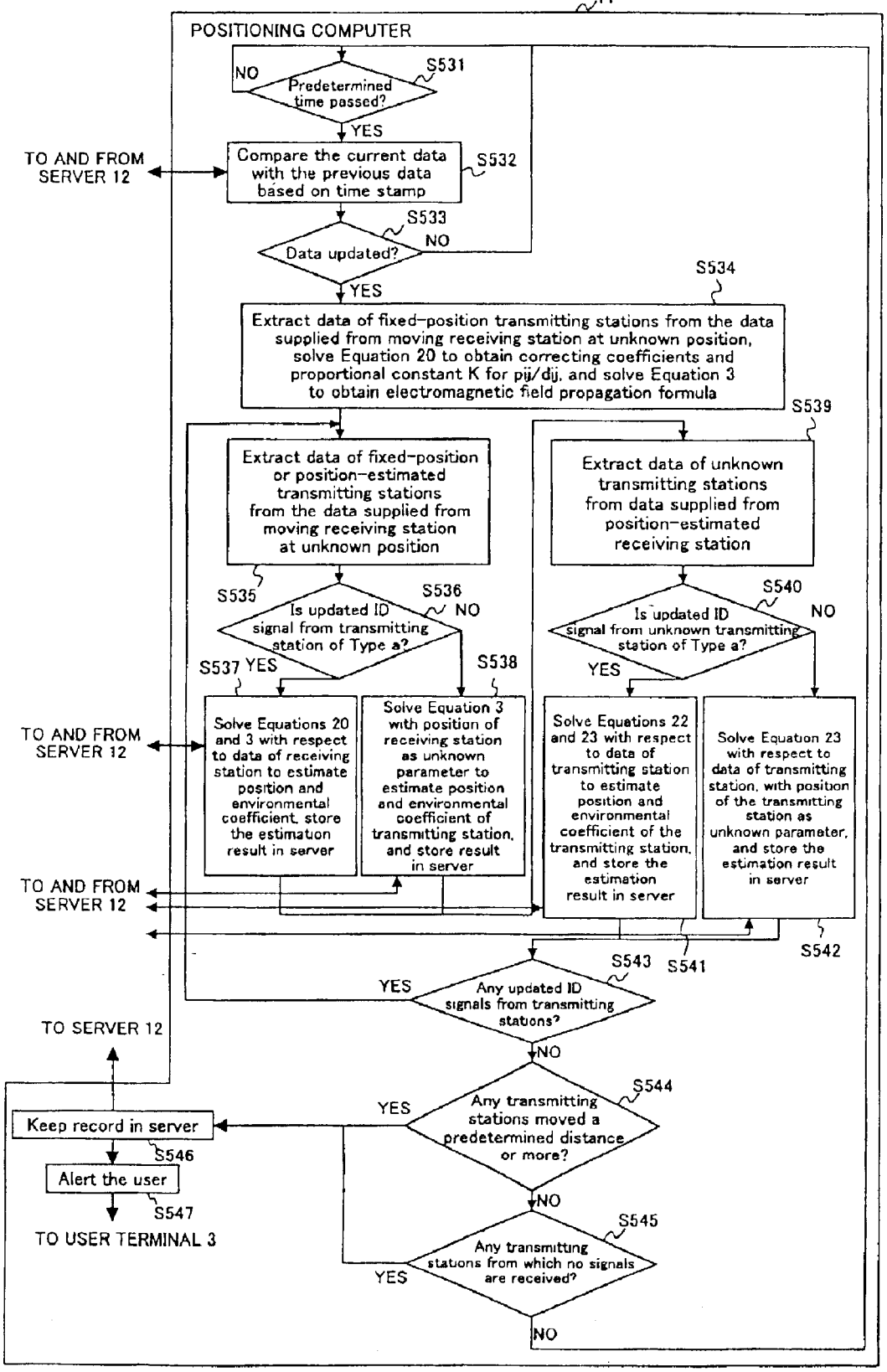
FIG. 32 illustrates the operation flow of the positioning computer used in the fifth embodiment.

FIG. 32 illustrates the operation flow of the positioning computer 11 according to the fourth embodiment. The positioning computer 11 checks time stamps of data stored in the server 12 and determines whether a predetermined amount of time has passed (S531). This step is carried out in order to prevent overlooking because the transmitting station operates discontinuously and because the ID signals may not be received due to signal overlap. If a predetermined time has passed (YES in S531), then the current data are compared with the previous data for each identifier (S532) to determine if the current data have been updated (S533). If there are data elements updated from the previous ones (YES in S533), data of fixed-position transmitting stations (T1–T7 in example shown in FIG. 30) whose positions are known in advance are extracted from all the updated data. Using the data of the fixed-position transmitting stations, correcting coefficients B, g, h and proportional constant K for ratio of $p_{ij}$ (signal propagation time through the air) to $d_{ij}$ (distance) that minimize Equation (20) are determined. In addition, correcting coefficients S1, S2 and environmental coefficient Krj that minimize Equation (3) are determined to provide a propagation formula for the electromagnetic field (S534).

(A) Then, data of known or position-estimated transmitting stations are extracted from the data supplied from the moving receiving station 51 at an unknown position (S535). It is then determined whether the ID signal from a data-updated transmitting station is of type a (S536). If the ID signal is of type a (YES in S536), Equation (20) is solved using the measured intensity and transmission time to estimate the position of the moving receiving station. The estimation result is stored in the server 12. Furthermore, Equation (3) is solved to determine the environmental coefficient Krj of the moving receiving station at the estimated position, which is also stored in the server 12 (S537).

On the other hand, if the ID signal is one of types b–f (NO in S536), there is no information about the transmission time, and therefore, Equation (3) is solved, with the position of the moving receiving station as an unknown parameter, to estimate the position and the environmental coefficient of the receiving station The estimation result is stored in the server 12 (S538).

(B) Then, data of an unknown transmitting station is extracted from the data supplied from the moving receiving station 51 at the estimated positions (S539). It is determined as to the data-updated transmitting station whether the ID signal is of type a (S540). If the ID signal is of type a (YES in S540), Equation (22) is solved using the measured transmission time and intensity to estimate the position of the unknown transmitting station, which is stored in the server 12. Furthermore, Equation (23) is solved to estimate the environmental coefficient Kti for that transmitting station, which is also stored in the server 12. (S541).

On the other hand, if the ID signal is not of type a (NO in S540), then Equation (23) is solved, with the position of the target transmitting station as an unknown parameter, to estimate the position and the environmental coefficient of the target (unknown) transmitting station. The estimation result is stored in the server 12 (S542).

Algorithms (A) and (B) are repeated for all the data-updated transmitting stations (YES in S543). When all the updated data have been processed (NO in S543), the current estimation result is compared with the previous one to select those transmitting stations that have moved a predetermined amount or more (YES in S544) and those transmitting stations from which ID signals are not received at any receiving stations (YES in S545). The selection result is stored in the server 12 (S546), and an alert message is supplied to the associated user terminal (S547).

Table 9 shows an example of a data structure recording the data from the receiving station 51 in the server 12, and Table 10 shows an example of a data structure recording the estimation result supplied from the positioning computer 11.

TABLE 9

DATA STRUCTURE OF SIGNAL INFORMATION
SUPPLIED FROM RECEIVING STATION

| RS ID | TS ID | ID TYPE | TIME STAMP | TRANSMISSION TIME | INTENSITY |
|-------|-------|---------|------------|-------------------|-----------|
| 0001 | 0015 | a | 16:33:10 | 00:00:00000080 | 24 |
| 0001 | 0015 | c | 17:33:10 | | 23 |
| 0002 | 0015 | a | 16:33:40 | 00:00:00000050 | 14 |
| 0002 | 0016 | a | 16:33:40 | 00:00:00000061 | 13 |
| 0002 | 0017 | a | 16:33:10 | 00:00:00000070 | 12 |
| 0002 | 0018 | a | 16:33:10 | 00:00:00000075 | 14 |

TABLE 10

DATA STRUCTURE OF ESTIMATION RESULTS
SUPPLIED FROM POSITIONING COMPUTER

| TS ID | ID TYPE | TIME STAMP | ESTIMATION (X, Y) | ENVIR'L COEFF. |
|---|---|---|---|---|
| 0015 | a | 17:22:21 | 11.34, 9.15 | 31.0 |
| 0015 | c | 18:22:21 | 11.95, 9.25 | 32.4 |

| RS ID | ID TYPE | TIME STAMP | ESTIMATION (X, Y) | ENVIR'L COEFF. |
|---|---|---|---|---|
| 0002 | a | 17:22:23 | 5.34, 3.15 | 10.0 |
| 0002 | c | 18:22:24 | 6.95, 4.25 | 12.4 |

Environmental coefficient Kti reflects the environment surrounding a transmitting station, and it provides useful information when actually trying to determine the location of the transmitting station. If the environmental coefficient is large, it indicates that the transmitting station is located at an obstructed place with respect to the receiving station. If the environmental coefficient is small, the transmitting station is located at an open space or an unobstructed place. Adding such environmental information to the estimated position allows the user to actually locate the target transmitting station.

The user terminal 3 has two functions, as in the first through fourth embodiments, that is receiving an alert message supplied from the positioning computer 11, and retrieving the position of a target transmitting station. The user inputs the identifier (ID) of the target transmitting station into the user terminal. The user terminal accesses the server 12 to retrieve in the server 12 the past record of that identifier, such as time stamps, position information, environmental coefficient, etc. The retrieved result is displayed on the user terminal.

The user can determine whether the target transmitting station is located at an open space from the position information described by time stamps and the corresponding environmental coefficient. In addition, the user can determine when an activation signal is received at the transmitting station or when external change has been detected from the past record.

In the fifth embodiment, accurate position estimation for a large number of transmitting stations is realized over a wide area, using a single moving receiving station. Using a fixed-position receiving station requires the number of receiving station to be increased, and the cost for system construction increased. With the system of the fifth embodiment, the construction cost and the maintenance cost are greatly reduced.

If the receiving station is moved in the conventional system, the presence or absence can be confirmed, but the position coordinates can not be obtained. In contrast, the locating system of the fifth embodiment can estimate the position of an unknown transmitting station allowing the receiving station to travel around. That is, first and second correcting formulas are determined using position information about seven known transmitting station T1–T7. Then (A) the position of the moving receiving station is estimated using information about at least known or position-estimated transmitting stations, and (B) the position of an unknown transmitting station is estimated using information about at least three estimated positions of the receiving station. By repeating (A) and (B), position information of unknown transmitting stations is successively acquired over a wide area.

By determining the environmental coefficient for a transmitting station, position estimation becomes more accurate taking the environment into account.

As an application of the fifth embodiment, the moving receiving station 51 is attached to an object, such as a vacuum cleaner, that travels around within a predetermined area. As the object (or the vacuum cleaner) travels, the entire area can be checked regularly and automatically. Inventories or assets are controlled over a wide area without using a large number of fixed-position receiving stations. Consequently, the cost of the entire system can be reduced, and an economical and efficient system can be achieved.

[Sixth Embodiment]

In the first through fifth embodiments, a first correcting formula expressed as $$e_{ij}=S_1 \times \log_{10}(d_{ij})+S_2-K_{rj} \quad (2)$$

is used when estimating the position of a transmitting station. In the sixth embodiment, a modification of the first correcting formula (Equation (2)) is provided. The modified formula will be explained using the locating system of the first embodiment shown in FIGS. 5 and 6.

There are four receiving stations R1–R4 whose positions are known in advance. There are eight transmitting stations T1–T8, among which the positions of T1–T4 are known. The position of the $j^{th}$ known receiving station is (uj, vj), and the position of the $i^{th}$ transmitting station is (xi, yi). The intensity of the ID signal received at the $j^{th}$ receiving station is $e^{ij}$, and the distance between the $i^{th}$ transmitting station and the $j^{th}$ receiving station is expressed by Equation (1).

$$d_{ij}=\sqrt{(x_i-u_j)^2+(y_i-v_j)^2} \quad (1)$$

Then, environmental coefficient Krj for the $j^{th}$ receiving station is defined. Environmental coefficient Krj is an index indicating how the sensitivity of the receiving station changes from the ideal condition. Similarly, environmental coefficient Kti for the $i^{th}$ transmitting station is defined. The Friis' formula is corrected using correcting coefficients S1, S2, and an environmental coefficient Krj to define a relation between distance "d" and intensity "e", on the assumption that distance and intensity are in the logarithmic relation. The corrected formula is expressed as $$e_{ij}=S_1 \times \log_{10}(d_{ij}+S_2)-K_{rj} \quad (24)$$

where S1, S2 are correcting coefficients, and $e_{ij}$ is the intensity of the ID signal transmitted from the known transmitting stations T1–T4. The solutions for the unknown parameters that make the error minimum are obtained by minimizing estimation function q expressed by Equation (25).

$$q = \sum_{j=1}^{rn} \sum_{i=1}^{tn} \left(e_{ij} - \hat{S}_1 \log_{10}\left(d_{ij} + \hat{S}_2\right) + \hat{K}_{rj}\right)^2 \quad (25)$$

where rn is the number of receiving stations whose positions are known, and tn is the number of known transmitting stations. To solve all the unknowns, un×tn≧rn+2 must be satisfied. In the example of the first embodiment, rn is four and tn is four, and therefore, all the unknowns are solved. For clarification, unknowns are marked with an arc above the symbols.

There are many methods for solving Equation (25) for example, by partially differentiating function q with respect to each variable and obtaining the numerical solutions that make the respective partial differentials zero using the Newton method. Alternatively, the simplex method, the steepest descent method (or saddle point method), methods using neural networks can be used. Using any one of these methods, the correcting coefficients S1, S2 and environmental coefficient Krj are determined.

Next, environmental coefficient Kti for a target transmitting station whose position is unknown (simply referred to as "unknown transmitting station") will be introduced. Although the transmitting intensity at a transmitting station is constant, the environmental coefficient varies depending on the location, and therefore, the intensity of the received signal varies. Accordingly, a relation between intensity and distance is assumed as defined in Equation (26), using the environmental coefficient Krj, and correcting coefficients S1 and S2 determined by Equation (25)

$$md_{ij} = 10^{(e_{ij}+K_{rj}+K_{ti})/(S_1)} - S_2 \quad (26)$$

where $md_{ij}$ is a distance derived from the measured intensity, and Kti is environmental coefficient for the transmitting station "i". The position and the environmental coefficient of the transmitting station "i" are obtained by minimizing estimation function (27).

$$h_i = \sum_{j=1}^{m} \left(10^{(e_{ij}+K_{rj}+\hat{K}_{tr})/(S_1)} - S_2 - \sqrt{(\hat{x}_i - u_j)^2 + (\hat{y}_i - v_j)^2}\right)^2 \quad (27)$$

In this manner, the position and the environmental coefficient of an unknown transmitting station can be estimated accurately from the actually measured intensity and known position information, using a modified correcting formula.

Figure 33:
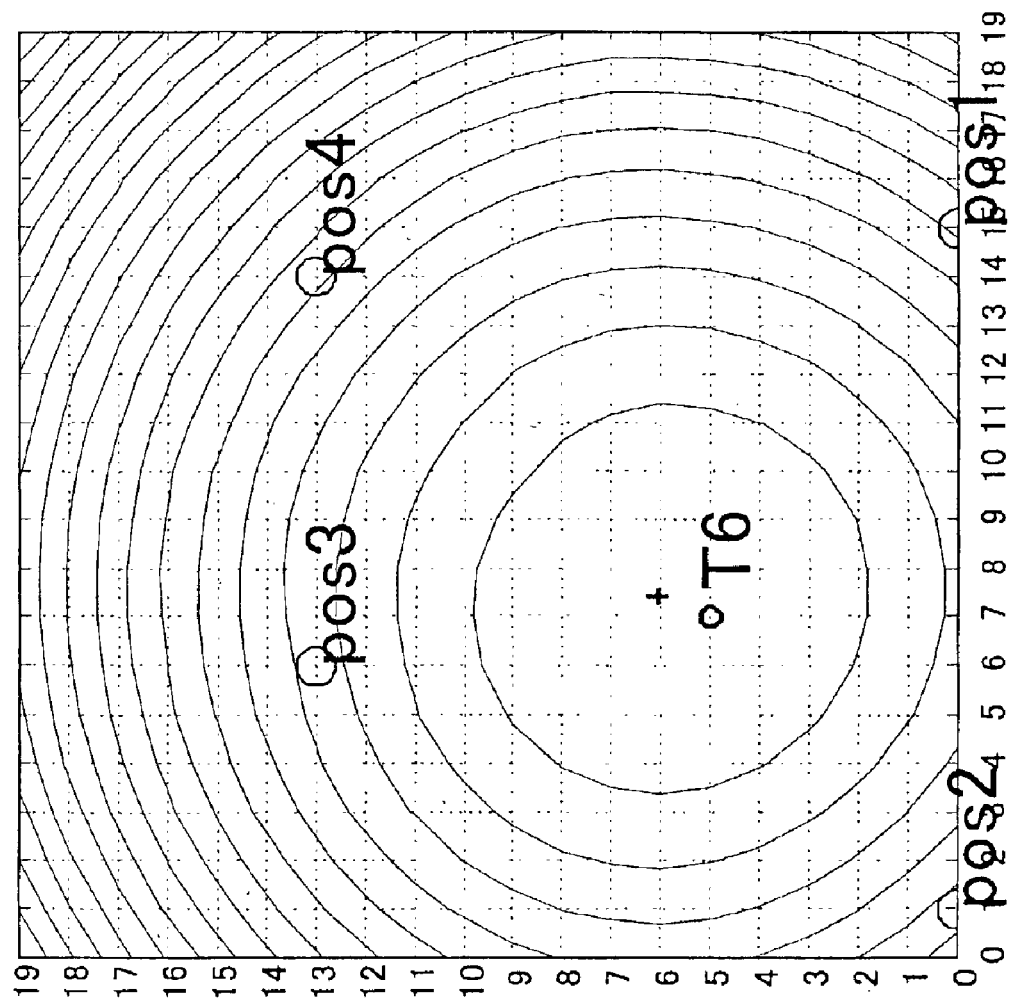
FIG. 33 illustrates a measuring result of the position of a transmitting station using the modified first correcting formula according to the sixth embodiment of the invention.
Figure 34:
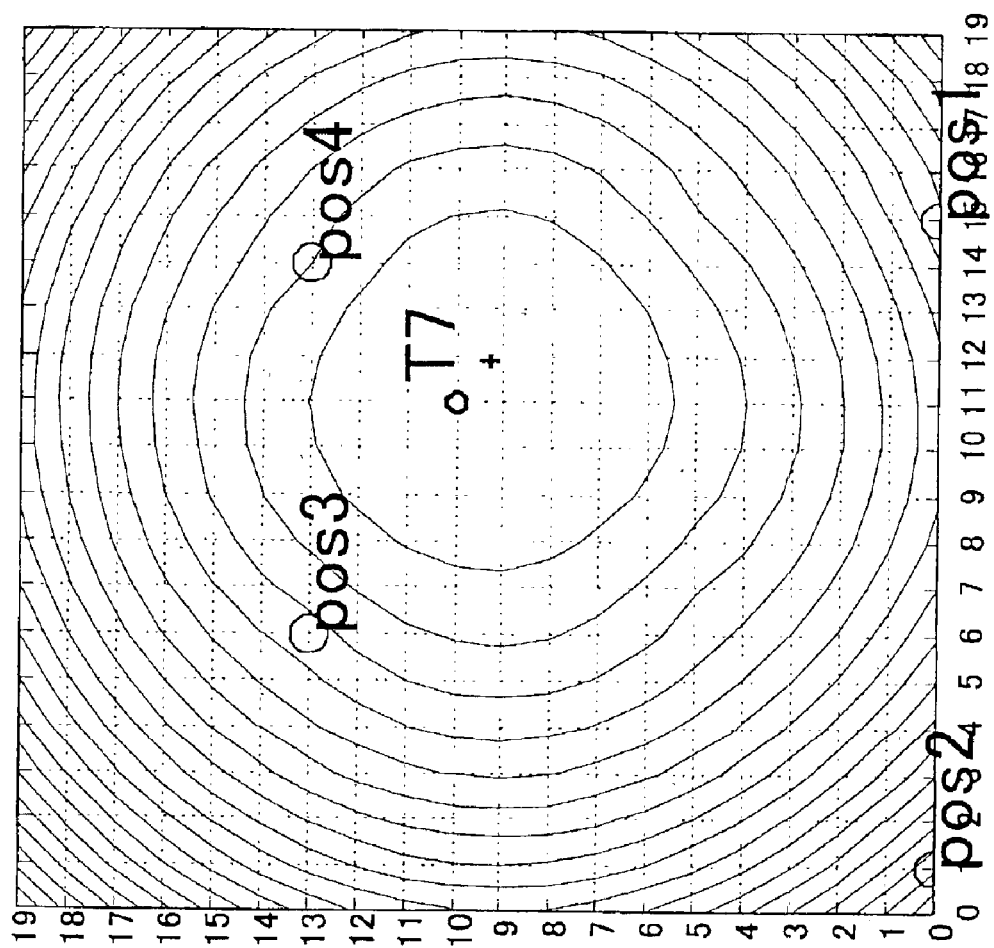
FIG. 34 illustrates another measuring result of the position of a different transmitting station using the modified first correcting formula according to the sixth embodiment of the invention.

FIG. 33 and FIG. 34 illustrate test results of actually estimating positions of transmitting stations using the locating system 1 shown in FIG. 5, using the modified first correcting formula. In the test, four receiving stations are fixed at positions indicated by pos1–pos4. FIG. 33 shows the estimation result for transmitting station T6, and FIG. 34 shows the estimation result for transmitting station T7. The circle indicates the actual position of the transmitting station, and the cross indicates the estimated position using the modified first correcting formula. The estimation function expressed by Equation (27) is incorporated as contour lines in the diagrams. The estimation error for transmitting station T6 is 0.4 in the X-direction and 0.9 in the Y-direction, and the corresponding distance is 1.0. The estimation error for transmitting station T7 is 0.9 in the X-direction and −0.7 in the Y-direction, and the corresponding distance is 1.14. The square in the diagram is a unit area on the floor, and a side is 1.35 m.

The conventional systems have only a function of specifying presence or absence of a transmitting station within the communication area of a certain receiving station. For this reason, the position estimated by the conventional systems agrees with the position of the receiving station that has the maximum intensity. With the conventional system, the estimated position of the transmitting station agrees with the position of pos2 in FIG. 33, and the estimation error is −6.0 in the X-direction and −5.0 in the Y-direction. The corresponding distance is 7.8. In the example of FIG. 34, the position estimated by the conventional system agrees with pos4, and the estimation error is 3.0 in the X-direction and 3.0 in the Y-direction. The corresponding distance is 4.3. Comparing these results with the estimation results of the sixth embodiment, the estimation accuracy of the sixth embodiment is 8 times as high as the conventional system for transmitting station T6, and four times as high as the conventional system for transmitting station T7.

In the test, the transmitting station T6 is located at an open space, while the transmitting station T7 is placed in a steal box. The environmental coefficients Kt6 and Kt7 determined by the locating system using the above-described algorithm are −2.99 and 16.01, respectively, which are consistent with the actual environment. This fact proves that environmental coefficients provide effective information for position estimation.

In the above-described example, a modification of the corrected Friis' formula (i.e., the first correcting formula) is expressed as $$e_{ij} = f_0(d_{ij}) = S_1 \times \log_{10}(d_{ij} + S_2) - K_{rj} \quad (24)$$

However, only correcting coefficients S1 and S2 may be used without environmental coefficient. In this case, the correcting formula is expressed as $$e_{ij} = f_0(d_{ij}) = S_1 \times \log_{10}(d_{ij} + S_2) \quad (24)'$$

In addition, the correcting formula expressed by Equation (24)' or (24)'' may be used for a transmitting station.

$$e_{ij} = f_0(d_{ij}) = S_1 \times \log_{10}(d_{ij} + S_2) - K_{rj} \quad (24)''$$

The sixth embodiment has been described using an example in which Equation (24) is used for a receiving station and Equation (24)'' is used for a transmitting station. However, Equation (24)' may be used for both transmitting stations and receiving stations. In this case, the position of an unknown transmitting station is estimated still with high precision. If using Equation (24)', estimation function (27)' is determined using Equation (26)'.

$$md_{ij} = 10^{(e_{ij})/(S_1)} - S_2 \quad (26)'$$

$$h_{ij} = \sum \left(10^{(e_{ij})/(S_1)} - S_2 - d_{ij}\right)^2 \quad (27)'$$

If Equation (24)' is used for a receiving station and Equation (24)'' is used for a transmitting station, then estimation function of Equation (27)'' is determined using Equation (26)''.

$$md_{ij} = 10^{(e_{ij}+K_{ti})/(S_1)} - S_2 \qquad (26)''$$

$$h_{ij} = \sum \left(10^{(e_{ij}+K_{ti})/(S_1)} - S_2 - d_{ij}\right)^2 \qquad (27)''$$

If Equation (24) is used for a receiving station and Equation (24)' is used for a transmitting station, estimation function of Equation (27)''' is determined using Equation (26)'''.

$$md_{ij} = 10^{(e_{ij}+K_{rj})/(S_1)} - S_2 \qquad (26)'''$$

$$h_{ij} = \sum \left(10^{(e_{ij}+K_{rj})/(S_1)} - S_2 - d_{ij}\right)^2 \qquad (27)'''$$

It is needless to say that the modified correcting formulas explained in the sixth embodiment can be used not only in the locating system of the first embodiment, but also in the locating systems of the second through fifth embodiments.

[Other Embodiments]

Although the invention has been described based on the preferred embodiments, the invention is not limited to these examples, but covers many modifications, changes, and substitutions within the capabilities of a person skilled in the art, without departing from the scope of the invention. For example, the object (or the target) of position estimation is not limited to a transmitting station as a tag, and the position of an arbitrary item that can transmit a signal can be estimated. The transmitting station may have both transmitting and receiving functions, like a cellular phone or a mobile terminal. In this case, the location of a person who has such a device can be estimated and managed. In addition, both the transmitting station and the receiving station may have transmitting/receiving functions.

In the second through fifth embodiments, the activation signal is generated and supplied by the receiving station in order to cause a transmitting station to transmit an ID signal. However, the activation signal may be supplied from a high-powered remote base station by multicasting. In this case, the system can obtain data or information about a large number of transmitting stations through remote operations. This arrangement can reduce manpower and improve data-collecting efficiency. Besides, the structure of the receiving station can be simplified.

The receiving station may be connected to the server (or the data management unit) via cable or in a wireless manner. If using a moving receiving station as in the fourth and fifth embodiments, it is preferable to use wireless network, such as wireless LAN. In this case, a single system can control the assets or entire inventory over multiple floors or buildings. The user terminal may also be connected to the server via a cable or a wireless network. In either case, the user simply inputs the identifier (or identification number) of a tag attached to an item to have the positioning computer estimate the position of that item.

In the first through fifth embodiments, a first correcting formula expressed as $$e_{ij}=S_1 \times \log_{10}(d_{ij})+S_2-K_{rj} \qquad (2)$$

is used for a receiving station. However, only the correcting coefficients S1 and S2 may be used in the formula without using the environmental coefficient Krj. In this case, the first correcting formula for a receiving station is expressed by Equation (2)'

$$e_{ij}=f_0(d_{ij})=S_1 \times \log_{10}(d_{ij})+S_2 \qquad (2)'$$

Similarly, for a transmitting station, Equation (2)' or (2)'' may be used as a first correcting formula.

$$e_{ij}=f_0(d_{ij})=S_1 \times \log_{10}(d_{ij})+S_2-K_{ti} \qquad (2)''$$

If Equation (2)' is used for both transmitting station and receiving station, Equations (4)' and (5)' are used in place of Equation (4) and (5) to express a derived distance and an estimation function, respectively.

$$md_{ij} = 10^{(e_{ij}-S_2)/S_1} \qquad (4)'$$

$$h_{ij} = \Sigma \left(10^{(e_{ij}-S_2)/S_1} - d_{ij}\right)^2 \qquad (5)'$$

If Equation (2)' is used for a receiving station and Equation (2)'' is used for transmitting station, then an estimation function expressed by Equation (5)'' is solved using Equation (4)'' to determine the position.

$$md_{ij} = 10^{(e_{ij}-S_2+K_{ti})/S_1} \qquad (4)''$$

$$h_{ij} = \Sigma \left(10^{(e_{ij}-S_2+K_{ti})/S_1} - d_{ij}\right)^2 \qquad (5)''$$

If Equation (2) is used for a receiving station and Equation (2)' is used for a transmitting station, then an estimation function expressed by Equation (5)''' is solved using Equation (4)''' to determine the position.

$$md_{ij} = 10^{(e_{ij}-S_2+K_{rj})/S_1} \qquad (4)'''$$

$$h_{ij} = \Sigma \left(10^{(e_{ij}-S_2+K_{rj})/S_1} - d_{ij}\right)^2 \qquad (5)'''$$

If Equation (2)' using only S1 and S2 is selected as a first correcting formula, and if there is no known transmitting station (tn=0), then the number of known receiving stations must satisfy $rn \geq 5$. Similarly, if there is no known receiving station (rn=0), the number of known transmitting station must satisfy $tn \geq 5$.

If Equation (2)'' using environmental coefficient Kti is selected as a first correcting formula, and if there is no known transmitting station (tn=0), then the number of known receiving station must satisfy $rn \geq 6$. Similarly, if there is no known receiving station (rn=0), the number of known transmitting station must satisfy $tn \geq 6$.

The fourth and fifth embodiments are explained using an example in which the number of known transmitting stations is greater than the number of known positions of the receiving station in the initial state. Accordingly, after the unknown parameters of the correcting formulas are determined, an algorithm of estimating the position of the receiving station, then estimating the position of an unknown transmitting station using the estimated position of the receiving station, and then further estimating the new position of the receiving station is repeated. However, the number of known positions of the receiving station may be greater than the number of known transmitting stations in the initial state. In this case, after the correcting formula(s) is/are determined, an algorithm of estimating the position of a transmitting station, then estimating the new position of the receiving station, and further estimating the position of another transmitting station is repeated.

In the former case (of first estimating the position of the receiving station), (a) a first approximate function $$e_{ij}=f_0(d_{ij})=f_0(\sqrt{(u_{i-xj})^2+(v_{i-yj})^2})$$

is determined as a first correcting formula, using a first intensity $e_{ij}$ of a first signal transmitted from at least one known transmitting station "i" located at a known position (ui,vi) and measured at a receiving station "j" located at a first unknown position (xj,yj), as well as a distance $d_{ij}$ from the transmitting station "i" to the receiving station "j", to derive a position (uj, vj) of the first unknown position of the receiving station "j";

(b) a second approximate function $$e_{ij} = f_0(\sqrt{(x_i - u_j)^2 + (y_i - v_j)^2})$$

is defined based on the first correcting formula, using a second intensity $e_{ij}$ of a second signal transmitted from an unknown transmitting station "i" located at an unknown position (xi, yi) and measured at a known or position-estimated receiving station "j", as well as position information (uj, vj) of said known or position-estimated receiving station "j", to derive a position (ui, vi) of said unknown transmitting station "i"; and then (c) a third approximate function $$e_{ij} = f_0(\sqrt{(u_i - x_j)^2 + (v_i - y_j)^2})$$

is defined based on the first correcting formula, using a third intensity $e_{ij}$ of a third signal transmitted from a known or position-estimated transmitting station "i" located at (ui,vi) and measured at the receiving station "j" at a second unknown position, as well as position information of said known or position-estimated transmitting station "i", to derive a position (uj, vj) of the second unknown position of the receiving station "j". The steps (b) and (c) are repeated to successively estimate positions of an unknown receiving station and an unknown transmitting station.

In the latter case (of first estimating the position of a transmitting station), (a) a first approximate function $$e_{ij} = f_0(d_{ij}) = f_0(\sqrt{(x_i - u_j)^2 + (y_i - v_j)^2})$$

is determined as a first correcting formula, using a first intensity $e_{ij}$ of a first signal transmitted from a first unknown transmitting station "i" located at a first known position (xi,yi) and measured at one or more known receiving stations "j" located at known positions (uj,vj), as well as a distance $d_{ij}$ from the transmitting station "i" to the receiving station "j", to derive a position (ui, vi) of the first unknown transmitting station "i";

(b) a second approximate function $$e_{ij} = f_0(\sqrt{(u_i - x_j)^2 + (v_i - y_j)^2})$$

is defined based on the first correcting formula, using a second intensity $e_{ij}$ of a second signal transmitted from a known or position-estimated transmitting station "i" located at (ui, vi) and measured at an unknown receiving station "j" located at an unknown position (xj, yj), as well as position information (ui, vi) of said known or position-estimated transmitting station "i", to derive a position (uj, vj) of said unknown receiving station "j"; and then (c) a third approximate function $$e_{ij} = f_0(\sqrt{(x_i - u_j)^2 + (y_i - v_j)^2})$$

is defined based on the first correcting formula, using a third intensity $e_{ij}$ of a third signal transmitted from a second unknown transmitting station "i" located at a second unknown position (xi,yi) and measured at a known or position-estimated receiving station "j" at (uj, vj), as well as position information of said known or position-estimated receiving station "j", to derive a position (ui, vi) of the second unknown position of the second unknown transmitting station "i", the steps (b) and (c) being repeated to successively estimate positions of an unknown transmitting station and an unknown receiving station.

The same applies to the algorithm using the second correcting formula. Although in the fourth and fifth embodiments the position of the moving receiving station is first estimated after the unknown parameters of the second correcting formula are determined; the position of an unknown transmitting station may be first estimated if there are many known or estimated positions of the receiving station.

In the former case (of estimating the position of the moving station first), (a) a first approximate function $$p_{ij} = f_1(t_{ij}, e_{ij}) = Kd_{ij} = K\sqrt{(u_i - x_j)^2 + (v_i - y_j)^2}$$

and a constant K are determined as a second correcting formula, using a first intensity $e_{ij}$ of a first signal transmitted from at least one known transmitting station "i" located at a known position (ui,vi) and measured at a receiving station "j" located at a first unknown position (xj,yj), as well as a first signal transmission time tij, a first signal propagation time pij through the air, and position information of said known transmitting station, to derive a position (uj, vj) of the first unknown position of the receiving station "j";

(b) a second approximate function $$f_1(t_{ij}, e_{ij}) = K\sqrt{(x_i - u_j)^2 + (y_i - v_j)^2}$$

is defined based on the second correcting formula, using a second intensity $e_{ij}$ of a second signal transmitted from an unknown transmitting station "i" located at an unknown position (xi, yi) and measured at a known or position-estimated receiving station "j", as well as a second signal transmission time (tij) and position information (uj, vj) of said known or position-estimated receiving station "j", to derive a position (ui, vi) of said unknown transmitting station "i"; and then (c) a third approximate function $$f_1(t_{ij}, e_{ij}) = K\sqrt{(u_i - x_j)^2 + (v_i - y_j)^2}$$

is defined based on the second correcting formula, using a third intensity $e_{ij}$ of a third signal transmitted from a known or position-estimated transmitting station "i" located at (ui,vi) and measured at the receiving station "j" at a second unknown position, as well as a third signal transmission time (tij) and position information of said known or position-estimated transmitting station "i", to derive a position (uj, vj) of the second unknown position of the receiving station "j". The steps (b) and (c) are repeated to successively estimate positions of an unknown receiving station and an unknown transmitting station.

In the latter case (of estimating the position of an unknown transmitting station first), (a) a first approximate function $$p_{ij} = f_1(t_{ij}, e_{ij}) = Kd_{ij} = K\sqrt{(x_i - u_j)^2 + (y_i - v_j)^2}$$

and constant K are determined as a second correcting formula, using a first intensity $e_{ij}$ of a first signal transmitted from a first unknown transmitting station "i" located at a first known position (xi,yi) and measured at one or more known receiving stations "j" located at known positions (uj,vj), as well as a first signal transmission time (tij), a first signal propagation time (pij) through the air, and position information of said known receiving station "j", to derive a position (ui, vi) of the first unknown transmitting station "i";
(b) a second approximate function $$f_1(t_{ij},e_{ij})=K\sqrt{(u_{i-x_j})^2+(v_{i-y_j})^2}$$

is defined based on the second correcting formula, using a second intensity $e_{ij}$ of a second signal transmitted from a known or position-estimated transmitting station "i" located at (ui, vi) and measured at an unknown receiving station "j" located at an unknown position (xj, yj), as well as a second signal transmission time (tij) and position information (ui, vi) of said known or position-estimated transmitting station "i", to derive a position (uj, vj) of said unknown receiving station "j"; and then
(c) a third approximate function $$f_1(t_{ij},e_{ij})=K\sqrt{(x_{i-u_j})^2+(y_{i-v_j})^2}$$

is defined based on the second correcting formula, using a third intensity $e_{ij}$ of a third signal transmitted from a second unknown transmitting station "i" located at a second unknown position (xi,yi) and measured at a known or position-estimated receiving station "j" at (uj, vj), as well as a third signal transmission time (tij) and position information of said known or position-estimated receiving station "j", to derive a position (ui, vi) of the second unknown position of the second unknown transmitting station "i". The steps (b) and (c) are repeated to successively estimate positions of an unknown transmitting station and an unknown receiving station.

What is claimed is:

1. A system for determining a position of an object, comprising:
   a transmitting station configured to transmit a first ID signal containing a first identifier in a periodic manner;
   a receiving station configured to receive the first ID signal, measure an intensity of the first ID signal, and extract the first identifier;
   a data management unit configured to store and manage the intensity in association with the first identifier; and
   a positioning computer configured to determine a first correcting formula defining a relation between the intensity measured at the receiving station and a distance between the transmitting station and the receiving station using a correcting coefficient, and to estimate a position of an unknown transmitting station using the first correcting formula and known position information stored in the data management unit.

2. The system according to claim 1, wherein the receiving station comprises:
   an activation signal generator configured to generate an activation signal for causing the transmitting station to generate a second ID signal; and
   a transmitter configured to transmit the activation signal to the transmitting station, and wherein the receiving station has an ID signal generator configured to generate the second ID signal containing a second identifier in response to the activation signal.

3. The system according to claim 1, wherein the transmitting station receives an activation signal supplied from a remote base station, and has an ID signal generator configured to generate a second ID signal containing a second identifier in response to the activation signal.

4. The system according to claim 1, wherein the transmitting station has a sensor for sensing a change due to an external factor, and an ID signal generator configured to generate a third ID signal containing a third identifier when sensing the change.

5. The system according to claim 4, wherein the ID signal generator generates different types of said third identifiers depending on types of changes.

6. The system according to claim 1, wherein the first correcting formula is $$e_{ij}=f_0(d_{ij})=S_1 \times \log_{10}(d_{ij})+S_2$$

or $$e_{ij}=f_0(d_{ij})=S_1 \times \log_{10}(d_{ij}+S_2)$$

where $e_{ij}$ is the intensity of a signal transmitted from an $i^{th}$ transmitting station at (xi,yi) and measured at a $j^{th}$ receiving station at (uj, vj), $d_{ij}$ is the distance from the $i^{th}$ transmitting station to the $j^{th}$ receiving station expressed as $$d_{ij}=\sqrt{(x_{i-u_j})^2+(y_{i-v_j})^2}$$

and S1 and S2 are correcting coefficients, wherein the positioning computer determines the correcting coefficients S1 and S2 using the known position information to estimate the position of the unknown transmitting station.

7. The system according to claim 6, wherein when using $$e_{ij}=f_0(d_{ij})=S_1 \times \log_{10}(d_{ij})+S_2$$

as the first correcting formula, the positioning computer derives a distance $$md_{ij} = 10^{(e_{ij}-S_2)/S_1}$$

from the measured intensity, and determines an estimation function $$h_{ij} = \sum_{j=1}^{m} \left(10^{(e_{ij}-S_2)/S_1} - d_{ij}\right)^2,$$

and when using $$e_{ij}=f_0(d_{ij})=S_1 \times \log_{10}(d_{ij}+S_2)$$

as the first correcting formula, the positioning computer derives a distance $$md_{ij} = 10^{(e_{ij})/(S_1)} - S_2$$

from the measured intensity, and determines an estimation function $$h_{ij} = \sum \left(10^{(e_{ij})/(S_1)} - S_2 - d_{ij}\right)^2$$

to weight with $h_{ij}/md_{ij}$ to estimate the position of the unknown transmitting station.

8. The system according to claim 1 wherein the first correcting formula is $$e_{ij}=f_0(d_{ij})=S_1 \times \log_{10}(d_{ij})+S_2-K_{rj}$$

or $$e_{ij}=f_0(d_{ij})=S_1 \times \log_{10}(d_{ij}+S_2)-K_{rj}$$

where $e_{ij}$ is the intensity of a signal transmitted from an $i^{th}$ transmitting station at (xi,yi) and received at a $j^{th}$ receiving station at (uj, vj), $d_{ij}$ is the distance from the $i^{th}$ transmitting station to the $j^{th}$ receiving station expressed as $$d_{ij}=\sqrt{(x_{i-u_j})^2+(y_{i-v_j})^2},$$

S1 and S2 are correcting coefficients, and $K_{rj}$ is an environmental coefficient for the receiving station, wherein the positioning computer determines the coefficients S1, S2 and $K_{rj}$ using the known position information to estimate the position of the unknown transmitting station.

9. The system according to claim 8, wherein when using $$e_{ij}=f_0(d_{ij})=S_1\times\log_{10}(d_{ij})+S_2-K_{rj}$$

as the first correcting formula, the positioning computer derives a distance $$md_{ij} = 10^{(e_{ij}-S_2+K_{rj})/S_1} \quad (4)'''$$

from the measured intensity, and determines an estimation function $$h_{ij} = \sum \left(10^{(e_{ij}-S_2+K_{rj})/S_1} - d_{ij}\right)^2,$$

and when using $$e_{ij}=f_0(d_{ij})=S_1\times\log_{10}(d_{ij}+S_2)-K_{rj}$$

as the first correcting formula, the positioning computer derives a distance $$md_{ij} = 10^{(e_{ij}+K_{rj})/(S_1)} - S_2$$

from the measured intensity, and determines an estimation function $$h_{ij} = \sum \left(10^{(e_{ij}+K_{rj})/(S_1)} - S_2 - d_{ij}\right)^2$$

to weight with $h_{ij}/md_{ij}$ to estimate the position of the unknown transmitting station.

10. The system according to claim 1 wherein the first correcting formula is $$e_{ij}=f_0(d_{ij})=S_1\times\log_{10}(d_{ij})+S_2-K_{ti}$$

or $$e_{ij}=f_0(d_{ij})=S_1\times\log_{10}(d_{ij}+S_2)-K_{ti}$$

where $e_{ij}$ is the intensity of a signal transmitted from an $i^{th}$ transmitting station at (xi,yi) and received at a $j^{th}$ receiving station at (uj, vj), $d_{ij}$ is the distance from the $i^{th}$ transmitting station to the $j^{th}$ receiving station expressed as $$d_{ij}=\sqrt{(x_{i-u_j})^2+(y_{i-v_j})^2},$$

S1 and S2 are correcting coefficients, and $K_{ti}$ is an environmental coefficient for the transmitting station, wherein the positioning computer determines the coefficients S1, S2 and $K_{ti}$ using the known position information to estimate the position of the unknown transmitting station.

11. The system according to claim 10, wherein when using $$e_{ij}=f_0(d_{ij})=S_1\times\log_{10}(d_{ij})+S_2-K_{ti}$$

as the first correcting formula, the positioning computer derives a distance $$md_{ij} = 10^{(e_{ij}-S_2+K_{ti})/S_1}$$

from the measured intensity, and determines an estimation function $$h_{ij} = \sum \left(10^{(e_{ij}-S_2+K_{ti})/S_1} - d_{ij}\right)^2,$$

and when using $$e_{ij}=f_0(d_{ij})=S_1\times\log_{10}(d_{ij}+S_2)-K_{ti}$$

as the first correcting formula, the positioning computer derives a distance $$md_{ij} = 10^{(e_{ij}+K_{ti})/(S_1)} - S_2$$

from the measured intensity, and determines an estimation function $$h_{ij} = \sum \left(10^{(e_{ij}+K_{ti})/(S_1)} - S_2 - d_{ij}\right)^2$$

to weight with $h_{ij}/md_{ij}$ to estimate the position of the unknown transmitting station.

12. The system according to claim 1, wherein the receiving station comprises:
- an activation signal generator configured to generate an activation signal for causing the transmitting station to transmit a second ID signal containing a second identifier;
- a transmitter configured to transmit the activation signal to the transmitting station; and
- a time computation unit configured to measure a transmission time required to acquire the second identifier from the transmitting station in response to the activation signal.

13. The system according to claim 12, wherein the positioning computer determines a second correcting formula defining a relation between a propagation time of a signal through the air and a distance between the transmitting station and the receiving station, and estimates a position of an unknown transmitting station using the second correcting formula and known position information.

14. The system according to claim 13, wherein the second correcting formula is expressed as $$p_{ij}=f_1(t_{ij},e_{ij})=t_{ij}-B-g\exp(-h\times e_{ij})=Kd_{ij}=K\sqrt{(u_{i-u_j})^2+(v_{i-v_j})^2},$$

where $e_{ij}$ is the intensity of the second ID signal transmitted from an $i^{th}$ transmitting station at (xi,yi) and measured at a $j^{th}$ receiving station at (uj, vj), $t_{ij}$ is the transmission time, $p_{ij}$ is the propagation time, $d_{ij}$ is the distance from the $i^{th}$ transmitting station to the $j^{th}$ receiving station expressed as $$d_{ij}=\sqrt{(x_{i-u_j})^2+(y_{i-v_j})^2},$$

B, g, and h are correcting coefficients, and K is a proportional constant, and wherein the positioning computer determines the correcting coefficients B, g, and h, and the proportional constant K from the known position information to estimate the position of the unknown transmitting station.

15. The system according to claim 14, wherein the positioning computer derives a distance $$nd_{ij} = p_{ij}/K = \{t_{ij} - B - g\exp(-h \times e_{ij})\}/K$$

from the propagation time through the air, and determines an estimation function $$hh_{ij} = \sum (\{t_{ij} - B - g\exp(-h \times e_{ij})\}/K - d_{ij})^2$$

using the derived distance to weight with $hh_{ij}/nd_{ij}$ to estimate the position of the unknown transmitting station.

16. The system according to claim 1, wherein the receiving station includes a fixed-position receiving station and a moving receiving station, and wherein the positioning computer carries out the steps of:
 (a) determining a first correcting formula defining a relation between the intensity of a received signal and a distance using known position information supplied from the fixed-position receiving station;
 (b) estimating the position of the moving receiving station using the first correcting formula, together with signal information transmitted from a known or position-estimated transmitting station and position information about said known or position-estimated transmitting station; and
 (c) estimating a position of an unknown transmitting station based on signal information transmitted from said unknown transmitting station to the fixed-position receiving station or the moving receiving station at an estimated position, and position information about the fixed-position receiving station and said estimated position of the moving receiving station, and wherein the positioning computer repeats the steps (b) and (c) to successively estimate positions of multiple unknown transmitting stations as the moving receiving station travels.

17. The system according to claim 12, wherein the receiving station includes a fixed-position receiving station and a moving receiving station, and wherein the positioning computer carries out the steps of:
 (a) determining a second correcting formula defining a relation between a signal propagation time through the air and a distance using the transmission time and the intensity measured at the fixed-position receiving station and known position information supplied from the fixed-position receiving station;
 (b) estimating a current position of the moving receiving station using the second correcting formula, together with signal information transmitted from a known or position-estimated transmitting station to the moving station, position information about said known or position-estimated transmitting station, and a transmission time measured at the moving receiving station; and
 (c) estimating a position of an unknown transmitting station based on signal information transmitted from said unknown transmitting station to the fixed-position receiving station or the moving receiving station at an estimated position, position information about the fixed-position receiving station and said estimated position of the moving receiving station, and a transmission time measured at the fixed-position receiving station or the moving receiving station at the estimated position, and wherein the positioning computer repeats the steps (b) and (c) to successively estimate positions of multiple unknown transmitting stations as the moving receiving station travels.

18. The system according to claim 1, wherein the receiving station includes a single moving receiving station, and wherein the positioning computer carries out the steps of:
 (a) determining a first correcting formula defining a relation between the intensity of a received signal and a distance using signal information transmitted from a transmitting station whose position is known to the moving receiving station at an unknown position, and position information of said transmitting station;
 (b) estimating a current position of the moving receiving station using the first correcting formula, based on signal information transmitted from a known transmitting station or a position-estimated transmitting station and position information about said known transmitting station or the position-estimated transmitting station; and
 (c) estimating a position of an unknown transmitting station based on signal information transmitted from said unknown transmitting station to the moving receiving station at the estimated current position, and position information about the estimated current position, and wherein the positioning computer repeats the steps (b) and (c) to successively estimate positions of multiple unknown transmitting stations as the moving receiving station travels.

19. The system according to claim 12, wherein the receiving station includes a single moving receiving station, and wherein the positioning computer carries out the steps of:
 (a) determining a second correcting formula defining a relation between a signal propagation time through the air and a distance using signal information transmitted from a transmitting station whose position is known to the moving receiving station at an unknown position, position information of said transmitting station, and the transmission time measured at the moving receiving station;
 (b) estimating a current position of the moving station using the second correcting formula, based on signal information transmitted from the known transmitting station or a position-estimated transmitting station, position information about said known transmitting station or the position-estimated transmitting station, and the transmission time measured by the moving receiving station; and
 (c) estimating a position of an unknown transmitting station based on signal information transmitted from said unknown transmitting station to the moving receiving station at the estimated current position, position information about the estimated current position, and the transmission time measured by the moving receiving station at the estimated current position, and wherein the positioning computer repeats the steps (b) and (c) to successively estimate positions of multiple unknown transmitting stations as the moving receiving station travels.

20. The system according to claim 1, wherein the first ID signal is transmitted using electromagnetic waves or sound waves.

21. The system according to claim 2, wherein the first and second ID signals are transmitted using electromagnetic waves or sound waves, and the activation signal is transmitted using electromagnetic waves or sound waves.

22. The system according to claim 1, wherein if the intensity of the first ID signal transmitted form an $i^{th}$ transmitting station is measured at a $j^{th}$ receiving station, but is not measured at an $m^{th}$ receiving station, then the positioning computer determines the first correcting formula adding an restrictive condition $$d_{ij} < d_{im}$$

where $d_{ij}$ is a distance between the $i^{th}$ transmitting station and the $j^{th}$ receiving station, and $d_{im}$ is a distance between the $i^{th}$ transmitting station and the $m^{th}$ receiving station.

23. A method for determining a position of an object comprises the steps of:
  receiving at a receiving station a first ID signal containing a first identifier transmitted from a transmitting station;
  measuring an intensity of the first ID signal received at the receiving station;
  determining a first correcting formula defining a relation between the intensity measured at the receiving station and a distance between the transmitting station and the receiving station using a correcting coefficient; and
  estimating a position of an unknown transmitting station using the first correcting formula and known position information.

24. The method according to claim 23, wherein the first correcting formula is expressed as $$e_{ij} = f_0(d_{ij}) = S_1 \times \log_{10}(d_{ij}) + S_2$$

or $$e_{ij} = f_0(d_{ij}) = S_1 \times \log_{10}(d_{ij} + S_2)$$

where $e_{ij}$ is the intensity of a signal transmitted from an $i^{th}$ transmitting station at (xi,yi) and measured at a $j^{th}$ receiving station at (uj, vj), $d_{ij}$ is the distance from the $i^{th}$ transmitting station to the $j^{th}$ receiving station expressed as $$d_{ij} = \sqrt{(x_i - u_j)^2 + (y_i - v_j)^2},$$

and S1 and S2 are correcting coefficients.

25. The method according to claim 24, further comprising the step of deriving a distance $$md_{ij} = 10^{(e_{ij} - S_2)/S_1}$$

from the measured intensity if using $$e_{ij} = f_0(d_{ij}) = S_1 \times \log_{10}(d_{ij}) + S_2$$

as the first correcting formula and determining an estimation function $$h_{ij} = \sum_{j=1}^{m} \left(10^{(e_{ij} - S_2)/S_1} - d_{ij}\right)^2$$

to weight with $h_{ij}/md_{ij}$ to estimate the position of the unknown transmitting station.

26. The method according to claim 24, further comprising the step of deriving a distance $$md_{ij} = 10^{(e_{ij})/(S_1)} - S_2$$

from the measured intensity if using $$e_{ij} = f_0(d_{ij}) = S_1 \times \log_{10}(d_{ij} + S_2)$$

as the first correcting formula and determining an estimation function $$h_{ij} = \sum \left(10^{(e_{ij})/(S_1)} - S_2 - d_{ij}\right)^2$$

to weight with $h_{ij}/md_{ij}$ to estimate the position of the unknown transmitting station.

27. The method according to claim 23, further comprising the steps of:
  transmitting an activation signal from the receiving station to the transmitting station;
  transmitting a second ID signal containing a second identifier from the transmitting station to the receiving station in response to the activation signal;
  measuring a transmission time required to acquire the second ID signal in response to the activation signal at the receiving station;
  determining a second correcting formula defining a relation between a signal propagation time through the air and a distance based on the measured transmission time; and
  estimating a position of an unknown transmitting station using the second correcting formula and known position information.

28. The method according to claim 27, wherein the second correcting formula is $$p_{ij} = f_1(t_{ij}, e_{ij}) = t_{ij} - B - g \exp(-h \times e_{ij}) = K d_{ij} = K \sqrt{(u_i - u_j)^2 + (v_i - v_j)^2}$$

where $e_{ij}$ is the intensity of the second ID signal transmitted from an $i^{th}$ transmitting station at (xi,yi) and measured at a $j^{th}$ receiving station at (uj, vj), $t_{ij}$ is the transmission time, $p_{ij}$ is the propagation time, $d_{ij}$ is the distance from the $i^{th}$ transmitting station to the $j^{th}$ receiving station expressed as $$d_{ij} = \sqrt{(x_i - u_j)^2 + (y_i - v_j)^2},$$

B, g, and h are correcting coefficients, and K is a proportional constant, and wherein the positioning computer determines the correcting coefficients B, g, and h, and the proportional constant K from the known position information to estimate the position of the unknown transmitting station.

29. A method for determining a position of an object comprising the steps of:
  (a) determining a first approximate function $$e_{ij} = f_0(d_{ij}) = f_0(\sqrt{(u_i - x_j)^2 + (v_i - y_j)^2})$$

as a first correcting formula, using a first intensity $e_{ij}$ of a first signal transmitted from at least one known transmitting station "i" located at a known position (ui,vi) and measured at a receiving station "j" located at a first unknown position (xj,yj), as well as a distance $d_{ij}$ from the transmitting station "i" to the receiving station "j", to derive a position (uj, vj) of the first unknown position of the receiving station "j";
  (b) defining a second approximate function $$e_{ij} = f_0(\sqrt{(x_i - u_j)^2 + (y_i - v_j)^2})$$

based on the first correcting formula, using a second intensity $e_{ij}$ of a second signal transmitted from an unknown transmitting station "i" located at an unknown position (xi, yi) and measured at a known or position-estimated receiving station "j", as well as position information (uj, vj) of said known or position-estimated receiving station "j", to derive a position (ui, vi) of said unknown transmitting station "i"; and (c) defining a third approximate function $$e_{ij}=f_0(\sqrt{(u_{i-xj})^2+(v_{i-yj})^2})$$

based on the first correcting formula, using a third intensity $e_{ij}$ of a third signal transmitted from a known or position-estimated transmitting station "i" located at (ui,vi) and measured at the receiving station "j" at a second unknown position, as well as position information of said known or position-estimated transmitting station "i", to derive a position (uj, vj) of the second unknown position of the receiving station "j", the steps (b) and (c) being repeated to successively estimate positions of an unknown receiving station and an unknown transmitting station.

30. A method for determining a position of an object comprising the steps of:

(a) determining a first approximate function $$e_{ij}=f_0(d_{ij})=f_0(\sqrt{(x_{i-uj})^2+(y_{i-vj})^2})$$

as a first correcting formula, using a first intensity $e_{ij}$ of a first signal transmitted from a first unknown transmitting station "i" located at a first known position (xi,yi) and measured at one or more known receiving stations "j" located at known positions (uj,vj), as well as a distance $d_{ij}$ from the transmitting station "i" to the receiving station "j", to derive a position (ui, vi) of the first unknown transmitting station "i";

(b) defining a second approximate function $$e_{ij}=f_0(\sqrt{(u_{i-xj})^2+(v_{i-yj})^2})$$

based on the first correcting formula, using a second intensity $e_{ij}$ of a second signal transmitted from a known or position-estimated transmitting station "i" located at (ui, vi) and measured at an unknown receiving station "j" located at an unknown position (xj, yj), as well as position information (ui, vi) of said known or position-estimated transmitting station "i", to derive a position (uj, vj) of said unknown receiving station "j"; and (c) defining a third approximate function $$e_{ij}=f_0(\sqrt{(x_{i-uj})^2+(y_{i-vj})^2})$$

based on the first correcting formula, using a third intensity $e_{ij}$ of a third signal transmitted from a second unknown transmitting station "i" located at a second unknown position (xi,yi) and measured at a known or position-estimated receiving station "j" at (uj, vj), as well as position information of said known or position-estimated receiving station "j", to derive a position (ui, vi) of the second unknown position of the second unknown transmitting station "i", the steps (b) and (c) being repeated to successively estimate positions of an unknown transmitting station and an unknown receiving station.

31. A method for determining a position of an object comprising the steps of:

(a) determining a first approximate function $$p_{ij}=f_1(t_{ij},e_{ij})=Kd_{ij}=K\sqrt{(u_{i-xj})^2+(v_{i-yj})^2}$$

and a constant K as a second correcting formula, using a first intensity $e_{ij}$ of a first signal transmitted from at least one known transmitting station "i" located at a known position (ui,vi) and measured at a receiving station "j" located at a first unknown position (xj,yj), as well as a first signal transmission time $t_{ij}$, a first signal propagation time $p_{ij}$ through the air, and position information of said known transmitting station, to derive a position (uj, vj) of the first unknown position of the receiving station "j";

(b) defining a second approximate function $$f_1(t_{ij},e_{ij})=K\sqrt{(x_{i-uj})^2+(y_{i-vj})^2}$$

based on the second correcting formula, using a second intensity $e_{ij}$ of a second signal transmitted from an unknown transmitting station "i" located at an unknown position (xi, yi) and measured at a known or position-estimated receiving station "j", as well as a second signal transmission time (tij) and position information (uj, vj) of said known or position-estimated receiving station "j", to derive a position (ui, vi) of said unknown transmitting station "i"; and (c) defining a third approximate function $$f_1(t_{ij},e_{ij})=K\sqrt{(u_{i-xj})^2+(v_{i-yj})^2}$$

based on the second correcting formula, using a third intensity $e_{ij}$ of a third signal transmitted from a known or position-estimated transmitting station "i" located at (ui,vi) and measured at the receiving station "j" at a second unknown position, as well as a third signal transmission time (tij) and position information of said known or position-estimated transmitting station "i", to derive a position (uj, vj) of the second unknown position of the receiving station "j", the steps (b) and (c) being repeated to successively estimate positions of an unknown receiving station and an unknown transmitting station.

32. A method for determining a position of an object comprising the steps of:

(a) determining a first approximate function $$p_{ij}=f_1(t_{ij},e_{ij})=Kd_{ij}=K\sqrt{(x_{i-uj})^2+(y_{i-vj})^2}$$

as a second correcting formula, using a first intensity $e_{ij}$ of a first signal transmitted from a first unknown transmitting station "i" located at a first known position (xi,yi) and measured at one or more known receiving stations "j" located at known positions (uj,vj), as well as a first signal transmission time (tij), a first signal propagation time (pij) through the air, and position information of said known receiving station "j", to derive a position (ui, vi) of the first unknown transmitting station "i";

(b) defining a second approximate function $$f_1(t_{ij},e_{ij})=K\sqrt{(u_{i-xj})^2+(v_{i-yj})^2}$$

based on the second correcting formula, using a second intensity $e_{ij}$ of a second signal transmitted from a known or position-estimated transmitting station "i" located at (ui, vi) and measured at an unknown receiving station "j" located at an unknown position (xj, yj), as well as a second signal transmission time (tij) and position information (ui, vi) of said known or position-estimated transmitting station "i", to derive a position (uj, vj) of said unknown receiving station "j"; and (c) defining a third approximate function $$f_1(t_{ij},e_{ij})=K\sqrt{(x_{i-uj})^2+(y_{i-vj})^2}$$

based on the second correcting formula, using a third intensity $e_{ij}$ of a third signal transmitted from a second unknown transmitting station "i" located at a second unknown position (xi,yi) and measured at a known or position-estimated receiving station "j" at (uj, vj), as well as a third signal transmission time (tij) and position information of said known or position-estimated receiving station "j", to derive a position (ui, vi) of the second unknown position of the second unknown transmitting station "i", the steps (b) and (c) being repeated to successively estimate positions of an unknown transmitting station and an unknown receiving station.

* * * * *